(12) United States Patent
Byler

(10) Patent No.: US 10,670,844 B2
(45) Date of Patent: *Jun. 2, 2020

(54) HIGH ETENDUE MODULAR LENS ASSEMBLY WITH AFOCAL ZOOM HAVING FIVE LENS GROUPS

(71) Applicant: Navitar, Inc., Rochester, NY (US)

(72) Inventor: Chad Byler, Rochester, NY (US)

(73) Assignee: Navitar, Inc., Rochester, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/881,638

(22) Filed: Jan. 26, 2018

(65) Prior Publication Data

US 2018/0217367 A1 Aug. 2, 2018

Related U.S. Application Data

(60) Provisional application No. 62/451,622, filed on Jan. 27, 2017, provisional application No. 62/451,060, filed on Jan. 26, 2017.

(51) Int. Cl.
*G02B 15/14* (2006.01)
*G02B 21/02* (2006.01)
(Continued)

(52) U.S. Cl.
CPC .............. *G02B 13/24* (2013.01); *G02B 15/14* (2013.01); *G02B 15/155* (2013.01); *G02B 15/16* (2013.01);
(Continued)

(58) Field of Classification Search
CPC ...... G02B 13/24; G02B 15/14; G02B 15/155; G02B 15/16; G02B 15/17; G02B 15/22;
(Continued)

(56) References Cited

U.S. PATENT DOCUMENTS

| 5,882,221 A | 3/1999 | Nguyen et al. |
| 6,583,444 B2 | 6/2003 | Fjelstad |

(Continued)

FOREIGN PATENT DOCUMENTS

| CN | 104360465 A | 2/2015 |
| CN | 204188874 U | 3/2015 |

(Continued)

OTHER PUBLICATIONS

PCT Notification of transmittal of the international search report and the written opinion of the international searching authority, or the declaration, for PCT Application No. PCT/US18/15393, report dated Jun. 19, 2018, 12 pages.

(Continued)

*Primary Examiner* — Ryan S Dunning
(74) *Attorney, Agent, or Firm* — SF Bay Area Patents, LLC; Andrew V. Smith

(57) ABSTRACT

A finite conjugate lens assembly including an afocal zooming component that has five optical groups that are configured to provide a ratio of highest to lowest magnification between 5.5:1 and 16:1. A lens attachment module and rear adapter module may be disposed, respectively, on an object side and an image side of the optical assembly. The lens assembly may exhibit an approximate etendue between 0.95 and 4.65 mm$^2$sr, and may be configured in accordance with between 6.6MP and 32MP image sensors.

32 Claims, 23 Drawing Sheets

(51) Int. Cl.

| | |
|---|---|
| G02B 21/36 | (2006.01) |
| G02B 13/24 | (2006.01) |
| G02B 25/00 | (2006.01) |
| G02B 27/00 | (2006.01) |
| G02B 15/16 | (2006.01) |
| G02B 15/17 | (2006.01) |
| G02B 23/12 | (2006.01) |
| G02B 15/15 | (2006.01) |
| G02B 15/22 | (2006.01) |
| G02B 27/10 | (2006.01) |

(52) U.S. Cl.
CPC ............ *G02B 15/17* (2013.01); *G02B 15/22* (2013.01); *G02B 21/025* (2013.01); *G02B 21/361* (2013.01); *G02B 23/12* (2013.01); *G02B 23/125* (2013.01); *G02B 25/001* (2013.01); *G02B 27/0075* (2013.01); *G02B 27/108* (2013.01)

(58) Field of Classification Search
CPC .... G02B 21/025; G02B 21/361; G02B 23/12; G02B 23/125; G02B 25/001; G02B 27/0075; G02B 27/108
USPC ........ 359/379, 380, 421, 422, 432, 629, 639, 359/643, 676, 679, 683, 689, 693, 694, 359/695, 705
See application file for complete search history.

(56) References Cited

U.S. PATENT DOCUMENTS

| | | |
|---|---|---|
| 6,804,066 B1 | 10/2004 | Ha |
| 6,888,168 B2 | 5/2005 | Fjelstad |
| 7,095,054 B2 | 8/2006 | Fjelstad |
| 7,244,056 B2 | 7/2007 | Koike et al. |
| 7,368,695 B2 | 5/2008 | Kang et al. |
| 7,443,597 B2 | 10/2008 | Humpston |
| 7,566,853 B2 | 7/2009 | Tuckerman et al. |
| 7,593,636 B2 | 9/2009 | Nystrom et al. |
| 7,747,155 B1 | 6/2010 | Gutierrez |
| 7,768,574 B2 | 8/2010 | Humpston |
| 7,807,508 B2 | 10/2010 | Oganesian et al. |
| 7,920,163 B1 | 4/2011 | Kossin |
| 8,004,780 B2 | 8/2011 | Gutierrez et al. |
| 8,005,268 B2 | 8/2011 | Steinberg et al. |
| 8,014,662 B1 | 9/2011 | Gutierrez et al. |
| 8,090,252 B1 | 1/2012 | Tang et al. |
| 8,135,184 B2 | 3/2012 | Steinberg et al. |
| 8,184,967 B2 | 5/2012 | Tang et al. |
| 8,199,222 B2 | 6/2012 | Drimbarean et al. |
| 8,212,882 B2 | 7/2012 | Florea et al. |
| 8,264,576 B2 | 9/2012 | Susanu et al. |
| 8,351,726 B2 | 1/2013 | Albu et al. |
| 8,358,925 B2 | 1/2013 | Gutierrez et al. |
| 8,363,085 B2 | 1/2013 | Michrowski et al. |
| 8,417,055 B2 | 4/2013 | Albu et al. |
| 8,508,652 B2 | 8/2013 | Albu et al. |
| 8,509,496 B2 | 8/2013 | Steinberg et al. |
| 8,521,017 B2 | 8/2013 | Calvet et al. |
| 8,587,666 B2 | 11/2013 | Albu et al. |
| 8,593,542 B2 | 11/2013 | Steinberg et al. |
| 8,604,663 B2 | 12/2013 | Gutierrez et al. |
| 8,637,961 B2 | 1/2014 | Gutierrez et al. |
| 8,648,959 B2 | 2/2014 | Capata et al. |
| 8,649,627 B2 | 2/2014 | Albu et al. |
| 8,649,628 B2 | 2/2014 | Albu et al. |
| 9,091,843 B1 | 7/2015 | Hudyma et al. |
| 9,316,808 B1 | 4/2016 | Hudyma et al. |
| 9,835,835 B1 | 12/2017 | Hudyma et al. |
| 10,330,900 B1 | 6/2019 | Hudyma et al. |
| 10,401,598 B2 | 9/2019 | Byler |
| 2005/0082653 A1 | 4/2005 | McWilliams et al. |
| 2008/0029879 A1 | 2/2008 | Tuckerman et al. |
| 2008/0099900 A1 | 5/2008 | Oganesian et al. |
| 2008/0296717 A1 | 12/2008 | Beroz et al. |
| 2009/0023249 A1 | 1/2009 | Honer et al. |
| 2009/0212381 A1 | 8/2009 | Crisp et al. |
| 2010/0142037 A1* | 6/2010 | Nakayama ........... G02B 21/025 359/380 |
| 2011/0255182 A1 | 10/2011 | Calvet et al. |
| 2011/0274423 A1 | 11/2011 | Gutierrez |
| 2011/0317013 A1 | 12/2011 | Gutierrez et al. |
| 2012/0019613 A1 | 1/2012 | Murray et al. |
| 2012/0063761 A1 | 3/2012 | Tang et al. |
| 2012/0120283 A1 | 5/2012 | Capata et al. |
| 2012/0206618 A1 | 8/2012 | Albu et al. |
| 2012/0207347 A1 | 8/2012 | Albu et al. |
| 2013/0057749 A1 | 3/2013 | Hiasa |
| 2013/0070126 A1 | 3/2013 | Albu et al. |
| 2013/0075237 A1 | 3/2013 | Gutierrez |
| 2013/0076919 A1 | 3/2013 | Gutierrez et al. |
| 2013/0077945 A1 | 3/2013 | Liu et al. |
| 2013/0201392 A1 | 8/2013 | Gutierrez |
| 2013/0242080 A1 | 9/2013 | Kossin |
| 2013/0242407 A1* | 9/2013 | Wacke ................ G02B 21/025 359/659 |
| 2013/0258140 A1 | 10/2013 | Lipson et al. |
| 2014/0028887 A1 | 1/2014 | Azuma |
| 2014/0043525 A1 | 2/2014 | Azuma et al. |
| 2014/0168763 A1* | 6/2014 | Winterot ................ G02B 13/22 359/380 |
| 2018/0217365 A1 | 8/2018 | Byler |
| 2018/0217366 A1 | 8/2018 | Byler |
| 2018/0231750 A1 | 8/2018 | Byler |
| 2018/0231751 A1 | 8/2018 | Byler |
| 2018/0231762 A1 | 8/2018 | Byler |

FOREIGN PATENT DOCUMENTS

| | | |
|---|---|---|
| CN | 108427188 A | 8/2018 |
| CN | 110082895 A | 8/2019 |
| WO | 2018/140697 A1 | 8/2018 |

OTHER PUBLICATIONS

PCT Notification of Transmittal of International Preliminary Report on Patentability, International Preliminary Report on Patentability Chapter I, for PCT Application No. PCT/US18/15393, report dated Jul. 30, 2019, 9 pages.
Adolf W. Lohmann, Rainer G. Dorsc, David Mendlovic and Zeev Zalevsk, Carlos Ferreira. Space-bandwidth product of optical signals and systems, J. Opt Soc. Am. A. vol. 13, No. 3 Mar. 1996, pp. 470-473.
Non-Final Rejection, dated Oct. 31, 2019, for U.S. Appl. No. 15/881,594, filed Jan. 26, 2018.
Non-Final Rejection, dated Dec. 11, 2019, for U.S. Appl. No. 15/881,277, filed Jan. 26, 2018.
Non-Final Rejection, dated Dec. 11, 2019, for U.S. Appl. No. 15/881,504, filed Jan. 26, 2018.
Notice of Allowance, dated Apr. 23, 2019; for U.S. Appl. No. 15/881,681, filed Jan. 26, 2018.
Hung-Ju Yen; Guey-Sheng Liou, "A facile approach towards optically isotropic, colorless, and thermoplastic polyimidothioethers with high refractive index", J. Mater. Chem., (20100000), vol. 20, No. 20, p. 4080.
H. Althues; J. Henle; S. Kaskel, "Functional inorganic nanofillers for transparent polymers", Chem. Soc. Rev., (20070000), vol. 9, No. 49, pp. 1454-1465.
Akhmad Herman Yuwono; Binghai Liu; Junmin Xue; John Wang; Hendry Izaac Elim; Wei Ji; Ying Li; Timothy John White, "Controlling the crystallinity and nonlinear optical properties of transparent Ti02-PMMA nanohybrids", J. Mater. Chem., (20040000), vol. 14, No. 20, p. 2978.
Naoaki Suzuki; Yasuo Tomita; Kentaroh Ohmori; Motohiko Hidaka; Katsumi Chikama, "Highly transparent Zr02 nanoparticle-dispersed acrylate photopolymers for volume holographic recording", Opt. Express, Dec. 25, 2006, vol. 14, No. 26, pp. 12712-12719.

(56) References Cited

OTHER PUBLICATIONS

Internet Article: Bausch and Lomb Stereo Microscopes—high level of craftsmanship and value. Retrieved from URL: http://www.microscopemaster.com/bausch-and-lomb-stereomicroscopes.html on Mar. 5, 2020, 5 pages.
Internet Article: Optem Micro Inspection Lenses. Retrieved from URL:http://www.qioptiq.com/optem-micro-inspection-lenses.html on Mar. 4, 2020, 4 pages.
Internet Article/Video: Easily modify form, function and performance with the modular Optem FUSION configurable Lens System, Retrieved from URL:http://www.qioptiq.com/qioptiq-video-optem on Mar. 4, 2020, 1 page.
Internet Article: Optem FUSION Lens System. Retrieved from URL:http://www.qioptiq.com/optem-fusion-lens on Mar. 4, 2020, 8 pages.
Internet Article:MZMT5x series. Retrieved from URL:http://www.pomeas.com/productview/200.html; Mar. 5, 2020, 1 page.
Translation of CN 104360465 A, 23 pages.
Translation of CN 20418887 U, 23 pages.
Internet Article: 6.5X Zoom Lens PMS-Z65M-C. Retrieved from URL:http://www.pomeas.com/productview/200.html on Mar. 5, 2020, 5 pages.
Internet Article: PMS-VA90 All-In-One Video Microscope. Retrieved from URL:http://www.pomeas.com/productview/220.html on Mar. 5, 2020, 4 pages.
Technical Sheet: Zoom Telecentric Lens Series, PMS-ZT0220-A. Retrieved from URL:http://www.pomeas.com; 2 pages.

\* cited by examiner

HIGH ETENDUE MODULAR LENS ASSEMBLY WITH AFOCAL ZOOM HAVING FIVE LENS GROUPS

PRIORITY AND RELATED APPLICATIONS

This application claims the benefit of priority to United States provisional patent application Ser. No. 62/451,060, filed Jan. 26, 2017 and 62/451,622, filed Jan. 27, 2017, which are incorporated by reference.

This application is one of seven contemporaneously-filed applications by the same Applicant and Inventor that are entitled: High Etendue Modular Zoom Lens for Machine Vision, PCT application serial no. PCT/US18/15393; High Etendue Zoom Lens, Ser. No. 15/881,277; High Etendue Modular Zoom Lens for Machine Vision, Ser. No. 15/881,504; High Etendue Lens Assembly with Large Zoom Range, Ser. No. 15/881,594; High Etendue Modular Lens Assembly with Afocal Zoom, Ser. No. 15/881,638; A Lens Attachment for a High Etendue Modular Zoom Lens, Ser. No. 15/881,681; and A Rear Adapter for a High Etendue Modular Zoom Lens, Ser. No. 15/881,717. Each of these priority and related applications is hereby incorporated by reference.

BACKGROUND

1. Field of the Invention

The invention relates generally to an afocal optical zoom lens assembly for use in combination with a camera or eyepiece, for the purpose of viewing and inspecting objects. More specifically the invention relates to an optical assembly or a lens assembly having the characteristics of having multiple modular parts, high optical etendue preserving characteristics, broad wavelength correction, or a large zoom range, or combinations thereof.

2. Description of the Related Art

The history of long working distance finite conjugate lenses with a large zoom range goes back many decades. Bausch and Lomb used a zoom module in their Stereo Zoom 4 through 7 models, which started being produced in 1959. The most commonly produced scope had a 0.7×3× magnification range, for a ratio of highest magnification (e.g., 3×) to lowest magnification (e.g., 0.7×), of 3/0.7, or approximately 4.3, which may be written as 4.3:1. FIG. 1 shows an eyepiece pod for a conventional Bausch and Lomb Stereo-Zoom4 with 0.7-3× magnification range. FIG. 2 shows a full stereo microscope stand for a conventional Bausch and Lomb StereoZoom4.

Even at this time the idea of modularity, defined as a pod, was introduced to allow the stereo microscope head to be used on multiple stands and stages. This product was targeted to work with eyepiece magnifiers, which define the limited field of view required, and the limited amount of NA required to achieve vision limited resolution of around 2 arc-min per optical line pairs.

Technological innovations over time, particularly in the 1980s, eventually progressed along two product development paths, which continue to be in production through the present. One path has involved continued use within stereomicroscopes. An example of a conventional Jeweler's StereoZoom microscope that is still in use today is provided at FIG. 3. The stereo microscope shown in FIG. 3 has a ratio of highest to lowest magnification of 6.5:1, often using a zoom cell with approximately 0.7-4.5× magnification range.

An optical assembly in accordance with FIG. 3 can be used with varying eyepiece magnifiers and Barlow lenses to adjust the visual magnification. Another path has involved use of a very similar zoom cell with 6.5:1 ratio of highest to lowest magnification in a monocular arrangement in a video system. These systems functioned to image objects or scenes onto a sensor of up to approximately 11 mm on the diagonal, commonly referred to as a ⅔ inch format camera. This field of view (FOV), along with the approximately maximum rear numerical aperture (NA) of 0.0388, has remained approximately consistent with the original stereo microscope designs. It is recognized herein by the present inventor that these cameras, if utilized to their fullest extent or otherwise optimized for maximum performance quality or efficiency, may in principle achieve a maximum etendue of 0.45 mm$^2$sr (square millimeters steradians) with less than 10% vignetting.

FIGS. 4A-4C schematically illustrate an example of an optical assembly that may achieve an approximate etendue of 0.45 mm$^2$sr with less than 10% vignetting. Three arrangements are illustrated schematically in FIGS. 4A-4C, including a low magnification arrangement at FIG. 4A, a mid-level magnification arrangement at FIG. 4B, and a high magnification arrangement at FIG. 4C. The optical arrangements shown in FIGS. 4A-4C each include, from object end to image end of the lens assembly, a first static pair of doublets G10, G20, a first movable doublet G30, a second movable doublet G50, and a second static pair of doublets G60, G70. The positions of the movable doublets G30, G50 relative to each of the static doublets G10, G20, G60, G70 is adjustable for selecting a magnification within a range between a lowest and highest magnification of the optical assembly of FIGS. 4A-4C.

The possibility is recognized herein by the present inventor that, with a notable loss of relative illumination and/or increased aberration, a larger sensor, e.g., having a 16 mm diagonal, or one inch (1") format, may be combined with the optical assembly of FIGS. 4A-4C such that an approximately same optical assembly as that used in a monocular video system may provide images to a one inch format sensor field in a camera that can operate in an etendue range above 0.45 mm$^2$sr up to approximately 0.95 mm$^2$sr. Such a camera would likely exhibit, however, all else being equal, significantly less than optimal viewing performance or reduced illumination at the outer portions of the field, or both. In the instance of vignetting or loss of illumination at the full diagonal field, a reduction in the angular light cone would mathematically reduce the highest achievable etendue of the optical assembly of FIGS. 4A-4C to less than the 0.95 mm$^2$sr.

It is desired to have a camera that includes an optical assembly that is configured to exhibit a reduction in loss of optical quality with less than 10% vignetting in an etendue range above 0.95 mm$^2$sr. It is further desired to have such a camera and optical assembly that are configured for operation in the approximately 0.95-4.65 mm$^2$sr etendue range, and particularly such a camera and optical assembly that also exhibits enhanced performance, such as may be demonstrated by a reduction in loss of optical quality with less than 10% vignetting.

BRIEF DESCRIPTION OF THE TABLES

Table 1 includes an example optical prescription for an example afocal zoom optical assembly that is configured in accordance with certain embodiments and is schematically illustrated at FIG. 5.

Table 2 includes an example optical prescription for an example afocal zoom optical assembly that is configured in accordance with certain embodiments and is schematically illustrated at FIG. 6.

Table 3 includes an example optical prescription for an example afocal zoom optical assembly that is configured in accordance with certain embodiments and is schematically illustrated at FIG. 7.

Table 4 includes an example optical prescription for an example afocal zoom optical assembly that is configured in accordance with certain embodiments and is schematically illustrated at FIG. 8.

Table 5 includes an example optical prescription for an example afocal zoom optical assembly that is configured in accordance with certain embodiments and is schematically illustrated at FIG. 9.

Table 6 includes an example optical prescription for an example afocal zoom optical assembly that is configured in accordance with certain embodiments and is schematically illustrated at FIG. 10.

Table 7 includes an example optical prescription for an example afocal zoom optical assembly that is configured in accordance with certain embodiments and is schematically illustrated at FIG. 11.

Figure 12:
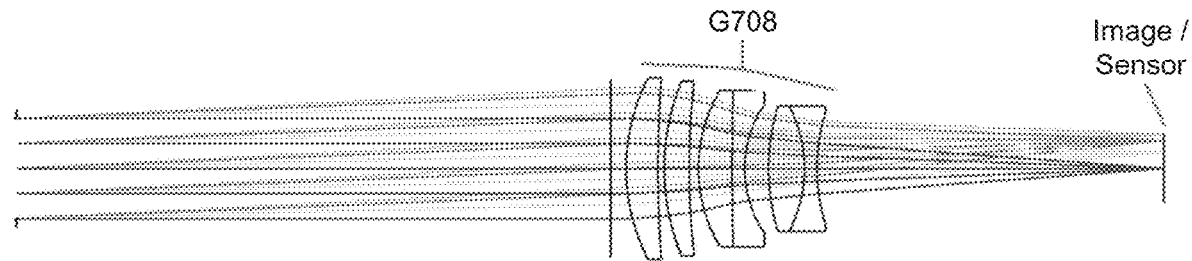
FIG. 12 schematically illustrates an example embodiment 8 of a rear adapter optical assembly, or rear adapter module, that may be configured for an optical assembly of a finite conjugate optical system that may also include a zooming component, that exhibits in this example an etendue of 1.58 mm²sr and 11 mm sensor coverage, 16 mm aperture, and a 97.86 mm pupil depth, and includes in this example an optical group G708 which may be configured in accordance with the example optical prescription set forth at Table 8.

Table 8 includes an example optical prescription for a rear adapter optical assembly configured in accordance with the example embodiment that is schematically illustrated at FIG. 12.

Figure 13:
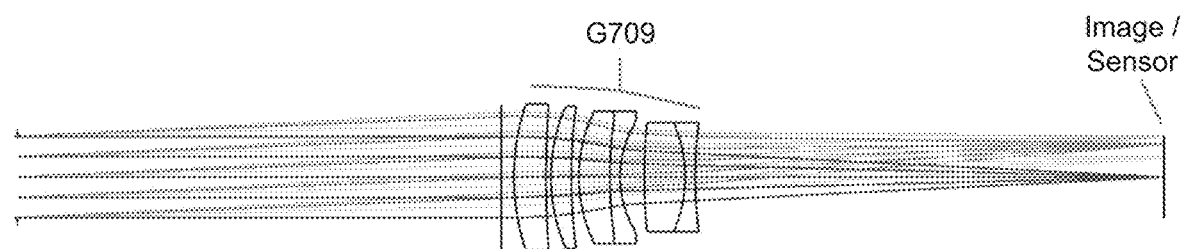
FIG. 13 schematically illustrates an example embodiment 9 of a rear adapter optical assembly, or rear adapter module, that may be configured for an optical assembly of a finite conjugate optical system that may also include a zooming component, that exhibits in this example an etendue of 1.58 mm²sr and 16 mm sensor coverage, 16 mm aperture, and a 97.86 mm pupil depth, and that includes in this example an optical group G709 which may be configured in accordance with the example optical prescription set forth at Table 9.

Table 9 includes an example optical prescription for a rear adapter optical assembly configured in accordance with the example embodiment that is schematically illustrated at FIG. 13.

Figure 14:
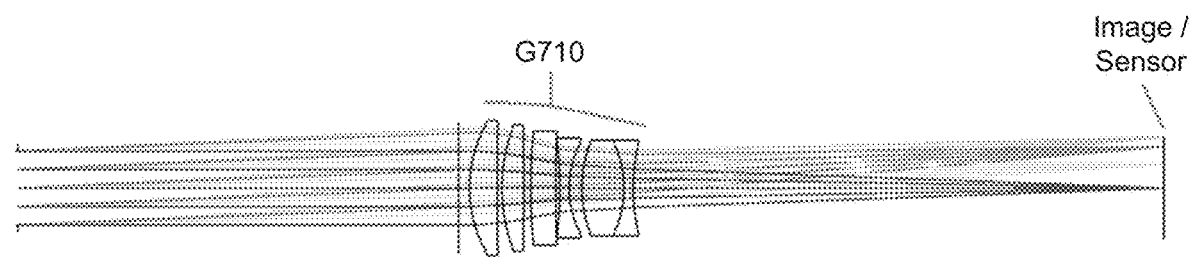
FIG. 14 schematically illustrates an example embodiment 10 of a rear adapter optical assembly, or rear adapter module, that may be configured for an optical assembly of a finite conjugate optical system that may also include a zooming component, that exhibits in this example an etendue of 1.58 mm²sr and 22 mm sensor coverage, 16 mm aperture, and a 97.86 mm pupil depth, and that includes in this example an optical group G710 which may be configured in accordance with the example optical prescription set forth at Table 10.

Table 10 includes an example optical prescription for a rear adapter optical assembly configured in accordance with the example embodiment that is schematically illustrated at FIG. 14.

Figure 15:
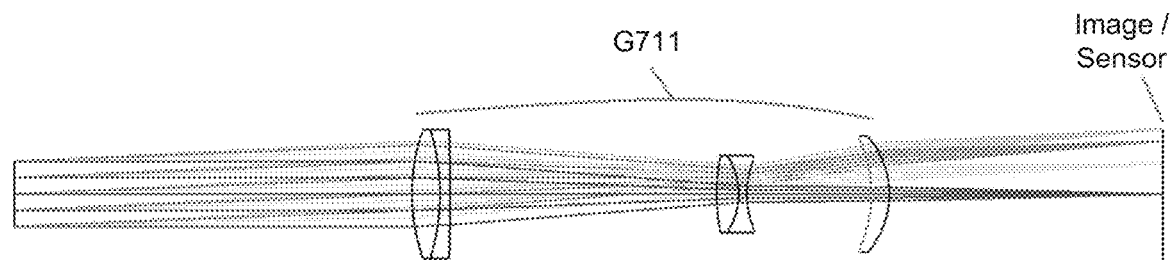
FIG. 15 schematically illustrates an example embodiment 11 of a rear adapter optical assembly, or rear adapter module, that may be configured for an optical assembly of a finite conjugate optical system that may also include a zooming component, that exhibits an etendue of 1.58 mm²sr and 32 mm sensor coverage, 16 mm aperture, and a 97.86 mm pupil depth, and that includes in this example an optical group G711 which may be configured in accordance with the example optical prescription set forth at Table 11.

Table 11 includes an example optical prescription for a rear adapter optical assembly configured in accordance with the example embodiment that is schematically illustrated at FIG. 15.

Figure 16:
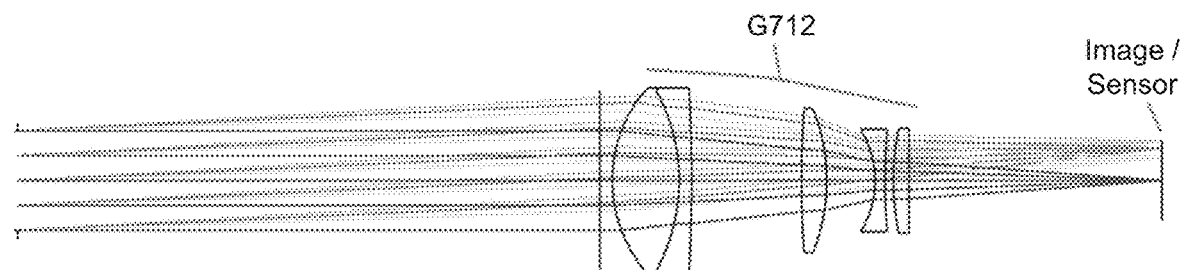
FIG. 16 schematically illustrates an example embodiment 12, of a rear adapter optical assembly, or rear adapter module, that may be configured for an optical assembly of a finite conjugate optical system that may also include a zooming component, that exhibits an etendue of 3.21 mm²sr and 16 mm sensor coverage, 20 mm aperture, and a 119.5 mm pupil depth, and that includes in this example an optical group G712 which may be configured in accordance with the example optical prescription set forth at Table 12.

Table 12 includes an example optical prescription for a rear adapter optical assembly configured in accordance with the example embodiment that is schematically illustrated at FIG. 16.

Figure 17:
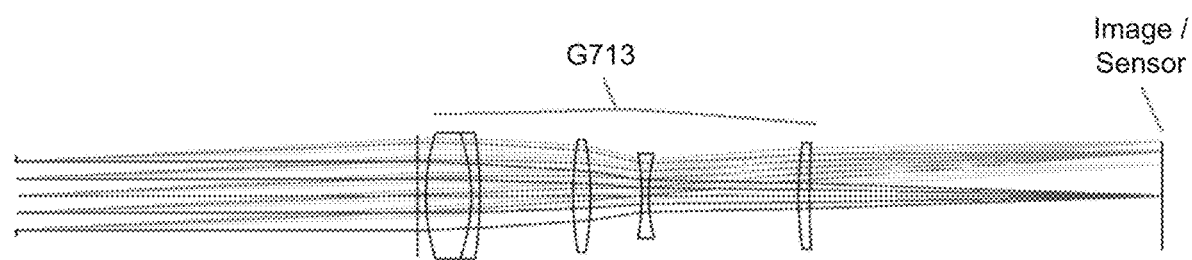
FIG. 17 schematically illustrates an example embodiment 13, of a rear adapter optical assembly, or rear adapter module, that may be configured for an optical assembly of a finite conjugate optical system that may also include a zooming component, that exhibits an etendue of 3.21 mm²sr and 32 mm sensor coverage, 20 mm aperture, and a 119.5 mm pupil depth, and that includes in this example an optical group G713 which may be configured in accordance with the example optical prescription set forth at Table 13.

Table 13 includes an example optical prescription for a rear adapter optical assembly configured in accordance with the example embodiment that is schematically illustrated at FIG. 17.

Figure 18:
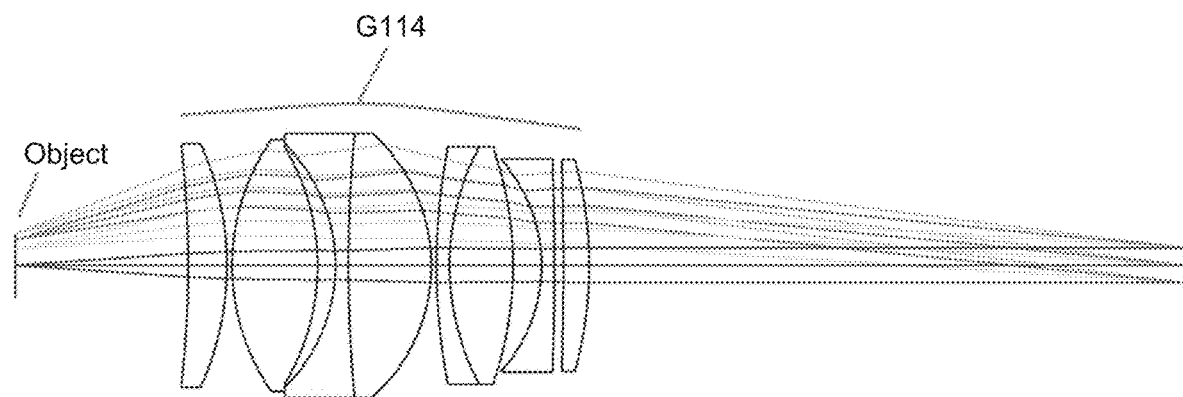
FIG. 18 schematically illustrates an example embodiment 14, of a lens attachment optical assembly, or lens attachment module, that may be configured for an optical assembly of a finite conjugate optical system that may also include a zooming component, that exhibits a 12.5 mm field, 19 mm aperture, and 105.5 mm pupil depth, and that includes in this example an optical group G114 which may be configured in accordance with the example optical prescription set forth at Table 14.

Table 14 includes an example optical prescription for a lens attachment optical assembly configured in accordance with the example embodiment that is schematically illustrated at FIG. 18.

Figure 19:
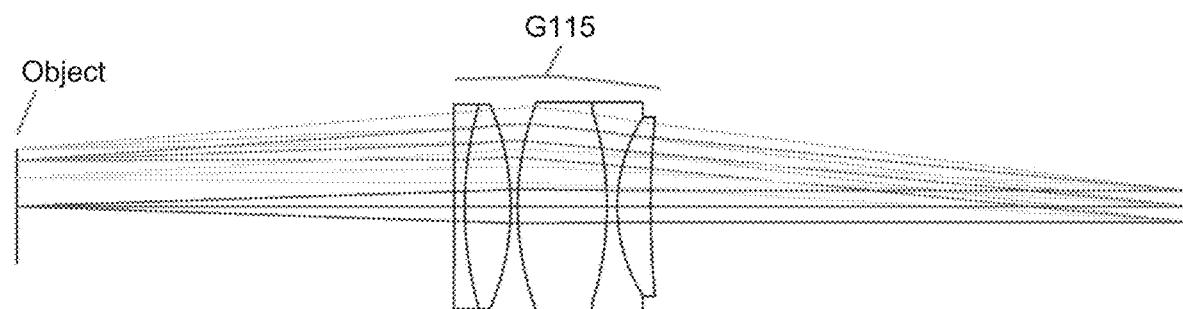
FIG. 19 schematically illustrates an example embodiment 15, of a lens attachment optical assembly, or lens attachment module, that may be configured for an optical assembly of a finite conjugate optical system that may also include a zooming component, that exhibits a 25 mm field, 19 mm aperture, and 105.5 mm pupil depth, and that includes in this example an optical group G115 which may be configured in accordance with the example optical prescription set forth at Table 15.

Table 15 includes an example optical prescription for a lens attachment optical assembly configured in accordance with the example embodiment that is schematically illustrated at FIG. 19.

Figure 20:
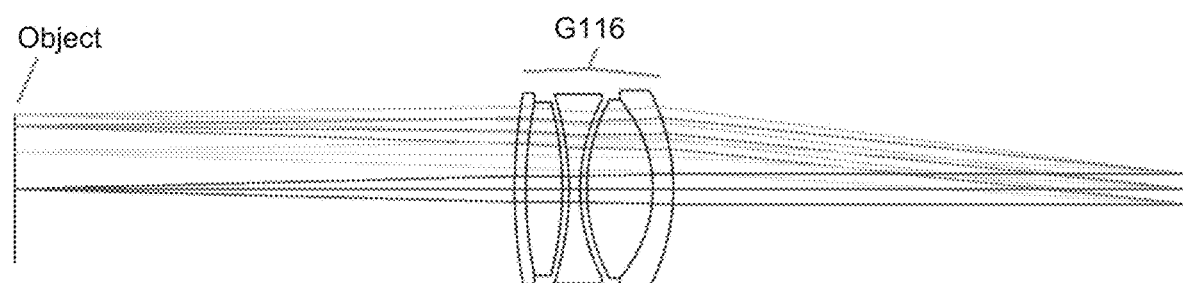
FIG. 20 schematically illustrates an example embodiment 16, of a lens attachment optical assembly, or lens attachment module, that may be configured for an optical assembly of a finite conjugate optical system that may also include a zooming component, that exhibits a 33.3 mm field, 19 mm aperture, and 105.5 mm pupil depth, and that includes in this example an optical group G116 which may be configured in accordance with the example optical prescription set forth at Table 16.

Table 16 includes an example optical prescription for a lens attachment finite conjugate optical assembly configured in accordance with the example embodiment that is schematically illustrated at FIG. 20.

Figure 21:
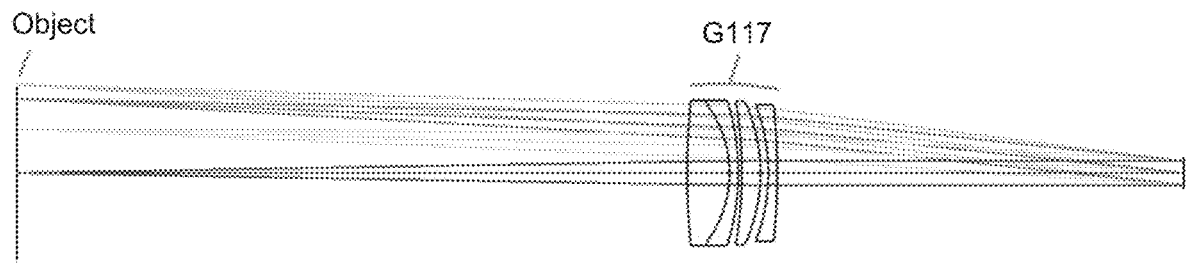
FIG. 21 schematically illustrates an example embodiment 17, of a lens attachment optical assembly, or lens attachment module, that may be configured for an optical assembly of a finite conjugate optical system that may also include a zooming component, that exhibits a 50 mm field, 19 mm aperture, and 105.5 mm pupil depth, and that includes in this example an optical group G117 which may be configured in accordance with the example optical prescription set forth at Table 17.

Table 17 includes an example optical prescription for a lens attachment optical assembly configured in accordance with the example embodiment that is schematically illustrated at FIG. 21.

Figure 22:
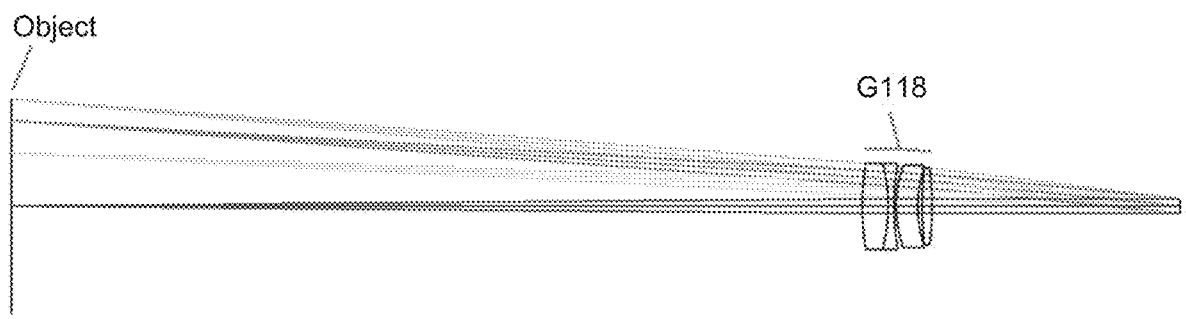
FIG. 22 schematically illustrates an example embodiment 18, of a lens attachment optical assembly, or lens attachment module, that may be configured for an optical assembly of a finite conjugate optical system that may also include a zooming component, that exhibits a 100 mm field, 19 mm aperture, and 105.5 mm pupil depth, and that includes in this example an optical group G118 which may be configured in accordance with the example optical prescription set forth at Table 18.

Table 18 includes an example optical prescription for a lens attachment optical assembly configured in accordance with the example embodiment that is schematically illustrated at FIG. 22.

Figure 23:
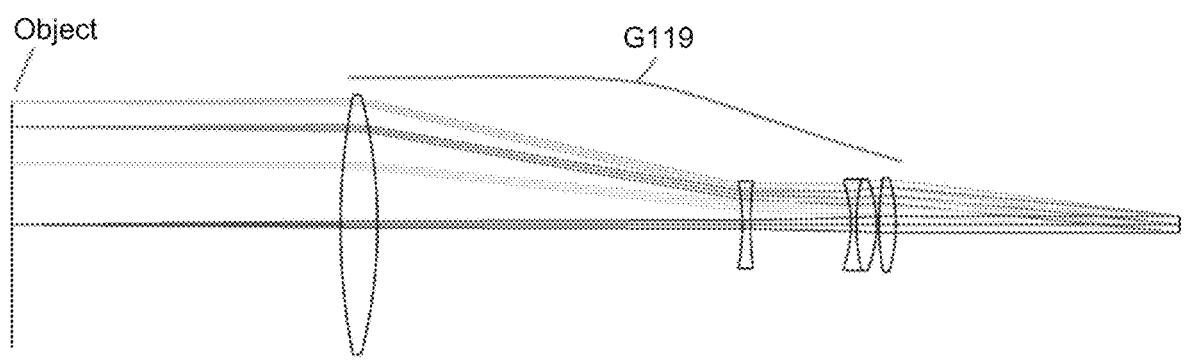
FIG. 23 schematically illustrates an example embodiment 19, of a lens attachment optical assembly, or lens attachment module, that may be configured for an optical assembly of a finite conjugate optical system that may also include a zooming component, that exhibits a 100 mm field, 19 mm aperture, and 105.5 mm pupil depth, with certain telecentric chief ray properties through zoom, and that includes in this example an optical group G119 which may be configured in accordance with an example optical prescription set forth at Table 19.

Table 19 includes an example optical prescription for a lens attachment optical assembly configured in accordance with the example embodiment that is schematically illustrated at FIG. 23.

Figure 24A:
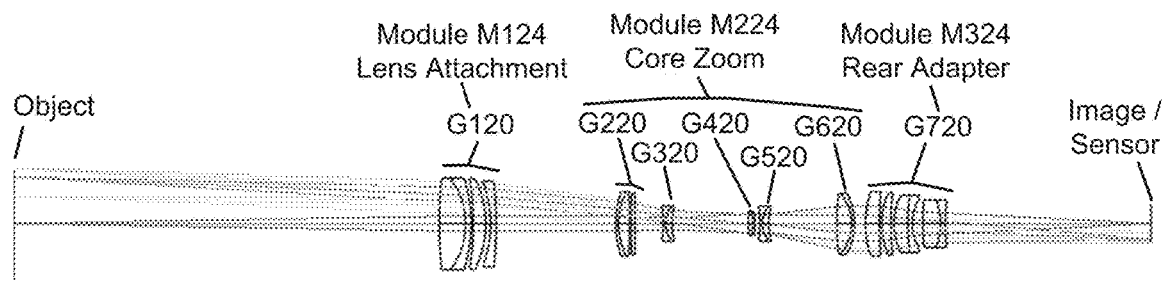
FIGS. 24A-24C schematically illustrate a finite conjugate embodiment 20, of an optical assembly for an imaging system arranged, respectively, for low magnification, mid magnification and high magnification, including three optical modules m124, m224 and m324 disposed between an object and an image sensor, including a lens attachment module m124, such as that shown and described with reference to FIG. 21 and example embodiment 17, that includes a positive focal length group G120, and a zoom module m224, such as a 7:1 afocal zoom module that exhibits an etendue of approximately 1.57 mm²sr, such as that shown and described with reference to FIG. 6 and embodiment 2, and includes five lens groups including a static positive group G220, a negative movable group G320, a positive static group G420, a negative movable group G520, and a static positive group G620, and a rear adapter module m324, such as that shown and described with reference to FIG. 13 and example embodiment 9, that includes a positive focal length group G720, and that together may exhibit a magnification range of 0.34×-2.4×, which may be configured in accordance with the example optical prescription set forth at Table 20.
Figure 24B:
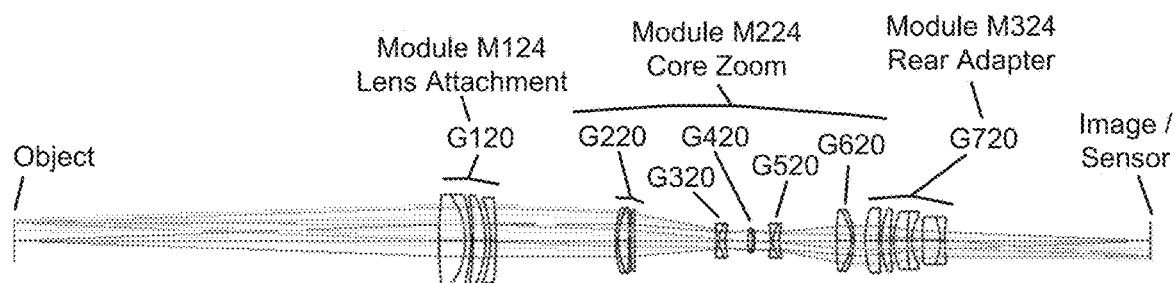
Figure 24C:
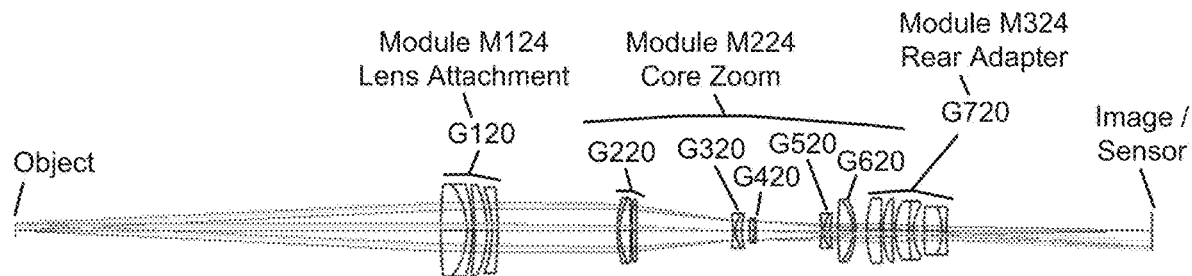

Table 20 includes an example optical prescription for a finite conjugate optical assembly comprising a lens attachment module m124, a core zoom module m224, and a rear adapter module m324 that may be configured in accordance with the example embodiment that is schematically illustrated at FIGS. 24A-24C.

Figure 25A:
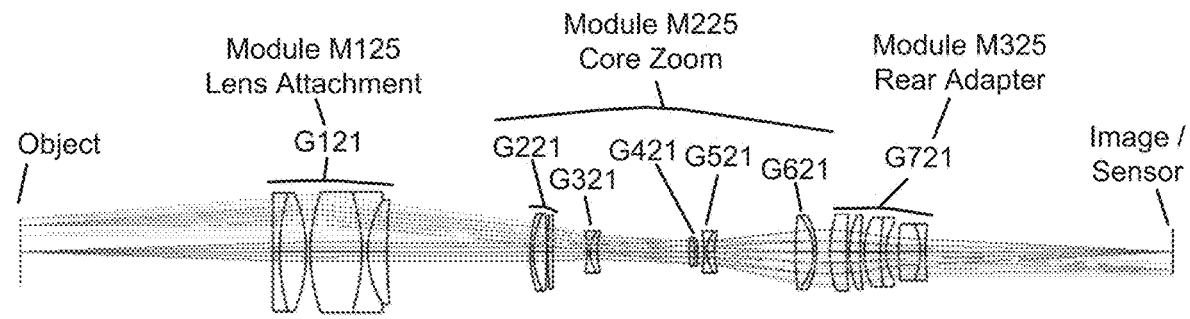
FIGS. 25A-25C schematically illustrate a finite conjugate embodiment 21 of an optical assembly for an imaging system arranged, respectively, for low magnification, mid magnification and high magnification, including three optical modules m125, m225 and m325 disposed between an object and an image sensor, including a lens attachment module m125, such as that shown and described with reference to FIG. 19 and embodiment 15, that includes a positive focal length group G121, and module m225 that includes a zooming component or a core zoom module m225, that in this example includes a 7:1 afocal zoom module that exhibits an etendue of approximately 1.57 mm²sr and includes five lens groups including a static positive group G221, a negative movable group G321, a positive static group G421, a negative movable group G521, and a static positive group G621, and that includes a rear adapter module m325, such as that shown and described with reference to FIG. 13 and example embodiment 9, that includes a rear adapter with a positive focal length group G721, that together have a magnification range of 0.68×-4.8×, which may be configured in accordance with the example optical prescription is set forth at Table 21.
Figure 25B:
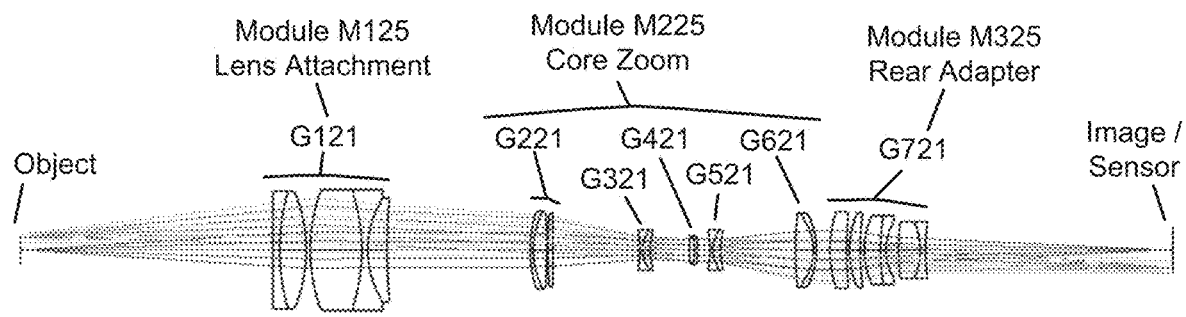
Figure 25C:
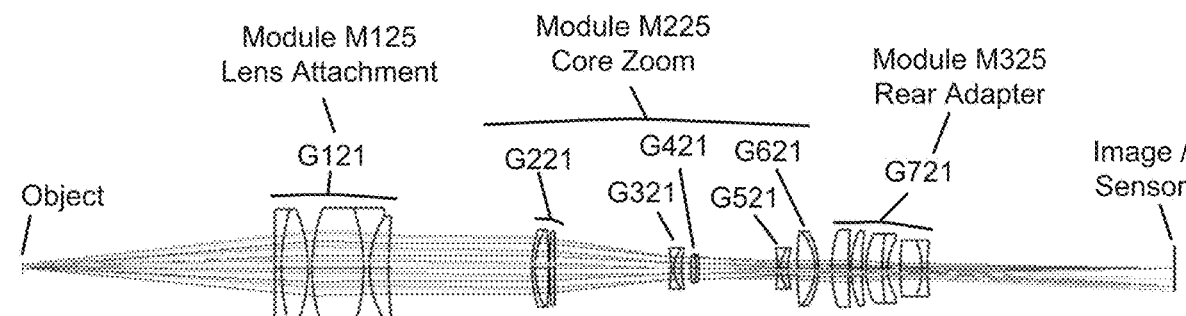

Table 21 includes an example optical prescription for a finite conjugate optical assembly comprising a lens attachment module m125, a core zoom module m225, and a rear adapter module m325 that may be configured in accordance with the example embodiment that is schematically illustrated at FIGS. 25A-25C.

Figure 26A:
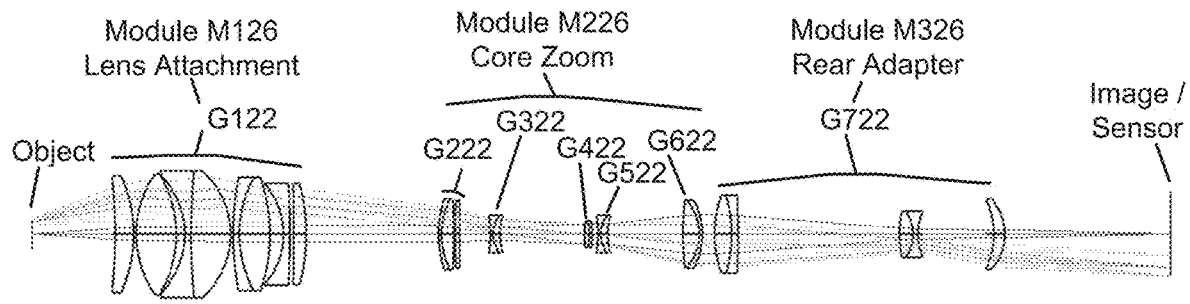
FIGS. 26A-26C schematically illustrate a finite conjugate embodiment 22 of an optical assembly arranged, respectively, for low magnification, mid magnification and high magnification, for an imaging system including three optical modules m126, m226 and m326 disposed between an object and an image sensor, including a lens attachment module m126, such as that shown and described with reference to FIG. 18 and embodiment 14, that includes a positive focal length group G122, and module m226 that includes a zooming component or a core zoom module m226, that in this example includes a 7:1 afocal zoom module that exhibits an etendue of approximately 1.57 mm²sr, such as that shown and described with reference to FIG. 6 and example embodiment 2, and includes five lens groups including a static positive group G222, a negative movable group G322, a positive static group G422, a negative movable group G522, and a static positive group G622, and a rear attachment module m326, such as that shown and described with reference to FIG. 15 and example embodiment 11, that includes a rear adapter with a positive focal length group G722, that together have a magnification range of 2.72×-19.2×, which may be configured in accordance with the example optical prescription is set forth at Table 22.
Figure 26B:
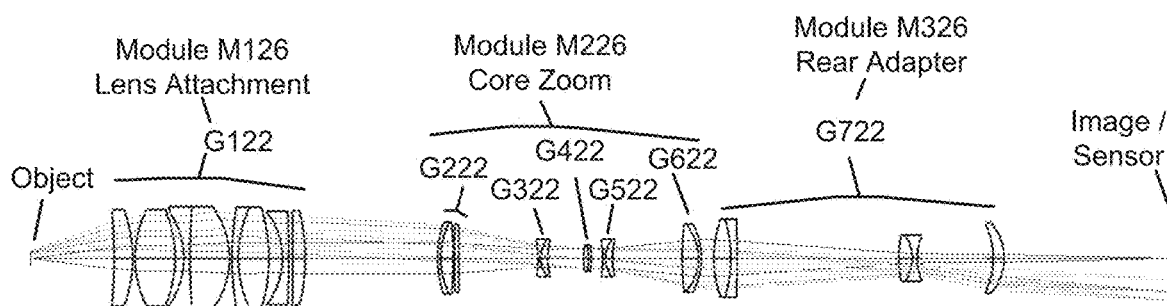
Figure 26C:
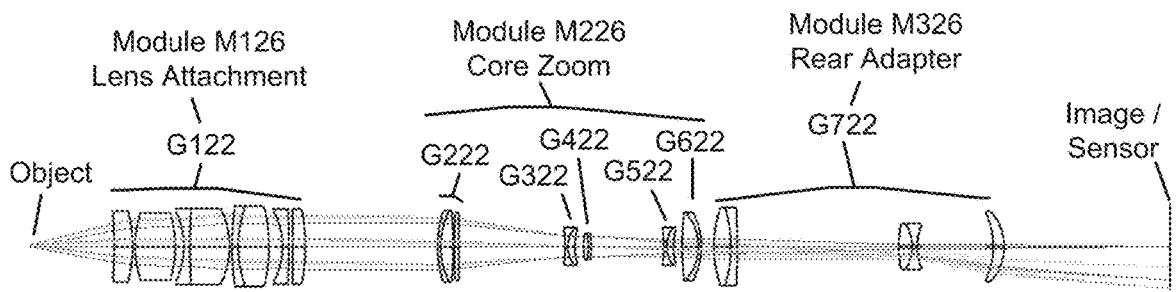

Table 22 includes an example optical prescription for a finite conjugate optical assembly comprising a lens attachment module m126, a core zoom module m226, and a rear adapter module m326 that may be configured in accordance with the example embodiment that is schematically illustrated at FIGS. 26A-26C.

Figure 27A:
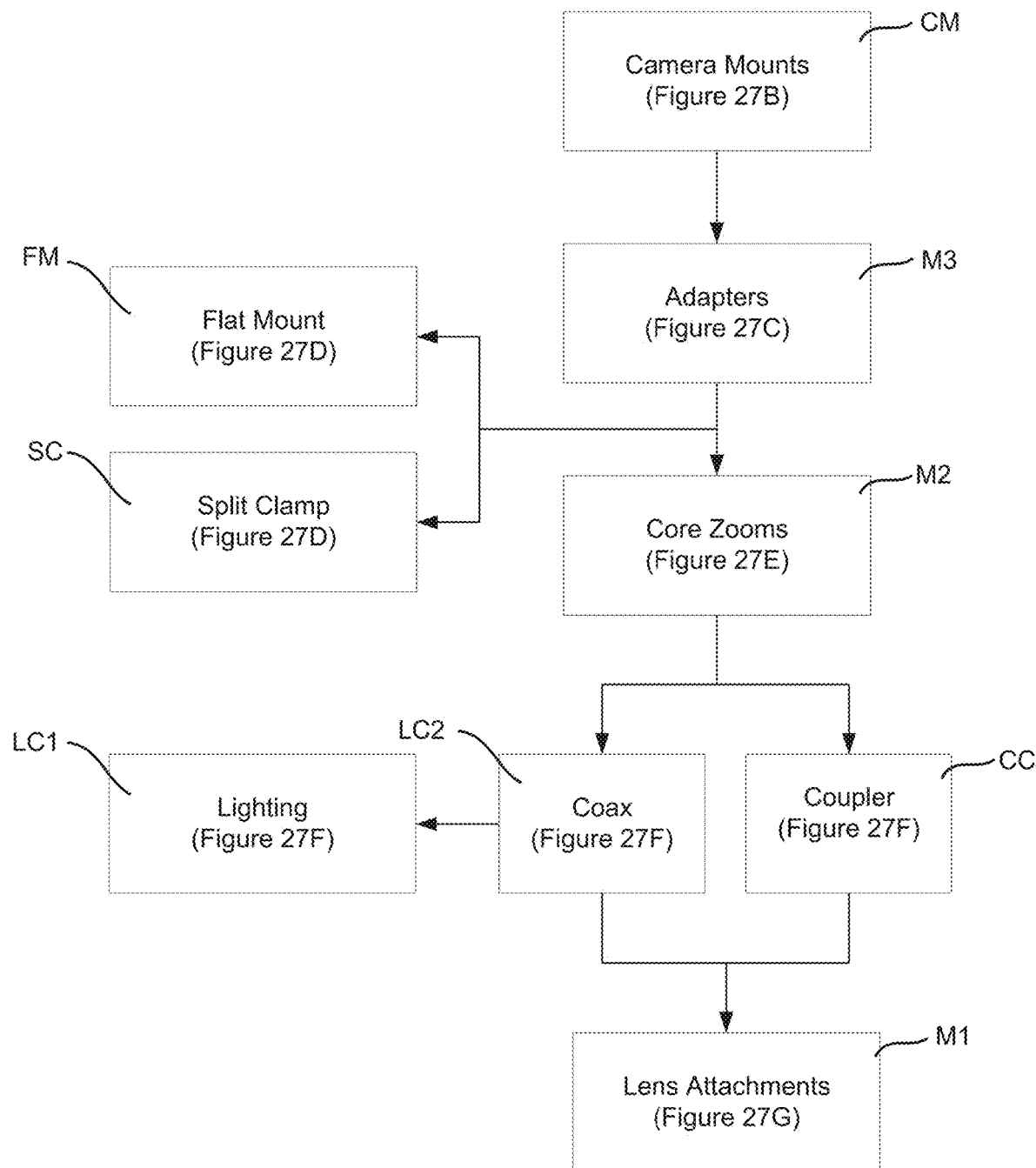
FIG. 27A schematically illustrates an example of a camera system that is configured in accordance with certain embodiments, including a camera mount cm, a rear adapter module m3, a flat mount fm or split clamp sc, a core zoom module m2, a lighting component lc, a coupler cc, and a lens attachment module m1.
Figure 27B:
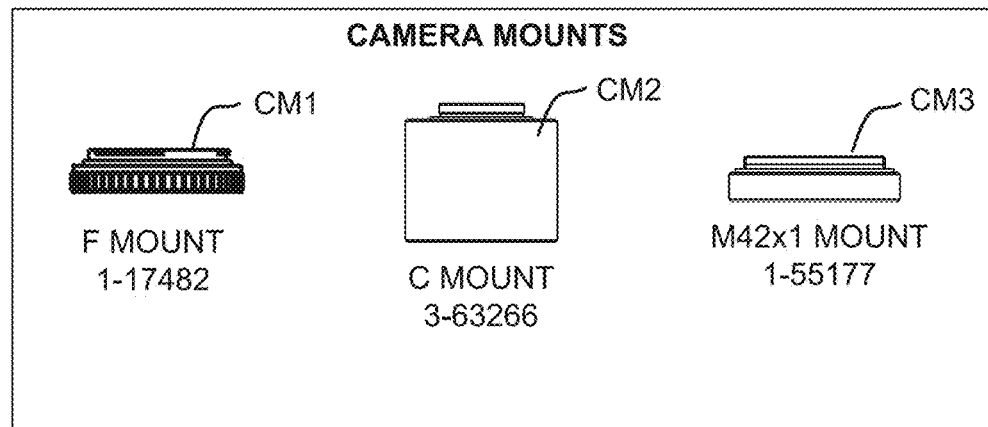
FIG. 27B schematically illustrates examples of camera mounts cm1, cm2 and cm3.
Figure 27C:
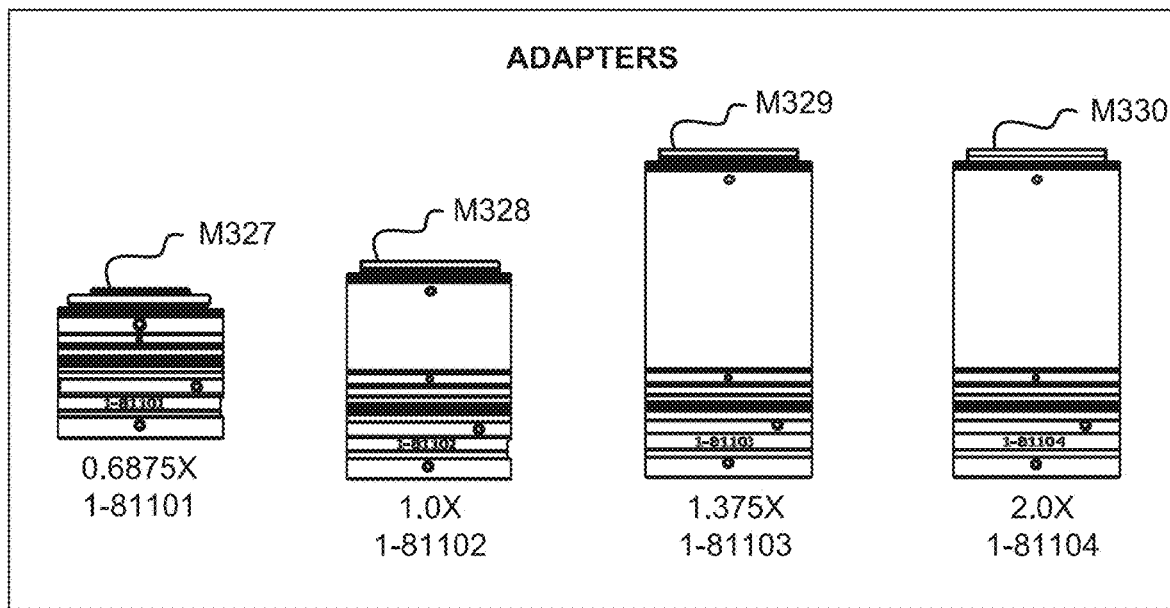
FIG. 27C schematically illustrates four examples of rear adapter modules m327, m328, m329, m330, which may be configured in accordance with Table 24.
Figure 27D:
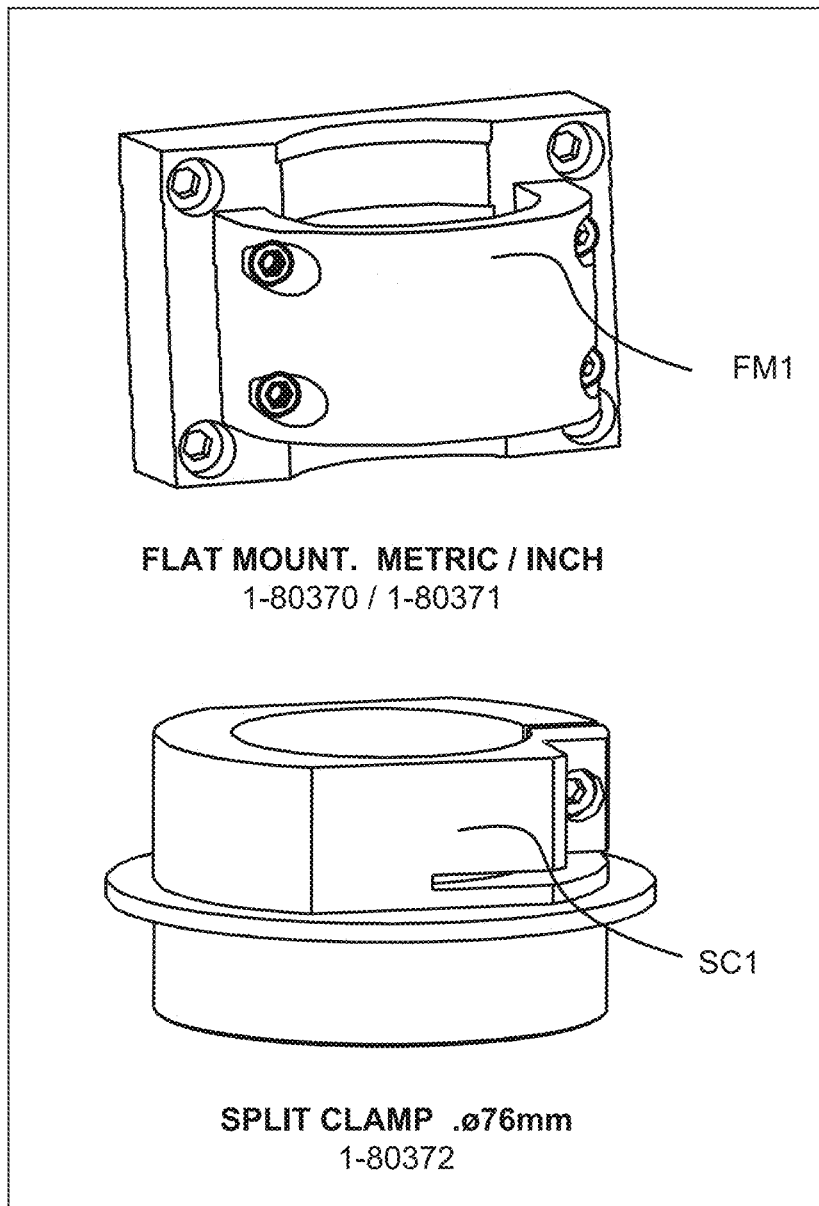
FIG. 27D schematically illustrates examples of a flat mount fm1 and split clamp sc1 in accordance with certain embodiments.
Figure 27E:
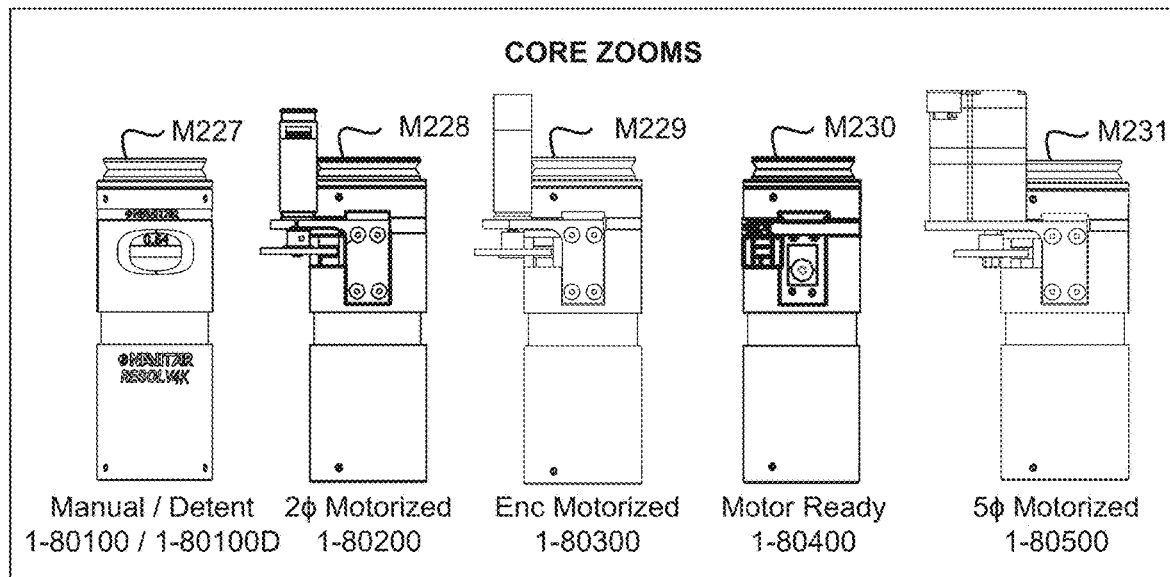
FIG. 27E schematically illustrates examples of core zoom modules m227, m228, m229, m230 and m231 in accordance with certain embodiments.
Figure 27F:
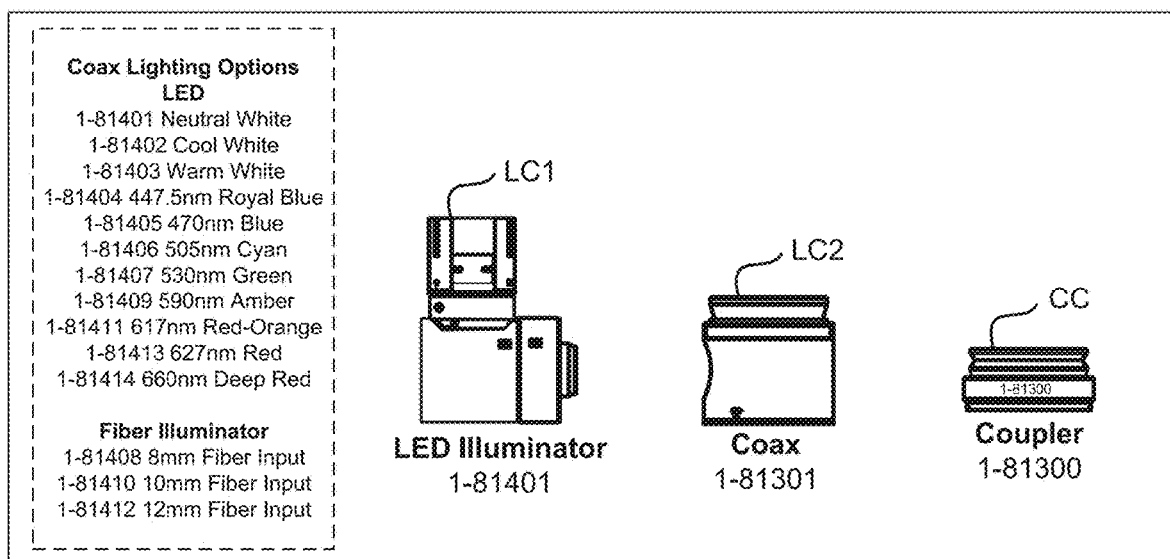
FIG. 27F schematically illustrates two lighting component options including a LED illuminator lc1, and coax lc2, and a coupler cc, in accordance with certain embodiments.
Figure 27G:
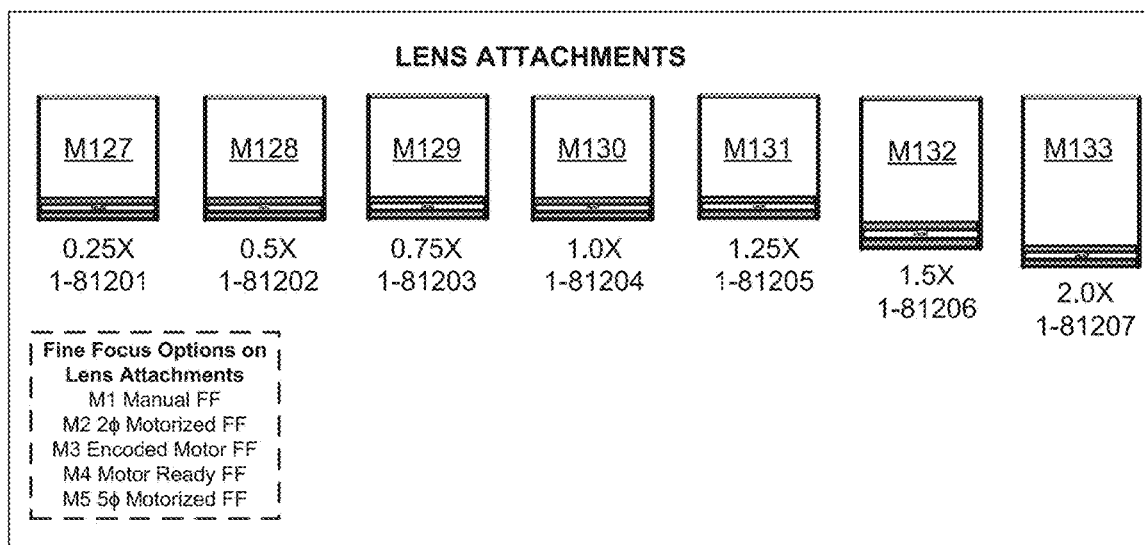
FIG. 27G schematically illustrates examples of lens attachment modules m127, m128, m129, m130, m131, m132 and m133, which may be configured in accordance with Table 23.

Table 23 includes example embodiments of lens attachments, as in FIG. 27A and/or FIG. 27G, or objectives with long working distance to focal length (WD/FL) ratio, and 16-25 mm diameter external entrance pupils disposed at 50 mm or greater distance.

Table 24 includes example embodiments of rear adapters or tube lenses, as in FIG. 27A and/or FIG. 27C, with short path length to focal length ratios, 16-25 mm diameter external entrance pupils of 50 mm or greater distance, and an approximate etendue value of 1.58 mm$^2$sr.

Table 25 includes a zoom field of view matrix in accordance with certain embodiments, representative of the modular system nature of the example embodiments schematically illustrated at FIGS. 27A-27G.

TABLE 1

Table 1: Embodiment 1

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| OBJ | Infinity | Infinity | | | | | | | | | |
| 1 | Infinity | 2.4 | | | | | | | | | |
| 2 | 388.35 | 2.5 | 1.497 | 81.5 | | | | | | | |
| 3 | −62.06 | 1 | 1.850 | 32.3 | | | | | | | |
| 4 | −92.375 | 0.5 | | | | | | | | | |
| 5 | 97.702 | 1.8 | 1.497 | 81.5 | | | | | | | |
| 6 | 1349.45 | 3 | | | | | | | | | |
| 7 | Infinity | Zm1 | | | Zm1: | 0.500 | 14.659 | 26.163 | 31.886 | 36.126 | 37.508 |
| 8 | −84.35 | 1 | 1.595 | 67.7 | | | | | | | |
| 9 | 13.84 | 2 | 1.738 | 32.3 | | | | | | | |
| 10 | 23.37 | 3 | | | | | | | | | |
| 11 | Infinity | Zm2 | | | Zm2: | 69.697 | 49.483 | 29.484 | 19.640 | 9.736 | 0.500 |
| 12 | 45.19 | 1 | 1.804 | 39.6 | | | | | | | |
| 13 | 24.29 | 2.284 | | | | | | | | | |
| STO | 19.674 | 3.2 | 1.487 | 70.2 | | | | | | | |
| 15 | −16.044 | 0.939 | | | | | | | | | |
| 16 | −14.77 | 1 | 1.804 | 39.6 | | | | | | | |
| 17 | −25.146 | Zm3 | | | Zm3: | 0.500 | 4.054 | 11.753 | 17.680 | 29.562 | 47.218 |
| 18 | −56.309 | 1 | 1.607 | 56.8 | | | | | | | |
| 19 | 15.155 | 1.7 | 1.728 | 28.3 | | | | | | | |
| 20 | 31.2 | Zm4 | | | Zm4: | 15.030 | 17.493 | 18.189 | 16.678 | 10.331 | 0.446 |
| 21 | Infinity | 3 | | | | | | | | | |
| 22 | −35.916 | 1.5 | 1.691 | 54.8 | | | | | | | |
| 23 | −52.092 | 0.5 | | | | | | | | | |
| 24 | −150.11 | 4.5 | 1.603 | 65.4 | | | | | | | |
| 25 | −15.155 | 1 | 1.697 | 48.5 | | | | | | | |
| 26 | −27.94 | 0.5 | | | | | | | | | |
| 27 | Infinity | 2.4 | | | | | | | | | |
| IMA | Infinity | | | | | | | | | | |

TABLE 2

Table 2: Embodiment 2

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| OBJ | Infinity | Infinity | | | | | | | | | |
| 1 | Infinity | 2.5 | | | | | | | | | |
| 2 | 46.34 | 1.2 | 1.740 | 28.3 | | | | | | | |
| 3 | 31.72 | 5 | 1.439 | 94.7 | | | | | | | |
| 4 | −228.526 | 0.5 | | | | | | | | | |
| 5 | 228.526 | 1.8 | 1.717 | 29.5 | | | | | | | |
| 6 | Infinity | 3 | | | | | | | | | |
| 7 | Infinity | Zm1 | | | Zm1: | 9.684 | 18.902 | 29.333 | 33.731 | 38.794 | 40.334 |
| 8 | −47.673 | 1.1 | 1.618 | 63.3 | | | | | | | |
| 9 | 12.423 | 2.8 | 1.749 | 35.3 | | | | | | | |
| 10 | 26.395 | 3 | | | | | | | | | |
| 11 | Infinity | Zm2 | | | Zm2: | 31.148 | 21.930 | 11.499 | 7.100 | 2.037 | 0.498 |
| STO | 37.82 | 2 | 1.439 | 94.7 | | | | | | | |
| 13 | −27.352 | 1.1 | 1.852 | 40.8 | | | | | | | |
| 14 | −46.34 | Zm3 | | | Zm3: | 0.400 | 0.488 | 2.659 | 5.326 | 13.533 | 27.375 |
| 15 | Infinity | 2 | | | | | | | | | |
| 16 | −47.673 | 1.1 | 1.618 | 63.3 | | | | | | | |
| 17 | 12.423 | 2.8 | 1.749 | 35.3 | | | | | | | |
| 18 | 26.395 | Zm4 | | | Zm4: | 27.471 | 27.383 | 25.212 | 22.545 | 14.339 | 0.496 |
| 19 | Infinity | 3 | | | | | | | | | |
| 20 | 126.6 | 6.6 | 1.439 | 94.7 | | | | | | | |
| 21 | −21.048 | 1.2 | 1.786 | 44.2 | | | | | | | |

TABLE 2-continued

Table 2: Embodiment 2

| Surf | Radius | Thickness | Glass Nd | Glass vd | Mag. 1 | Mag. 2 | Mag. 3 | Mag. 4 | Mag. 5 | Mag. 6 |
|---|---|---|---|---|---|---|---|---|---|---|
| 22 | −29.59 | 0.5 | | | | | | | | |
| 23 | Infinity | 2 | | | | | | | | |
| IMA | Infinity | | | | | | | | | |

TABLE 3

Table 3: Embodiment 3

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| OBJ | Infinity | Infinity | | | | | | | | | |
| 1 | Infinity | 2.4 | | | | | | | | | |
| 2 | 108.23 | 4.8 | 1.595 | 67.7 | | | | | | | |
| 3 | −77.5 | 1 | 1.720 | 34.7 | | | | | | | |
| 4 | −259.592 | 2 | | | | | | | | | |
| 5 | Infinity | Zm1 | | | Zm1: | 0.500 | 24.673 | 48.242 | 61.282 | 76.910 | 90.166 |
| 6 | −34.798 | 1.5 | 1.904 | 31.3 | | | | | | | |
| 7 | −20 | 1 | 1.618 | 63.4 | | | | | | | |
| 8 | 57.864 | 1 | | | | | | | | | |
| 9 | Infinity | Zm2 | | | Zm2: | 33.316 | 39.214 | 24.960 | 12.126 | 1.053 | 1.000 |
| 10 | 76.14 | 1.4 | 1.517 | 52.2 | | | | | | | |
| 11 | −86.1 | 1 | 1.620 | 60.3 | | | | | | | |
| STO | 70.78 | Zm3 | | | Zm3: | 58.325 | 18.130 | 2.500 | 2.000 | 1.500 | 1.000 |
| 13 | −119.562 | 1 | 1.735 | 48.8 | | | | | | | |
| 14 | 74.48 | 2 | 1.717 | 29.5 | | | | | | | |
| 15 | 1246.12 | Zm4 | | | Zm4: | 0.500 | 10.629 | 16.941 | 17.241 | 13.174 | 0.500 |
| 16 | Infinity | 2 | | | | | | | | | |
| 17 | 119.14 | 1 | 1.747 | 51.0 | | | | | | | |
| 18 | 51.212 | 6.8 | 1.595 | 67.7 | | | | | | | |
| 19 | −32.71 | 2.7 | 1.954 | 32.3 | | | | | | | |
| 20 | −47.21 | 0.5 | | | | | | | | | |
| 21 | Infinity | 2.4 | | | | | | | | | |
| IMA | Infinity | | | | | | | | | | |

TABLE 4

Table 4: Embodiment 4

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| OBJ | Infinity | Infinity | | | | | | | | | |
| 1 | Infinity | 2.4 | | | | | | | | | |
| 2 | 135.2191 | 6 | 1.497 | 81.5 | | | | | | | |
| 3 | −81.23256 | 3 | 1.804 | 46.5 | | | | | | | |
| 4 | −579.2985 | 0.5 | | | | | | | | | |
| 5 | 100.1953 | 6 | 1.497 | 81.5 | | | | | | | |
| 6 | −71.67808 | 3 | 1.729 | 54.7 | | | | | | | |
| 7 | −119.92 | Zm1 | | | Zm1: | 10.729 | 30.432 | 47.364 | 59.288 | 70.534 | 71.656 |
| 8 | −88.39807 | 1.9 | 1.567 | 42.8 | | | | | | | |
| 9 | −27.90612 | 1.1 | 1.595 | 67.7 | | | | | | | |
| 10 | 14.66054 | 1.9 | 1.804 | 39.6 | | | | | | | |
| 11 | 23.61669 | 1 | | | | | | | | | |
| 12 | Infinity | Zm2 | | | Zm2: | 53.224 | 33.736 | 17.765 | 8.952 | 1.648 | 0.212 |
| 13 | 27.89249 | 1.5 | 1.573 | 57.7 | | | | | | | |
| 14 | −34.59251 | 1.1 | 1.852 | 40.8 | | | | | | | |
| STO | 225.5134 | Zm3 | | | Zm3: | 1.277 | 0.600 | 0.500 | 0.600 | 9.842 | 22.504 |
| 16 | −61.20832 | 1.1 | 1.678 | 55.3 | | | | | | | |
| 17 | 8.628543 | 1.4 | 1.750 | 35.0 | | | | | | | |
| 18 | 23.21423 | Zm4 | | | Zm4: | 29.470 | 29.933 | 29.071 | 25.861 | 12.674 | 0.335 |
| 19 | Infinity | 1 | | | | | | | | | |
| 20 | 74.38562 | 2 | 1.697 | 55.5 | | | | | | | |
| 21 | 38.11623 | 6.4 | 1.497 | 81.6 | | | | | | | |
| 22 | −21.07531 | 2 | 1.800 | 42.2 | | | | | | | |
| 23 | −31.16009 | 0.5 | | | | | | | | | |
| 24 | Infinity | 2.4 | | | | | | | | | |
| IMA | Infinity | | | | | | | | | | |

TABLE 5

Table 5: Embodiment 5

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| OBJ | Infinity | Infinity | | | | | | | | | |
| 1 | Infinity | 2.4 | | | | | | | | | |
| 2 | 113.296 | 3.5 | 1.497 | 81.5 | | | | | | | |
| 3 | −504.077 | 0.5 | | | | | | | | | |
| 4 | 154.500 | 3.5 | 1.595 | 67.7 | | | | | | | |
| 5 | −171.549 | 1.2 | 1.720 | 34.7 | | | | | | | |
| 6 | 401.168 | 2 | | | | | | | | | |
| 7 | Infinity | Zm1 | | | Zm1: | 0.619 | 23.634 | 46.431 | 59.060 | 74.210 | 86.962 |
| 8 | −32.365 | 1.4 | 1.904 | 31.3 | | | | | | | |
| 9 | −20.802 | 1 | 1.538 | 74.7 | | | | | | | |
| 10 | 83.958 | 1 | 1.755 | 52.3 | | | | | | | |
| 11 | 52.894 | 2 | | | | | | | | | |
| 12 | Infinity | Zm2 | | | Zm2: | 17.208 | 41.762 | 23.536 | 11.397 | 0.795 | 0.349 |
| 13 | −638.587 | 1.2 | 1.548 | 45.8 | | | | | | | |
| 14 | −53.959 | 1.1 | 1.697 | 55.5 | | | | | | | |
| STO | 1300.245 | Zm3 | | | Zm3: | 70.613 | 10.074 | 1.723 | 1.708 | 1.733 | 1.500 |
| 16 | −91.693 | 1.1 | 1.755 | 52.3 | | | | | | | |
| 17 | 114.822 | 3.75 | 1.717 | 29.5 | | | | | | | |
| 18 | −862.236 | Zm4 | | | Zm4: | 0.465 | 13.431 | 17.236 | 16.767 | 12.160 | 0.131 |
| 19 | Infinity | 2 | | | | | | | | | |
| 20 | 318.815 | 4.5 | 1.497 | 81.5 | | | | | | | |
| 21 | −72.280 | 0.5 | | | | | | | | | |
| 22 | −305.721 | 6 | 1.595 | 67.7 | | | | | | | |
| 23 | −40.649 | 1.2 | 1.954 | 32.3 | | | | | | | |
| 24 | −61.690 | 0.5 | | | | | | | | | |
| 25 | Infinity | 2.4 | | | | | | | | | |
| IMA | Infinity | | | | | | | | | | |

TABLE 6

Table 6: Embodiment 6

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| OBJ | Infinity | Infinity | | | | | | | | | |
| 1 | Infinity | 2.5 | | | | | | | | | |
| 2 | 42.042 | 3 | 1.773 | 49.6 | | | | | | | |
| 3 | 29.74 | 8.6 | 1.439 | 94.7 | | | | | | | |
| 4 | −55.7 | 3 | 1.713 | 53.9 | | | | | | | |
| 5 | −101.2224 | 3 | | | | | | | | | |
| 6 | Infinity | Zm1 | | | Zm1: | 25.619 | 25.844 | 34.664 | 47.811 | 52.668 | 55.064 |
| 7 | 72.61 | 5.7 | 1.613 | 44.5 | | | | | | | |
| 8 | −20.54 | 1.2 | 1.678 | 55.6 | | | | | | | |
| 9 | 28.25 | 1.5 | | | | | | | | | |
| 10 | −64.593 | 1.1 | 1.678 | 55.6 | | | | | | | |
| 11 | 8.2 | 2.7 | 1.720 | 34.7 | | | | | | | |
| 12 | 26.61 | 3 | | | | | | | | | |
| 13 | Infinity | Zm2 | | | Zm2: | 8.283 | 40.047 | 35.039 | 19.297 | 8.449 | 0.500 |
| STO | 27.18 | 3 | 1.523 | 51.5 | | | | | | | |
| 15 | −11.3 | 1.7 | 1.728 | 28.3 | | | | | | | |
| 16 | −23.04 | Zm3 | | | Zm3: | 0.500 | 8.955 | 12.151 | 19.426 | 25.099 | 30.541 |
| 17 | Infinity | 2.35 | | | | | | | | | |
| 18 | −53.49 | 1.5 | 1.773 | 49.6 | | | | | | | |
| 19 | 13.84 | 5 | 1.501 | 56.4 | | | | | | | |
| 20 | −11.123 | 0.4 | | | | | | | | | |
| 21 | −12.36 | 1.1 | 1.618 | 63.3 | | | | | | | |
| 22 | 19.01 | 3 | 1.673 | 32.2 | | | | | | | |
| 23 | 324.2 | Zm4 | | | Zm4: | 52.486 | 12.043 | 5.034 | 0.355 | 0.672 | 0.784 |
| 24 | Infinity | 4.5 | | | | | | | | | |
| 25 | 91.12 | 10.5 | 1.497 | 81.6 | | | | | | | |
| 26 | −73.95 | 0.5 | | | | | | | | | |
| 27 | 516.33 | 3 | 1.713 | 53.9 | | | | | | | |
| 28 | 43 | 12.5 | 1.439 | 94.7 | | | | | | | |
| 29 | −148.321 | 2.5 | | | | | | | | | |
| IMA | Infinity | | | | | | | | | | |

TABLE 7

Table 7: Embodiment 7

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| OBJ | Infinity | Infinity | | | | | | | | | |
| 1 | Infinity | 2.5 | | | | | | | | | |
| 2 | 54.990 | 3 | 1.720 | 50.6 | | | | | | | |
| 3 | 37.559 | 8.2 | 1.439 | 94.7 | | | | | | | |
| 4 | −54.178 | 3 | 1.713 | 53.9 | | | | | | | |
| 5 | −87.440 | 3 | | | | | | | | | |
| 6 | Infinity | Zm1 | | | Zm1: | 0.500 | 14.924 | 26.496 | 32.507 | 38.532 | 38.442 |
| 7 | −79.56709 | 3.2 | 1.586 | 59.5 | | | | | | | |
| 8 | −18.374 | 1.1 | 1.595 | 67.7 | | | | | | | |
| 9 | 19.216 | 2.7 | 1.810 | 40.9 | | | | | | | |
| 10 | 35.058 | 3 | | | | | | | | | |
| 11 | Infinity | Zm2 | | | Zm2: | 40.431 | 26.006 | 14.434 | 8.423 | 2.398 | 2.489 |
| STO | 80.43011 | 2 | 1.439 | 94.7 | | | | | | | |
| 13 | −24.156 | 1.7 | 1.573 | 57.7 | | | | | | | |
| 14 | −50.488 | Zm3 | | | Zm3: | 0.300 | 1.251 | 5.305 | 10.669 | 30.273 | 43.500 |
| 15 | Infinity | 2.35 | | | | | | | | | |
| 16 | −108.919 | 1.5 | 1.678 | 55.2 | | | | | | | |
| 17 | 17.363 | 3.8 | 1.501 | 56.4 | | | | | | | |
| 18 | −23.497 | 0.496 | | | | | | | | | |
| 19 | −25.80029 | 1.1 | 1.618 | 63.3 | | | | | | | |
| 20 | 18.607 | 2.558 | 1.806 | 40.9 | | | | | | | |
| 21 | 72.384 | Zm4 | | | Zm4: | 43.898 | 42.947 | 38.893 | 33.529 | 13.925 | 0.698 |
| 22 | Infinity | 4.5 | | | | | | | | | |
| 23 | 121.957 | 3 | 1.697 | 55.5 | | | | | | | |
| 24 | 71.266 | 11.8 | 1.439 | 94.7 | | | | | | | |
| 25 | −37.03341 | 3 | 1.756 | 45.7 | | | | | | | |
| 26 | −52.25707 | 2.5 | | | | | | | | | |
| IMA | Infinity | | | | | | | | | | |

TABLE 8

Table 8: Embodiment 8

| Surf | Radius | Thickness | Glass Nd | Glass vd |
|---|---|---|---|---|
| OBJ | Infinity | Infinity | | |
| STO | Infinity | 95.358 | | |
| 2 | Infinity | 2.5 | | |
| 3 | 31.765 | 5.1 | 1.439 | 94.7 |
| 4 | 195.200 | 1 | | |
| 5 | 36.470 | 4 | 1.595 | 67.7 |
| 6 | 120.580 | 1.487 | | |
| 7 | 24.5 | 5.4 | 1.595 | 67.7 |
| 8 | 555.667 | 2 | 1.916 | 31.6 |
| 9 | 17.760 | 3.93 | | |
| 10 | 34.220 | 5.75 | 1.689 | 31.1 |
| 11 | −21.666 | 2 | 1.729 | 54.1 |
| 12 | 30.2 | 55.65778 | | |
| IMA | Infinity | | | |

TABLE 9

Table 9: Embodiment 9

| Surf | Radius | Thickness | Glass Nd | Glass vd |
|---|---|---|---|---|
| OBJ | Infinity | Infinity | | |
| STO | Infinity | 95.358 | | |
| 2 | Infinity | 2.5 | | |
| 3 | 46.440 | 6.3 | 1.439 | 94.7 |
| 4 | 200.692 | 0.962 | | |
| 5 | 35.110 | 4 | 1.595 | 67.7 |
| 6 | 105.440 | 1.483 | | |
| 7 | 29.59 | 6.1 | 1.595 | 67.7 |
| 8 | 82.340 | 2 | 1.916 | 31.6 |
| 9 | 20.700 | 4.772 | | |
| 10 | 114.310 | 8 | 1.689 | 31.1 |
| 11 | −26.610 | 2 | 1.729 | 54.1 |
| 12 | 84.24 | 92.369 | | |
| IMA | Infinity | | | |

TABLE 10

Table 10: Embodiment 10

| Surf | Radius | Thickness | Glass Nd | Glass vd |
|---|---|---|---|---|
| OBJ | Infinity | Infinity | | |
| STO | Infinity | 95.358 | | |
| 2 | Infinity | 2.5 | | |
| 3 | 28.580 | 6 | 1.439 | 94.7 |
| 4 | 1400.000 | 1.000 | | |
| 5 | 37.740 | 4.7 | 1.595 | 67.7 |
| 6 | −662.210 | 1.493 | | |
| 7 | 120.95 | 5.4 | 1.595 | 67.7 |
| 8 | 266.000 | 0.908 | | |
| 9 | −86.890 | 2.000 | 1.916 | 31.6 |
| 10 | 20.990 | 2.758 | | |
| 11 | 27.280 | 9.1 | 1.689 | 31.1 |
| 12 | −23.207 | 2.000 | 1.729 | 54.1 |
| 13 | 41.63 | 114.916 | | |
| IMA | Infinity | | | |

TABLE 11

Table 11: Embodiment 11

| Surf | Radius | Thickness | Glass Nd | Glass vd |
|---|---|---|---|---|
| OBJ | Infinity | Infinity | | |
| STO | Infinity | 95.358 | | |
| 2 | Infinity | 2.5 | | |
| 3 | 47.545 | 6.9 | 1.497 | 81.5 |
| 4 | −53.666 | 2.500 | 1.613 | 44.3 |
| 5 | −491.100 | 65.63724 | | |
| 6 | 49.070 | 5.400 | 1.626 | 35.7 |
| 7 | −17.2 | 2 | 1.804 | 46.6 |
| 8 | 22.200 | 30.77527 | | |
| 9 | −31.890 | 4.400 | 1.487 | 70.2 |
| 10 | −21.808 | 67.370 | | |
| IMA | Infinity | | | |

TABLE 12

Table 12: Embodiment 12

| Surf | Radius | Thickness | Glass Nd | Glass vd |
|---|---|---|---|---|
| OBJ | Infinity | Infinity | | |
| STO | Infinity | 117.009 | | |
| 2 | Infinity | 2.5 | | |
| 3 | 28.380 | 13.4 | 1.439 | 94.7 |
| 4 | −37.975 | 2.5 | 1.757 | 47.8 |
| 5 | −324.937 | 22.136 | | |
| 6 | 192.795 | 5.1 | 1.541 | 47.2 |
| 7 | −38.85269 | 9.675 | | |
| 8 | −19.629 | 2 | 1.804 | 46.6 |
| 9 | 122.956 | 1.654 | | |
| 10 | 51.367 | 3.2 | 1.699 | 30.1 |
| 11 | −1242.590 | 50.796 | | |
| IMA | Infinity | | | |

TABLE 13

Table 13: Embodiment 13

| Surf | Radius | Thickness | Glass Nd | Glass vd |
|---|---|---|---|---|
| OBJ | Infinity | Infinity | | |
| STO | Infinity | 117.009 | | |
| 2 | Infinity | 2.5 | | |
| 3 | 62.543 | 13.4 | 1.439 | 94.9 |
| 4 | −50.108 | 2.5 | 1.757 | 47.8 |
| 5 | −119.524 | 27.128 | | |
| 6 | 98.365 | 5.1 | 1.541 | 47.2 |
| 7 | −90.06724 | 14.917 | | |
| 8 | −70.416 | 2 | 1.804 | 46.6 |
| 9 | 48.233 | 43.830 | | |
| 10 | 104.507 | 3.2 | 1.699 | 30.1 |
| 11 | 253.408 | 102.971 | | |
| IMA | Infinity | | | |

TABLE 14

Table 14: Embodiment 14

| Surf | Radius | Thickness | Glass Nd | Glass vd |
|---|---|---|---|---|
| OBJ | Infinity | 32 | | |
| 1 | Infinity | 1.5 | | |
| 2 | −208.953 | 7.5 | 1.618 | 63.3 |
| 3 | −57.260 | 0.997 | | |
| 4 | 43.200 | 16.5 | 1.497 | 81.5 |
| 5 | −44.732 | 3.455 | | |
| 6 | −33.373 | 2.5 | 1.720 | 50.6 |
| 7 | 277.160 | 16 | 1.497 | 81.5 |
| 8 | −34.417 | 1 | | |
| 9 | 121.232 | 2.5 | 1.847 | 23.8 |
| 10 | 48.006 | 12.4 | 1.497 | 81.5 |
| 11 | −69.746 | 5.5 | | |
| 12 | −30.9 | 2.5 | 1.638 | 42.4 |
| 13 | −481 | 1.7 | | |
| 14 | −739.9 | 5 | 1.923 | 20.9 |
| 15 | −77.27 | 105.5 | | |
| 16 | Infinity | — | | |

TABLE 15

Table 15: Embodiment 15

| Surf | Radius | Thickness | Glass Nd | Glass vd |
|---|---|---|---|---|
| OBJ | Infinity | 92.60424 | | |
| 1 | Infinity | 1.5 | | |
| 2 | −1645.000 | 2.4 | 1.916 | 31.6 |
| 3 | 80.500 | 9.9 | 1.439 | 94.7 |
| 4 | −56.890 | 1.491 | | |

TABLE 15-continued

Table 15: Embodiment 15

| Surf | Radius | Thickness | Glass Nd | Glass vd |
|---|---|---|---|---|
| 5 | 65 | 19.2 | 1.801 | 35.0 |
| 6 | −69.882 | 2.2 | 1.638 | 42.4 |
| 7 | 36.350 | 7.2 | 1.439 | 94.7 |
| 8 | 202.510 | 105.5 | | |
| 9 | Infinity | — | | |

TABLE 16

Table 16: Embodiment 16

| Surf | Radius | Thickness | Glass Nd | Glass vd |
|---|---|---|---|---|
| OBJ | Infinity | 109.9136 | | |
| 1 | Infinity | 2.5 | | |
| 2 | 121.856 | 2.5 | 1.673 | 38.3 |
| 3 | 97.190 | 8.2 | 1.700 | 48.1 |
| 4 | −74.647 | 1.5 | | |
| 5 | −70 | 2.5 | 1.741 | 52.6 |
| 6 | 43.640 | 1.5 | | |
| 7 | 42.194 | 14.8 | 1.497 | 81.5 |
| 8 | −30.699 | 4.6 | 1.729 | 54.1 |
| 9 | −48.740 | 105.5 | | |
| 10 | Infinity | — | | |

TABLE 17

Table 17: Embodiment 17

| Surf | Radius | Thickness | Glass Nd | Glass vd |
|---|---|---|---|---|
| OBJ | Infinity | 187.4364 | | |
| 1 | Infinity | 3 | | |
| 2 | 199.700 | 12 | 1.439 | 94.9 |
| 3 | −32.944 | 2.5 | 1.700 | 48.1 |
| 4 | −68.562 | 1 | | |
| 5 | −121.111 | 5.5 | 1.620 | 36.4 |
| 6 | −46.239 | 2.192 | | |
| 7 | −54.448 | 2.5 | 1.613 | 44.5 |
| 8 | −189.507 | 105.5 | | |
| 9 | Infinity | — | | |

TABLE 18

Table 18: Embodiment 18

| Surf | Radius | Thickness | Glass Nd | Glass vd |
|---|---|---|---|---|
| OBJ | Infinity | 394.6556 | | |
| 1 | Infinity | 1.5 | | |
| 2 | 132.530 | 12 | 1.439 | 94.9 |
| 3 | −80.418 | 2.75 | 1.694 | 53.2 |
| 4 | 120.815 | 1 | | |
| 5 | 58.41 | 10 | 1.693 | 52.9 |
| 6 | 58.922 | 2 | | |
| 7 | 164.260 | 4.6 | 1.609 | 46.6 |
| 8 | −153.000 | 105.5 | | |
| 9 | Infinity | — | | |

TABLE 19

Table 19: Embodiment 19

| Surf | Radius | Thickness | Glass Nd | Glass vd |
|---|---|---|---|---|
| OBJ | Infinity | 130.752 | | |
| 1 | Infinity | 3 | | |
| 2 | 279.767 | 15 | 1.516 | 64.1 |

TABLE 19-continued

Table 19: Embodiment 19

| Surf | Radius | Thickness | Glass Nd | Glass vd |
|---|---|---|---|---|
| 3 | −215.149 | 148.5053 | | |
| 4 | −103.519 | 3.5 | 1.729 | 54.7 |
| 5 | 141.751 | 40.90274 | | |
| 6 | −53.354 | 2.2 | 1.697 | 55.5 |
| 7 | 84.129 | 8.2 | 1.439 | 94.7 |
| 8 | −49.677 | 0.9969684 | | |
| 9 | 111.665 | 6.9 | 1.518 | 58.9 |
| 10 | −68.612 | 105.5 | | |
| 11 | Infinity | — | | |

TABLE 20

Table 20: Embodiment 20

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| OBJ | Infinity | 187.436 | | | | | | | | | |
| 1 | Infinity | 3 | | | | | | | | | |
| 2 | 199.7 | 12 | 1.439 | 94.9 | | | | | | | |
| 3 | −32.944 | 2.5 | 1.700 | 48.1 | | | | | | | |
| 4 | −68.562 | 1 | | | | | | | | | |
| 5 | −121.111 | 5.5 | 1.620 | 36.4 | | | | | | | |
| 6 | −46.239 | 2.192 | | | | | | | | | |
| 7 | −54.448 | 2.5 | 1.613 | 44.5 | | | | | | | |
| 8 | −189.507 | 51 | | | | | | | | | |
| 9 | Infinity | 2.5 | | | | | | | | | |
| 10 | 46.34 | 1.2 | 1.740 | 28.3 | | | | | | | |
| 11 | 31.72 | 5 | 1.439 | 94.7 | | | | | | | |
| 12 | −228.526 | 0.5 | | | | | | | | | |
| 13 | 228.526 | 1.8 | 1.717 | 29.5 | | | | | | | |
| 14 | Infinity | 3 | | | | | | | | | |
| 15 | Infinity | Zm1 | | | Zm1: | 9.684 | 18.902 | 29.333 | 33.731 | 38.794 | 40.334 |
| 16 | −47.673 | 1.1 | 1.618 | 63.3 | | | | | | | |
| 17 | 12.423 | 2.8 | 1.749 | 35.3 | | | | | | | |
| 18 | 26.395 | 3 | | | | | | | | | |
| 19 | Infinity | Zm2 | | | Zm2: | 31.148 | 21.930 | 11.499 | 7.100 | 2.037 | 0.498 |
| STO | 37.82 | 2 | 1.439 | 94.7 | | | | | | | |
| 21 | −27.352 | 1.1 | 1.852 | 40.8 | | | | | | | |
| 22 | −46.34 | Zm3 | | | Zm3: | 0.400 | 0.488 | 2.659 | 5.326 | 13.533 | 27.375 |
| 23 | Infinity | 2 | | | | | | | | | |
| 24 | −47.673 | 1.1 | 1.618 | 63.3 | | | | | | | |
| 25 | 12.423 | 2.8 | 1.749 | 35.3 | | | | | | | |
| 26 | 26.395 | Zm4 | | | Zm4: | 27.471 | 27.383 | 25.212 | 22.545 | 14.339 | 0.496 |
| 27 | Infinity | 3 | | | | | | | | | |
| 28 | 126.6 | 6.6 | 1.439 | 94.7 | | | | | | | |
| 29 | −21.048 | 1.2 | 1.786 | 44.2 | | | | | | | |
| 30 | −29.59 | 5 | | | | | | | | | |
| 31 | 46.44 | 6.3 | 1.439 | 94.7 | | | | | | | |
| 32 | 200.692 | 0.962 | | | | | | | | | |
| 33 | 35.11 | 4 | 1.595 | 67.7 | | | | | | | |
| 34 | 105.44 | 1.483 | | | | | | | | | |
| 35 | 29.59 | 6.1 | 1.595 | 67.7 | | | | | | | |
| 36 | 82.34 | 2 | 1.916 | 31.6 | | | | | | | |
| 37 | 20.7 | 4.768 | | | | | | | | | |
| 38 | 114.31 | 8 | 1.689 | 31.1 | | | | | | | |
| 39 | −26.61 | 2 | 1.729 | 54.1 | | | | | | | |
| 40 | 84.24 | 92.3718 | | | | | | | | | |
| IMA | Infinity | | | | | | | | | | |

TABLE 21

Table 21: Embodiment 21

| Surf | Radius | Thickness | Glass Nd | Glass vd | Mag. 1 | Mag. 2 | Mag. 3 | Mag. 4 | Mag. 5 | Mag. 6 |
|---|---|---|---|---|---|---|---|---|---|---|
| OBJ | Infinity | 92.604 | | | | | | | | |
| 1 | Infinity | 1.5 | | | | | | | | |
| 2 | −1645 | 2.4 | 1.916 | 31.6 | | | | | | |
| 3 | 80.5 | 9.9 | 1.439 | 94.7 | | | | | | |
| 4 | −56.89 | 1.491 | | | | | | | | |
| 5 | 65 | 19.2 | 1.801 | 35.0 | | | | | | |
| 6 | −69.882 | 2.2 | 1.638 | 42.4 | | | | | | |
| 7 | 36.35 | 7.2 | 1.439 | 94.7 | | | | | | |
| 8 | 202.51 | 51 | | | | | | | | |
| 9 | Infinity | 2.5 | | | | | | | | |
| 10 | 46.34 | 1.2 | 1.740 | 28.3 | | | | | | |

TABLE 21-continued

Table 21: Embodiment 21

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| 11 | 31.72 | 5 | 1.439 | 94.7 | | | | | | | |
| 12 | −228.526 | 0.5 | | | | | | | | | |
| 13 | 228.526 | 1.8 | 1.717 | 29.5 | | | | | | | |
| 14 | Infinity | 3 | | | | | | | | | |
| 15 | Infinity | Zm1 | | | Zm1: | 9.684 | 18.902 | 29.333 | 33.731 | 38.794 | 40.334 |
| 16 | −47.673 | 1.1 | 1.618 | 63.3 | | | | | | | |
| 17 | 12.423 | 2.8 | 1.749 | 35.3 | | | | | | | |
| 18 | 26.395 | 3 | | | | | | | | | |
| 19 | Infinity | Zm2 | | | Zm2: | 31.148 | 21.930 | 11.499 | 7.100 | 2.037 | 0.498 |
| STO | 37.82 | 2 | 1.439 | 94.7 | | | | | | | |
| 21 | −27.352 | 1.1 | 1.852 | 40.8 | | | | | | | |
| 22 | −46.34 | Zm3 | | | Zm3: | 0.400 | 0.488 | 2.659 | 5.326 | 13.533 | 27.375 |
| 23 | Infinity | 2 | | | | | | | | | |
| 24 | −47.673 | 1.1 | 1.618 | 63.3 | | | | | | | |
| 25 | 12.423 | 2.8 | 1.749 | 35.3 | | | | | | | |
| 26 | 26.395 | Zm4 | | | Zm4: | 27.471 | 27.383 | 25.212 | 22.545 | 14.339 | 0.496 |
| 27 | Infinity | 3 | | | | | | | | | |
| 28 | 126.6 | 6.6 | 1.439 | 94.7 | | | | | | | |
| 29 | −21.048 | 1.2 | 1.786 | 44.2 | | | | | | | |
| 30 | −29.59 | 5 | | | | | | | | | |
| 31 | 46.44 | 6.3 | 1.439 | 94.7 | | | | | | | |
| 32 | 200.692 | 0.962 | | | | | | | | | |
| 33 | 35.11 | 4 | 1.595 | 67.7 | | | | | | | |
| 34 | 105.44 | 1.483 | | | | | | | | | |
| 35 | 29.59 | 6.1 | 1.595 | 67.7 | | | | | | | |
| 36 | 82.34 | 2 | 1.916 | 31.6 | | | | | | | |
| 37 | 20.7 | 4.768 | | | | | | | | | |
| 38 | 114.31 | 8 | 1.689 | 31.1 | | | | | | | |
| 39 | −26.61 | 2 | 1.729 | 54.1 | | | | | | | |
| 40 | 84.24 | 92.372 | | | | | | | | | |
| IMA | Infinity | | | | | | | | | | |

TABLE 22

Table 22: Embodiment 22

| Surf | Radius | Thickness | Glass Nd | Glass vd | | Mag. 1 | Mag. 2 | Mag. 3 | Mag. 4 | Mag. 5 | Mag. 6 |
|---|---|---|---|---|---|---|---|---|---|---|---|
| OBJ | Infinity | 32.000 | | | | | | | | | |
| 1 | Infinity | 1.500 | | | | | | | | | |
| 2 | −208.953 | 7.500 | 1.618 | 63.3335 | | | | | | | |
| 3 | −57.26 | 0.997 | | | | | | | | | |
| 4 | 43.2 | 16.500 | 1.497 | 81.5459 | | | | | | | |
| 5 | −44.732 | 3.455 | | | | | | | | | |
| 6 | −33.373 | 2.5 | 1.72003 | 50.6222 | | | | | | | |
| 7 | 277.16 | 16 | 1.497 | 81.5 | | | | | | | |
| 8 | −34.417 | 1 | | | | | | | | | |
| 9 | 121.232 | 2.5 | 1.84666 | 23.8 | | | | | | | |
| 10 | 48.006 | 12.4 | 1.497 | 81.5 | | | | | | | |
| 11 | −69.746 | 5.5 | | | | | | | | | |
| 12 | −30.9 | 2.5 | 1.638 | 42.4 | | | | | | | |
| 13 | −481 | 1.7 | | | | | | | | | |
| 14 | −739.9 | 5 | 1.92286 | 20.9 | | | | | | | |
| 15 | −77.27 | 51 | | | | | | | | | |
| 16 | Infinity | 2.5 | | | | | | | | | |
| 17 | 46.34 | 1.2 | 1.74 | 28.3 | | | | | | | |
| 18 | 31.72 | 5 | 1.439 | 94.7 | | | | | | | |
| 19 | −228.526 | 0.5 | | | | | | | | | |
| 20 | 228.526 | 1.8 | 1.71736 | 29.5 | | | | | | | |
| 21 | Infinity | 3 | | | | | | | | | |
| 22 | Infinity | Zm1 | | | Zm1: | 9.684 | 18.902 | 29.333 | 33.731 | 38.794 | 40.334 |
| 23 | −47.673 | 1.1 | 1.618 | 63.3 | | | | | | | |
| 24 | 12.423 | 2.8 | 1.7495 | 35.3 | | | | | | | |
| 25 | 26.395 | 3 | | | | | | | | | |
| 26 | Infinity | Zm2 | | | Zm2: | 31.148 | 21.930 | 11.499 | 7.100 | 2.037 | 0.498 |
| STO | 37.82 | 2 | 1.43875 | 94.7 | | | | | | | |
| 28 | −27.352 | 1.1 | 1.8515 | 40.8 | | | | | | | |
| 29 | −46.34 | Zm3 | | | Zm3: | 0.400 | 0.488 | 2.659 | 5.326 | 13.533 | 27.375 |
| 30 | Infinity | 2 | | | | | | | | | |
| 31 | −47.673 | 1.1 | 1.618 | 63.3 | | | | | | | |
| 32 | 12.423 | 2.8 | 1.7495 | 35.3 | | | | | | | |
| 33 | 26.395 | Zm4 | | | Zm4: | 27.471 | 27.383 | 25.212 | 22.545 | 14.339 | 0.496 |
| 34 | Infinity | 3 | | | | | | | | | |

TABLE 22-continued

Table 22: Embodiment 22

| Surf | Radius | Thickness | Glass Nd | Glass vd | Mag. 1 | Mag. 2 | Mag. 3 | Mag. 4 | Mag. 5 | Mag. 6 |
|---|---|---|---|---|---|---|---|---|---|---|
| 35 | 126.6 | 6.6 | 1.43875 | 94.7 | | | | | | |
| 36 | −21.048 | 1.2 | 1.786 | 44.2 | | | | | | |
| 37 | −29.59 | 5 | | | | | | | | |
| 38 | 47.545 | 6.9 | 1.497 | 81.5 | | | | | | |
| 39 | −53.666 | 2.5 | 1.6134 | 44.3 | | | | | | |
| 40 | −491.1 | 65.6372 | | | | | | | | |
| 41 | 49.07 | 5.4 | 1.626 | 35.7 | | | | | | |
| 42 | −17.2 | 2 | 1.804 | 46.6 | | | | | | |
| 43 | 22.2 | 30.7753 | | | | | | | | |
| 44 | −31.89 | 4.4 | 1.487 | 70.2 | | | | | | |
| 45 | −21.808 | 67.370 | | | | | | | | |
| IMA | Infinity | | | | | | | | | |

TABLE 23

| Part # | Description | F1(mm) | W.D. (mm) | W.D./F1 |
|---|---|---|---|---|
| 1-81201 | 0.25X | 400 | 356 | 0.89 |
| 1-81202 | 0.5X | 200 | 174 | 0.87 |
| 1-81203 | 0.75X | 133.33 | 100 | 0.75 |
| 1-81204 | 1X | 100 | 90 | 0.9 |
| 1-81205 | 1.25X | 80 | 72 | 0.9 |
| 1-81206 | 1.5X | 65 | 45 | 0.69 |
| 1-81207 | 2X | 50 | 30 | 0.6 |

TABLE 24

| Part # | Desc. | Format | Sensor Diag (Dim C) (mm) | total barrel track (mm) | Path Length D3 (Dim. B) (mm) | Focal Length F3 (Dim. A) (mm) | D3/F3 ratio |
|---|---|---|---|---|---|---|---|
| 1-81101 | 0.6875X | 2/3" | 11 | 45.9 | 95 | 110 | 0.864 |
| 1-81102 | 1X | 1" | 16 | 66.3 | 117.5 | 160 | 0.734 |
| 1-81103 | 1.375X | 4/3" | 22 | 100.8 | 147.5 | 220 | 0.67 |
| 1-81104 | 2X | 32 mm | 32 | 101 | 192.5 | 320 | 0.602 |
| 1-81105 | 2.75X | Full Frame | 44 | 125 | 248.909 | 440 | 0.566 |
| 1-81106 | 3.375X | 54 mm | 54 | 150 | 295.559 | 540 | 0.547 |
| 1-81107 | 4X | 64 mm | 64 | 175 | 342.209 | 640 | 0.535 |

TABLE 25

Resolv4K Zoom Field of View Matrix

| | | | Rear Adapter Mag | | | | | | | |
|---|---|---|---|---|---|---|---|---|---|---|
| | | | 0.6875 X | | 1 X | | 1.375 X | | 2 X | |
| | | | Ideal Camera Format | | | | | | | |
| | | | 2/3" | | 1" | | 4/3" | | 32 mm (APS) | |
| | | | Pixel Resolution (µm) | | | | | | | |
| Lens Attachment | W.D. (mm) | Format | 2.24 Low | 5.47 High | 3.26 Low | 7.95 High | 4.48 Low | 10.93 High | 6.51 Low | 15.90 High | Resolution Limit (µm) | DOF (mm) |
| 0.25 NA Low 0.0082 NA High 0.0238 | 359.5 | Mag. (X) 1/2" 2/3" 1" 4/3" 32 mm | 0.110 72.73 100.0 — — — | 0.773 10.34 14.22 — — — | 0.160 50.00 68.75 100.0 — — | 1.125 7.11 9.78 14.22 — — | 0.220 36.36 50.00 72.73 100.0 — | 1.547 5.17 7.11 10.34 14.22 — | 0.320 25.00 34.38 50.00 68.75 100.0 | 2.250 3.56 4.89 7.11 9.78 14.22 | Low 40.85 High 14.13 | Low 7.41 High 0.89 |
| 0.5 NA Low 0.0164 NA High 0.0475 | 173 | Mag. (X) 1/2" 2/3" 1" 4/3" 32 mm | 0.220 36.36 50.00 — — — | 1.547 5.17 7.11 — — — | 0.320 25.00 34.38 50.00 — — | 2.250 3.56 4.89 7.11 — — | 0.440 18.18 25.00 36.36 50.00 — | 3.094 2.59 3.56 5.17 7.11 — | 0.640 12.50 17.19 25.00 34.38 50.00 | 4.500 1.78 2.44 3.56 4.89 7.11 | Low 20.43 High 7.06 | Low 1.85 High 0.22 |
| 0.75 NA Low 0.0246 NA High 0.0713 | 110 | Mag. (X) 1/2" 2/3" 1" 4/3" 32 mm | 0.330 24.24 33.33 — — — | 2.320 3.45 4.74 — — — | 0.480 16.67 22.92 33.33 — — | 3.375 2.37 3.26 4.74 — — | 0.660 12.12 16.67 24.24 33.33 — | 4.641 1.72 2.37 3.45 4.74 — | 0.960 8.33 11.46 16.67 22.92 33.33 | 6.750 1.19 1.63 2.37 3.26 4.74 | Low 13.62 High 4.71 | Low 0.82 High 0.10 |

TABLE 25-continued

Resolv4K Zoom Field of View Matrix

| | | | | | | | | | | | | |
|---|---|---|---|---|---|---|---|---|---|---|---|---|
| 1 | 1-81204 | Mag. (X) | 0.440 | 3.094 | 0.640 | 4.500 | 0.880 | 6.188 | 1.280 | 9.000 | | |
| NA Low | | ½" | 18.18 | 2.59 | 12.50 | 1.78 | 9.09 | 1.29 | 6.25 | 0.89 | Low | Low |
| 0.03285 | | ⅔" | 25.00 | 3.56 | 17.19 | 2.44 | 12.50 | 1.78 | 8.59 | 1.22 | 10.21 | 0.46 |
| NA High | 90 | 1" | — | — | 25.00 | 3.56 | 18.18 | 2.59 | 12.50 | 1.78 | High | High |
| 0.095 | | 4/3" | — | — | — | — | 25.00 | 3.56 | 17.19 | 2.44 | 3.53 | 0.055 |
| | | 32 mm | — | — | — | — | — | — | 25.00 | 3.56 | | |
| 1.25 | 1-81205 | Mag. (X) | 0.550 | 3.867 | 0.800 | 5.625 | 1.100 | 7.734 | 1.600 | 11.25 | | |
| NA Low | | ½" | 14.55 | 2.07 | 10.00 | 1.42 | 7.27 | 1.03 | 5.00 | 0.71 | Low | Low |
| 0.0411 | | ⅔" | 20.00 | 2.84 | 13.75 | 1.96 | 10.00 | 1.42 | 6.88 | 0.98 | 8.17 | 0.30 |
| NA High | 72 | 1" | — | — | 20.00 | 2.84 | 14.55 | 2.07 | 10.00 | 1.42 | High | High |
| 0.1188 | | 4/3" | — | — | — | — | 20.00 | 2.84 | 13.75 | 1.96 | 2.83 | 0.035 |
| | | 32 mm | — | — | — | — | — | — | 20.00 | 2.84 | | |
| 1.5 | 1-81206 | Mag. (X) | 0.660 | 4.641 | 0.960 | 6.750 | 1.320 | 9.281 | 1.920 | 13.50 | | |
| NA Low | | ½" | 12.12 | 1.72 | 8.33 | 1.19 | 6.06 | 0.86 | 4.17 | 0.59 | Low | Low |
| 0.0493 | | ⅔" | 16.67 | 2.37 | 11.46 | 1.63 | 8.33 | 1.19 | 5.73 | 0.81 | 6.81 | 0.206 |
| NA High | 46.5 | 1" | — | — | 16.67 | 2.37 | 12.12 | 1.72 | 8.33 | 1.19 | High | High |
| 0.1425 | | 4/3" | — | — | — | — | 16.67 | 2.37 | 11.46 | 1.63 | 2.35 | 0.025 |
| | | 32 mm | — | — | — | — | — | — | 16.67 | 2.37 | | |
| 2 | 1-81207 | Mag. (X) | 0.880 | 6.188 | 1.280 | 9.000 | 1.760 | 12.38 | 2.560 | 18.00 | | |
| NA Low | | ½" | 9.09 | 1.29 | 6.25 | 0.89 | 4.55 | 0.65 | 3.13 | 0.44 | Low | Low |
| 0.0657 | | ⅔" | 12.50 | 1.78 | 8.59 | 1.22 | 6.25 | 0.89 | 4.30 | 0.61 | 5.11 | 0.116 |
| NA High | 32 | 1" | — | — | 12.50 | 1.78 | 9.09 | 1.29 | 6.25 | 0.89 | High | High |
| 0.1900 | | 4/3" | — | — | — | — | 12.50 | 1.78 | 8.59 | 1.22 | 1.77 | 0.014 |
| | | 32 mm | — | — | — | — | — | — | 12.50 | 1.78 | | |

UltraZoom

| | | | Rear Adapter Mag | | | | | | | | |
|---|---|---|---|---|---|---|---|---|---|---|---|
| | | | 0.6875 X | | 1 X | | 1.375 X | | 2 X | | |
| | | | Ideal Camera Format | | | | | | | | |
| | | | ⅔" | | 1" | | 4/3" | | 32 mm (APS) | | |
| | | | Pixel Resolution (μm) | | | | | | | | |
| Lens Attachment | W.D. (mm) | Format | 2.24 Low | 5.47 High | 3.26 Low | 7.95 High | 4.48 Low | 10.93 High | 6.51 Low | 15.90 High | Resolution Limit (μm) | DOF (μm) |
| 2 | 1-55075 | Mag. (X) | 0.880 | 6.188 | 1.280 | 9.000 | 1.760 | 12.38 | 2.560 | 18.00 | | |
| NA Low | Nav 4X | ½" | 8.10 | 1.29 | 6.25 | 0.89 | 4.55 | 0.65 | 3.13 | 0.44 | Low | Low |
| 0.0657 | | ⅔" | 8.10 | 1.78 | 8.10 | 1.22 | 6.25 | 0.89 | 4.30 | 0.61 | 5.11 | 116 |
| NA High | 20 | 1" | — | — | 8.10 | 1.78 | 8.10 | 1.29 | 6.25 | 0.89 | High | High |
| 0.1900 | | 4/3" | — | — | — | — | 8.10 | 1.78 | 8.10 | 1.22 | 1.77 | 14 |
| | | 32 mm | — | — | — | — | — | — | 8.10 | 1.78 | | |
| 3 | | Mag. (X) | 1.320 | 9.281 | 1.920 | 13.50 | 2.640 | 18.56 | 3.840 | 27.00 | | |
| NA Low | Nav 6X | ½" | 6.06 | 0.86 | 4.17 | 0.59 | 3.03 | 0.43 | 2.08 | 0.30 | Low | Low |
| 0.0986 | | ⅔" | 6.25 | 1.19 | 5.73 | 0.81 | 4.17 | 0.59 | 2.86 | 0.41 | 3.40 | 51 |
| NA High | 25 | 1" | — | — | 6.25 | 1.19 | 6.06 | 0.86 | 4.17 | 0.59 | High | High |
| 0.2850 | | 4/3" | — | — | — | — | 6.25 | 1.19 | 5.73 | 0.81 | 1.18 | 6.2 |
| | | 32 mm | — | — | — | — | — | — | 6.25 | 1.19 | | |
| 5 | 1-55227 | Mag. (X) | 2.200 | 15.47 | 3.200 | 22.50 | 4.400 | 30.94 | 6.400 | 45.00 | | |
| NA Low | Nav 10X | ½" | 3.20 | 0.52 | 2.50 | 0.36 | 1.82 | 0.26 | 1.25 | 0.18 | Low | Low |
| 0.1643 | | ⅔" | 3.20 | 0.71 | 3.20 | 0.49 | 2.50 | 0.36 | 1.72 | 0.24 | 2.04 | 19 |
| NA High | 10 | 1" | — | — | 3.20 | 0.71 | 3.20 | 0.52 | 2.50 | 0.36 | High | High |
| 0.4000 | | 4/3" | — | — | — | — | 3.20 | 0.71 | 3.20 | 0.49 | 0.84 | 3.1 |
| | | 32 mm | — | — | — | — | — | — | 3.20 | 0.71 | | |
| 10 | | Mag. (X) | 4.400 | 30.94 | 6.400 | 45.00 | 8.800 | 61.88 | 12.80 | 90.00 | | |
| NA Low | Nav 20X | ½" | 1.25 | 0.26 | 1.25 | 0.18 | 0.91 | 0.13 | 0.63 | 0.09 | Low | Low |
| 0.3285 | | ⅔" | 1.25 | 0.36 | 1.25 | 0.24 | 1.25 | 0.18 | 0.86 | 0.12 | 1.02 | 4.6 |
| NA High | 10 | 1" | — | — | 1.25 | 0.36 | 1.25 | 0.26 | 1.25 | 0.18 | High | High |
| 0.5300 | | 4/3" | — | — | — | — | 1.25 | 0.36 | 1.25 | 0.24 | 0.63 | 1.8 |
| | | 32 mm | — | — | — | — | — | — | 1.25 | 0.36 | | |

DETAILED DESCRIPTIONS OF THE EMBODIMENTS

A finite conjugate camera, optical assembly, lens assembly, and/or digital microscope includes a modular optical assembly or a modular lens system. Several example embodiments are described herein that are capable of providing a range of numerical apertures or NAs across numerous sensor format sizes as well as providing zooming capability. A lens system in accordance with certain embodiments may have an advantageous amount of etendue capability, defined as the product of the pupil area and the solid angle of the field of view [Smith—Modern Optical Engineering, pg. 716, the entire book is incorporated by reference]. [Etendue=$\pi * A * \sin^2 \theta$] Eq. 1 [Bentley & Olson—Field Guide to Lens Design, pg. 120, the entire book is incorporated by reference], for a flat surface with a uniform solid angle, where A is the area of the surface and $\theta$ is the half angle of the marginal ray.

An optical design of a lens having approximate etendue of 0.95 $mm^2 sr$ or greater is provided that is configured to approximately fully utilize a 6.6MP sensor having a roughly 4:3 aspect ratio. A similarly designed optical system having an approximate etendue value of 4.65 $mm^2 sr$ is provided that is configured to approximately fully utilize a 32MP sensor having roughly a 4:3 aspect ratio. Lens etendue system values of between approximately 0.95 to 4.65 mm²sr are provided in certain embodiments of optical assemblies that are configured to approximately reach sensor limited performance on various aspect ratios of digital or analog capturing devices with 4075 to 8194 individual sensing units across the diagonal diameter of the device. These individual sensing units are commonly referred to as pixels in digital cameras. Multiple embodiments and examples are described that include etendue preserving lens systems that incorporate a ratio of highest to lowest magnification of at least 5.5:1 and have etendue values of between about 0.95 to 4.65 mm²sr.

The ratio of the highest magnification possible (M1) to the lowest magnification possible (M2) is advantageous in several different embodiments of zoom lens systems that can move continuously between the high and low magnification positions, therefore providing any magnification between the high and low values. This feature is also advantageous in embodiments including zoom lens systems that may have a continuous movement with discrete stops for specific repeatable magnification selections inside advantageous high and low magnification values.

A modular finite conjugate lens assembly is provided that includes a zooming component. The lens assembly is configured to exhibit between 0.95 and 4.65 mm²sr of etendue, and a ratio of highest to lowest magnification between 5.5:1 and 16:1. The lens assembly may exhibit a magnification 2× or more at one or more points of the zoom.

Another modular finite conjugate lens assembly is provided that includes an afocal zooming component. The lens assembly is configured to exhibit between 0.95 and 4.65 mm²sr of etendue, and a ratio of highest to lowest magnification between 5.5:1 and 16:1.

Another finite conjugate lens assembly is provided that includes modular interchangeable components, including a zooming component that includes three independently movable lens groups that are disposed within the lens assembly between a pair of static lens groups, and wherein the lens assembly exhibits an etendue of between 0.95 and 4.65 mm²sr.

In certain embodiments, the lens assembly may be configured to have a resolving power such that 4,075 to 8,194 individual pixels are resolvable across a diagonal of an image plane.

In certain embodiments, the lens assembly exhibits an etendue between 0.95 and 4.65 mm²sr at any point of the zoom range.

In certain embodiments, the lens assembly may be configured to exhibit between 1.57 and 4.65 mm²sr of etendue, and a ratio of highest to lowest magnification between 7:1 and 16:1.

In certain embodiments, the lens assembly may be configured to exhibit between 2.88 and 4.65 mm²sr of etendue, and a ratio of highest to lowest magnification between 6.2:1 and 16:1.

In certain embodiments, the lens assembly may include a lens attachment module coupled to face an object side of the zooming component within the lens assembly. The lens attachment module may include two or more fixed focal length lens elements, and may have a positive focal length, and may exhibit a pupil size between 16 and 25 mm and/or a pupil depth of 50 mm or greater. The two or more fixed focal length lens elements of the lens attachment module may include a doublet. The two or more fixed focal length lens elements of the lens attachment module may further include a triplet and/or a second doublet and one or more singlets and/or multiple singlets.

In certain embodiments, the lens assembly may include a rear adapter module coupled to face an image side of the zooming component within the lens assembly. The rear adapter module may include three or more fixed focal length lens elements, and may have a positive focal length, and may exhibit a pupil size between 16 and 25 mm and/or a pupil depth of 50 mm or greater. The three or more fixed focal length lens elements of the rear adapter module may include two doublets and a singlet, or a doublet and three singlets.

The lens assembly may include a core zoom module including the zooming component, and one or both of a lens attachment module and a rear adapter module.

Another modular finite conjugate lens assembly is provided that includes a zooming component that is configured to exhibit at least 1.58 mm²sr of etendue at a lowest magnification position, and a ratio of highest to lowest magnification of at least 7:1. In certain embodiments, the lens assembly may provide a maximum magnification of 2× or greater. The lens assembly may be configured to have a resolving power such that greater than 4,075 individual pixels are resolvable across a diagonal of an image plane. The etendue of the lens assembly may be between 1.58 and 4.95 mm²sr at one or more points or at any point of a zoom range of the zooming component. The ratio of highest to lowest magnification may be between 7:1 and 16:1.

The lens assembly may include an afocal zooming component. The lens assembly may include a lens attachment module that is coupled at an object end of the afocal zooming component within the lens assembly. The lens attachment module may include two or more fixed focal length lens elements, and may have a positive focal length, and may exhibit a pupil size of between 16 and 25 mm. The lens attachment module may exhibit a pupil depth of 75 mm or greater.

The lens assembly may include a rear adapter module that is coupled at an image end of an afocal zooming component within the lens assembly. The rear adapter module may include three or more fixed focal length lens elements, and may have a positive focal length, and may exhibit a pupil size of between 16 and 25 mm. The rear adapter module may exhibits a pupil depth of 75 mm or greater.

The lens assembly may include an afocal zoom section that includes the zooming component.

The lens assembly may include a core zoom module including the zooming component; a lens attachment module and a rear adapter module. The lens attachment module may include two or more fixed focal length lens elements. The lens attachment module may be coupled to an object end of the core zoom module and may have a positive focal length. The rear adapter module may include three or more fixed focal length lens elements. The rear adapter module may be coupled to an image end of the core zoom module and may have a positive focal length. The lens assembly may exhibit a pupil depth of at least 75 mm or a pupil size between 16 and 25 mm, or both.

In certain embodiments, the lens assembly may be configured such that a wavelength focus position across a wavelength range from 430 nm to 1100 nm differs by not more than 3× from a DOF (depth of field) at 550 nm light from a same 550 nm light focus position, wherein DOF is defined as $$DOF = \pm \frac{\lambda}{2*NA^2},$$

where λ is wavelength and NA is Numerical Aperture.

The lens assembly may be configured such that a wavelength focus position across a wavelength range from 430 nm to 660 nm differs by not more than 1× from the DOF (depth of focus) at 550 nm light from a same 550 nm light focus position, wherein DOF is defined as $$DOF = \pm \frac{\lambda}{2 * NA^2},$$

where λ is wavelength and NA is Numerical Aperture.

The lens assembly may be configured such that a wavelength focus position across a wavelength range from 900 nm to 1700 nm differs by not more than 3× from the DOF (depth of focus) at 1200 nm light from a same 1200 nm light focus position, wherein DOF is defined as $$DOF = \pm \frac{\lambda}{2 * NA^2},$$

where λ is wavelength and NA is Numerical Aperture.

A lens assembly in accordance with certain embodiments may include a core zoom module that includes the zooming component, a lens attachment module coupled at an object end of the core zoom module, and a rear adapter module coupled at an image end of the core zoom module.

In certain embodiments, a lens assembly may include an afocal zooming component. The lens assembly may include an afocal zoom module including the afocal zooming component. A lens attachment module may be coupled at an object side of the afocal zoom module within the lens assembly. A rear adapter module may be coupled at an image side of the afocal zoom module within the lens assembly. The lens assembly may include one or more of a motorization module, a lighting module, a focusing module, a mount module, a sensor module, a processing module, and an interface module.

In certain embodiments, a zooming component may include five lens groups including, from object side to image side of the lens assembly, a positive focal length group, a negative focal length group, a third group, another negative focal length group, and another positive focal length group. The third group may be positive or negative.

In certain embodiments, the zooming component may include five lens groups including, from object side to image side of the lens assembly, a static first group, a movable second group, a third group, a movable fourth group, and a static fifth group. The third group may include a movable group. The movable second and fourth groups may have a same sign of optical power, and a movable third group may have a same or opposite sign of optical power as the movable second and fourth groups. The third group may include a static group.

In certain embodiments, the zooming component may include five lens groups including, from object side to image side of the lens assembly, a static positive group, a negative movable group, a positive static group, a negative movable group, and a positive static group.

In certain embodiments, the zooming component may include five lens groups including, from object side to image side of the lens assembly, a static positive group, a negative movable group, a positive movable group, a negative movable group, and a static positive group.

In certain embodiments, the zooming component may include five lens groups including, from object side to image side of the lens assembly, a static positive group, a negative movable group, a negative movable group, a negative movable group, and a positive static group.

In certain embodiments, the zooming component may include three movable groups. The three movable groups may be disposed consecutively within the lens assembly. The three movable groups may be disposed between a pair of static groups within the lens assembly.

In certain embodiments, the zooming component may include five lens groups including, from object side to image side of the lens assembly, a static group, a movable triplet, a third group, a movable doublet, and another static group. The third group may include a doublet. The third group may be static or movable.

In certain embodiments, the zooming component may include, from object side to image side of the lens assembly, a static group, a positive movable group, another movable group, another positive movable group, and another static group. The zooming component may include three consecutive independently movable positive lens groups. The three consecutive independently movable lens groups may include an independently movable negative lens group disposed between a pair of independently movable positive lens groups.

A lens assembly may be configured such that a telecentric chief ray value at an object is less than 2° relative to a flat perpendicular object when combined with the zooming component.

A lens attachment module including a lens attachment lens assembly is also provided herein. The lens attachment module is configured for coupling with a zoom module for use as part of a zoom lens system. The lens attachment lens assembly includes two or more lens elements and has a positive focal length. The lens attachment lens assembly is configured to exhibit a pupil size of between 16 and 25 mm and a pupil depth greater than 50 mm.

In certain embodiments, the lens attachment lens assembly may exhibit an etendue between 0.95 and 4.65 $mm^2sr$ and may be configured to work in conjunction with said zoom module with 50% or less vignetting through a zoom range of the zoom module.

In certain embodiments, the lens attachment lens assembly may exhibit a pupil depth that is greater than 75 mm. The lens assembly may be configured such that pupil aberrations are matched to the zoom module to reduce system aberration, thereby improving system performance.

In certain embodiments, the lens attachment module may be configured for coupling at an object end of a zoom module that also has a rear adapter module coupled at an image end within the lens assembly. The lens assembly may also include one or more of a motorization module, a lighting module, a focusing module, a mount module, a sensor module, a processing module, and an interface module coupled together within said lens assembly.

In certain embodiments, two or more lens elements of the lens attachment lens assembly may include a doublet, and either a triplet; a second doublet and a singlet; and/or two or three singlets.

A rear adapter module including a rear adapter lens assembly is also provided herein. The rear adapter module is configured for coupling with a zoom module for use as part of a zoom lens system. The rear adapter lens assembly includes three or more lens elements and has a positive focal length. The rear adapter lens assembly is configured to exhibit a pupil size of between 16 and 25 mm and a pupil depth greater than 50 mm.

In certain embodiments, the rear adapter lens assembly may be configured to exhibit between 0.95 and 4.65 mm²sr. The rear adapter lens assembly may be configured to work in conjunction with a zoom module with 50% or less vignetting through a zoom range of the zoom module.

In certain embodiments, the rear adapter lens assembly may exhibit a pupil depth that is greater than 75 mm. The rear adapter lens assembly may be configured such that pupil aberrations are matched to the zoom module to reduce system aberration, thereby improving system performance.

In certain embodiments, the rear adapter module may be coupled at an image end of a zoom module that also has a lens attachment module coupled at an object end. One or more of a motorization module, a lighting module, a focusing module, a mount module, a sensor module, a processing module, and an interface module may also be coupled together within the lens assembly.

In certain embodiments, the rear adapter lens assembly of the rear adapter module may include a doublet and three or more singlets, or two doublets and one or more singlets.

A finite conjugate camera is also provided including a finite conjugate lens assembly, e.g., as set forth at any of the example embodiments described herein; an image sensor disposed at an image plane of the optical assembly for capturing images; and a display or interface for communicating with an external display, or both, for displaying the images captured at the image sensor. The finite conjugate camera may be configured as a digital microscope.

A finite conjugate camera is also provided including a finite conjugate lens assembly, e.g., as set forth at any of the example embodiments described herein; and an eyepiece configured and positioned such that images produced by the optical assembly are viewable by looking through the eyepiece. The finite conjugate camera may be configured as a microscope.

Another finite conjugate camera is provided that includes:
(a) an afocal zoom module including a zoom lens assembly including five lens groups including, from object end to image end (i) a first positive static group including a doublet, a triplet, two doublets, or a doublet and a singlet; (ii) a first negative movable group including a triplet, or one or two doublets, or a doublet and a singlet; (iii) a third group including a doublet, or a triplet, or three singlets, or a doublet and a singlet; (iv) a second negative movable group including one or two doublets, or a triplet, or a doublet and a singlet; and (v) a second positive static group including a triplet, a doublet, or a doublet and a singlet, or two doublets;
(b) a lens attachment module coupled to the object end of the zoom module, wherein the lens attachment module comprises a lens attachment lens assembly including (i) a doublet and a triplet, or (ii) two doublets and a singlet, or (iii) a doublet and three singlets, or (iv) a doublet and two singlets, or (v) three doublets, or (vi) three doublets and a singlet; or (vii) a triplet and a doublet and a singlet, or (viii) a triplet and two doublets, or (ix) two doublets and three singlets, or (x) two doublets and four singlets;
(c) a rear adapter module coupled to an image end of the zoom module, wherein the rear adapter module comprises a rear adapter lens assembly including (i) one doublet and three singlets, or (ii) two doublets and a singlet; and
(d) an image sensor or eyepiece disposed at an image plane.

Another finite conjugate camera is provided, including, from object end to image end:
(a) a lens attachment module that comprises a lens attachment lens assembly including (i) a doublet and a triplet, or (ii) a doublet with two or more singlets, or (iii) two doublets and one or more singlets;
(b) an afocal zoom module exhibiting a ratio of highest to lowest magnification between 5.5:1 and 16:1 and an etendue between 0.95 and 4.65 mm²sr, and including a zoom lens assembly including (i) a first positive focal length static group including a triplet or a doublet and a singlet; (ii) a first negative focal length movable group including a triplet, or one or two doublets, or a doublet and a singlet; (iii) a third static or movable group including a doublet, or a triplet, or three singlets; (iv) a second negative focal length movable group including one or two doublets, or a doublet and a singlet; and (v) a second positive focal length static group including a triplet, a doublet, or a doublet and a singlet;
(c) a rear adapter module that comprises a rear adapter lens assembly including (i) a doublet and three singlets, or (ii) two doublets and a singlet, or (iii) two doublets and two singlets, or (iv) a doublet and four singlets; and
(d) an image sensor or eyepiece disposed at an image plane.

Optical assemblies in accordance with certain embodiments may include a zooming component that is configured such that a ratio of highest to lowest magnification is within a range between 5.5:1 and 16:1. Example embodiments of the optical layout of a finite conjugate camera or microscope are schematically illustrated in FIGS. 24A-24C, 25A-25C, and 26A-26C. A finite conjugate optical assembly is typically used to image objects that are disposed at distances of less than 21 times the focal length of the optical assembly. A finite conjugate optical assembly may be combined with an image sensor to form a finite conjugate camera or an eyepiece may be used to view objects with the naked eye. A finite conjugate camera may include a display, a processor, memory for storing images, and wired and/or wireless communications interfaces for receiving and/or transmitting image data.

Several example embodiments are provided of optical assemblies that include one of a multitude of positive focal length lens attachment options, which may be provided as a lens attachment module m1 as in FIG. 27A, or module m124, module m125 or module m126 as in the example embodiments that are schematically illustrated at FIG. 24A-24C, 25A-25C or 26A-26C, respectively. Further example lens attachment modules are described herein with reference to FIGS. 18-23 and Tables 14-19, including examples of first lens groups G114-G122, respectively, wherein the "first" lens group is disposed between the object and the other six lens groups, i.e., closest to the object of the seven lens groups, and disposed on the object end of the core zoom module m2 as in FIG. 27A, or module m224, module m225 or module m226 as in FIGS. 24A-24C, 25A-25C and 26A-26C, respectively. Further example lens attachment modules are described herein with reference to FIG. 27G, including example lens attachment modules m127, m128, m129, m130, m131, m132 and m133 which may be configured in accordance with any of the examples set forth at Table 23. Optical assemblies in accordance with certain lens attachment embodiments may resemble large field of view (FOV) microscope objectives. A lens attachment module m1 as in FIG. 27A may be configured in certain embodiments to allow varying working distances, object NA values, fields of view, and/or telecentricity levels.

Several example embodiments are also provided of optical assemblies that include a zooming component, or core zoom module m2 as in FIG. 27A, including the example core zoom modules m224, m225, and m226 of the example embodiments that are schematically illustrated at FIG. 24A-24C, 25A-25C or 26A-26C, respectively, and described at Tables 20-22. Further example zoom modules are described herein with reference to FIGS. 5A-11C, and Tables 1-7. Each of the example zoom modules of FIGS. 5A-11C and 24A-26C, respectively include, from object end to image end of the optical assembly, a second lens group G201-G207 and G220-G222, a third lens group G301-G307 and G320-G322, a fourth lens group G401-G407 and G420-G422, a fifth lens group G501-G507 and G520-G522, and a sixth lens group G601-G607 and G620-G622. Further zoom module examples are described herein with reference to FIG. 27E including examples of core zoom modules m227, m228, m229, m230 and m231. Zoom modules m2 as in FIG. 27A in accordance with certain embodiments include afocal zoom modules and provide ratios of highest to lowest magnification between 5.5:1 and 16:1.

Several example embodiments are also provided of optical assemblies that include one of a multitude of positive focal length rear adapter options, which may be provided as a rear adapter module m3 as in FIG. 27A, or as module m324, module m325 or module m326 of the example embodiments that are described herein with reference to FIG. 24A-24C, 25A-25C or 26A-26C, respectively, and Tables 20-22, wherein the rear adapter module m324 of FIGS. 24A-24C includes a seventh lens group G720 which is disposed between the core zoom module and the image plane, and rear adapter module m325 of FIGS. 25A-25C includes lens group G721, and rear adapter module m326 of FIGS. 26A-26C includes lens group G722. Further examples of rear adapter modules are described herein with reference to FIGS. 12-17 and Tables 8-13, including example seventh lens groups G708-G713, respectively. Further example rear adapter modules m327, m328, m329 and m330 are schematically illustrated at FIG. 27C and may be configured in accordance with any of the examples set forth at Table 24. Rear adapter optical assemblies in accordance with certain embodiments may include or resemble tube lenses. A rear adapter module m3 as in FIG. 27A may be configured in certain embodiments to allow varying sensor size coverage and sensor side NA values.

Figure 1:
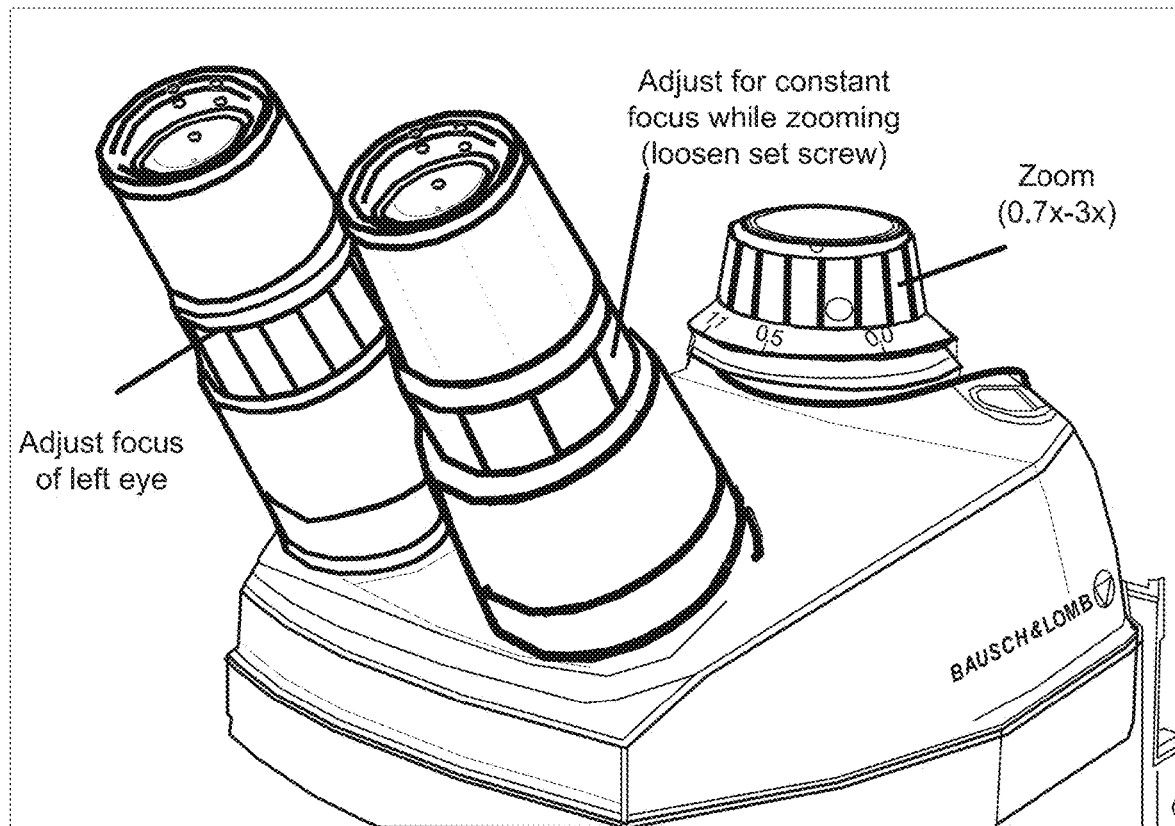
FIG. 1 illustrates a conventional eyepiece pod for Bausch and Lomb StereoZoom4 with 0.7-3× magnification range.
Figure 2:
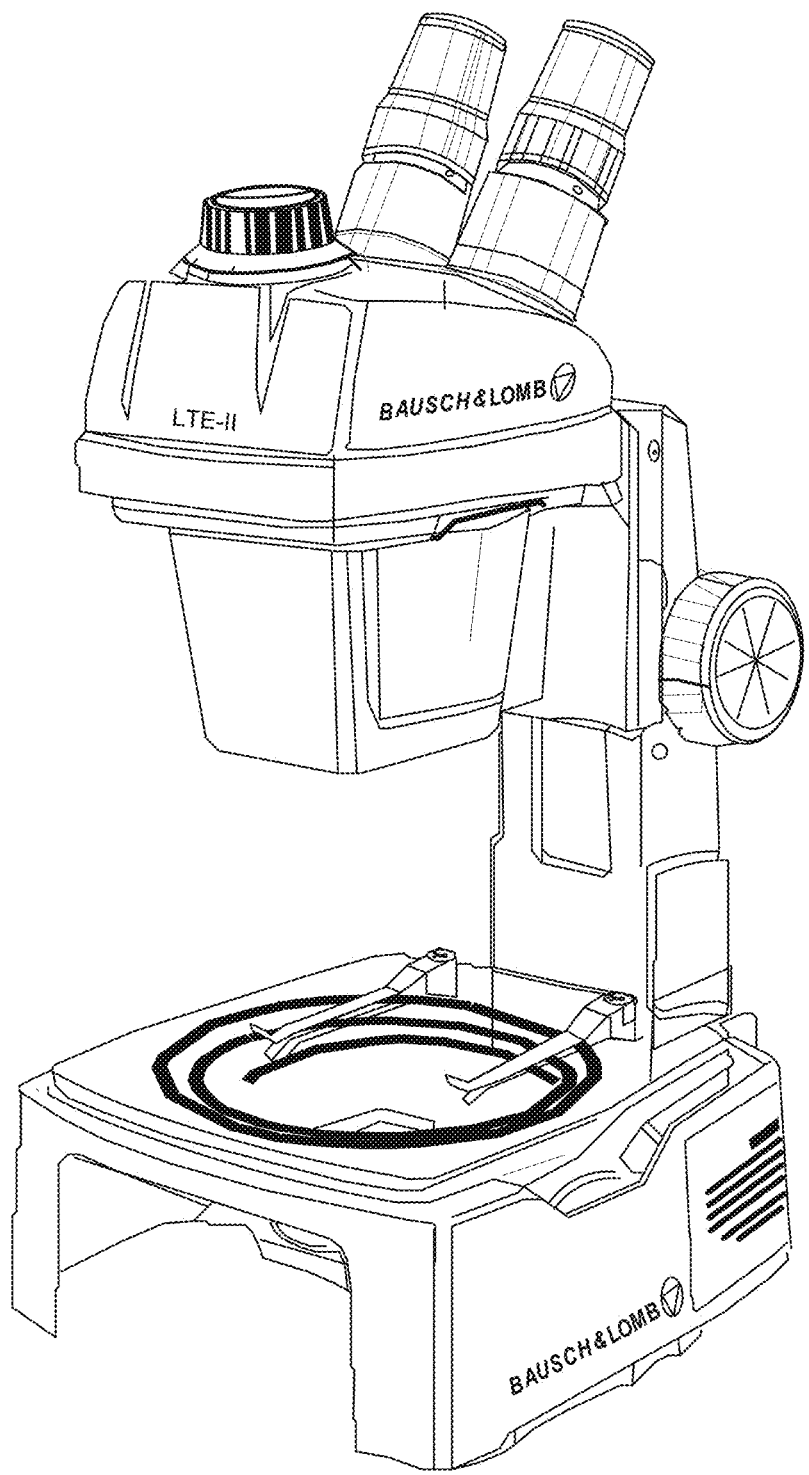
FIG. 2 illustrates a conventional full stereo microscope stand for Bausch and Lomb StereoZoom4.
Figure 3:
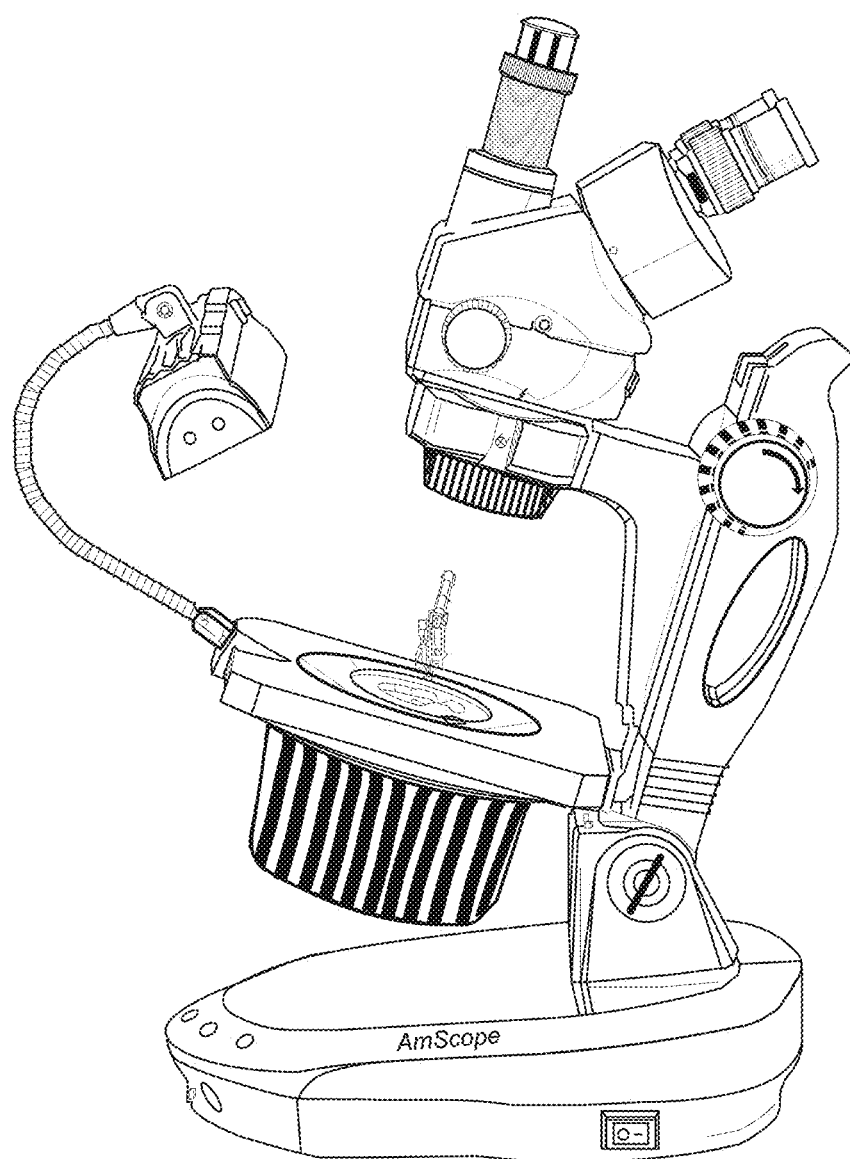
FIG. 3 illustrates a conventional Jeweler's StereoZoom microscope.
Figure 4A:
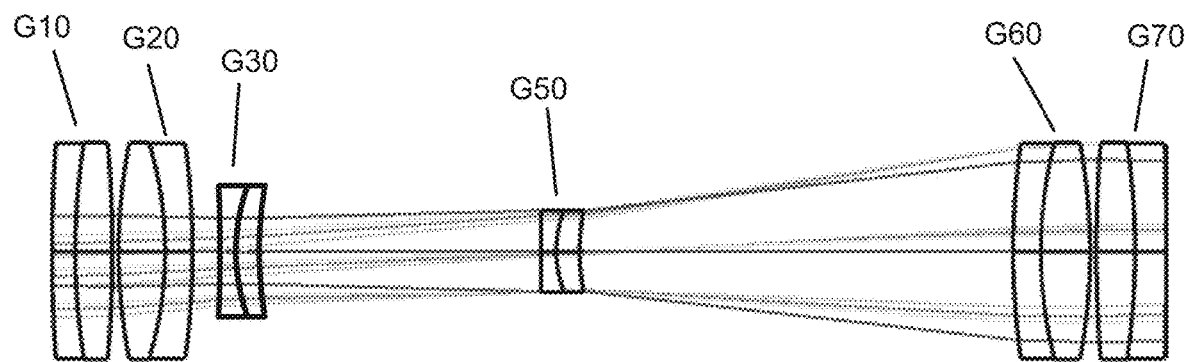
FIGS. 4A-4C schematically illustrate a conventional optical assembly for a microscope finite conjugate imaging system that exhibits an etendue of approximately 0.45 mm²sr.
Figure 4B:
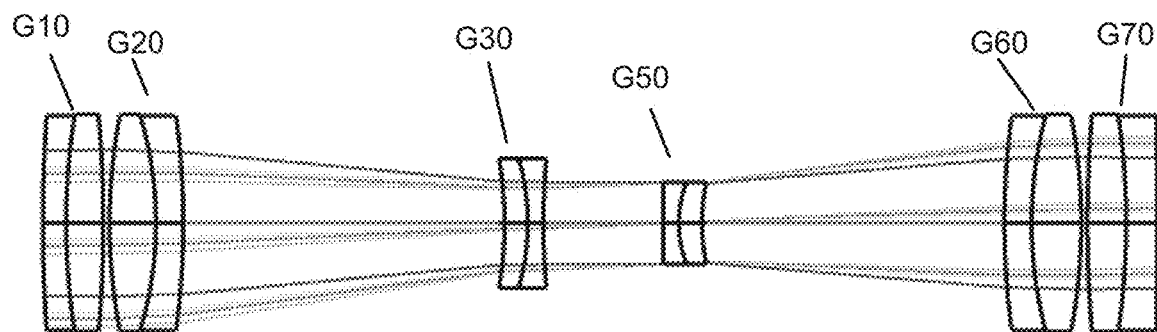
Figure 4C:
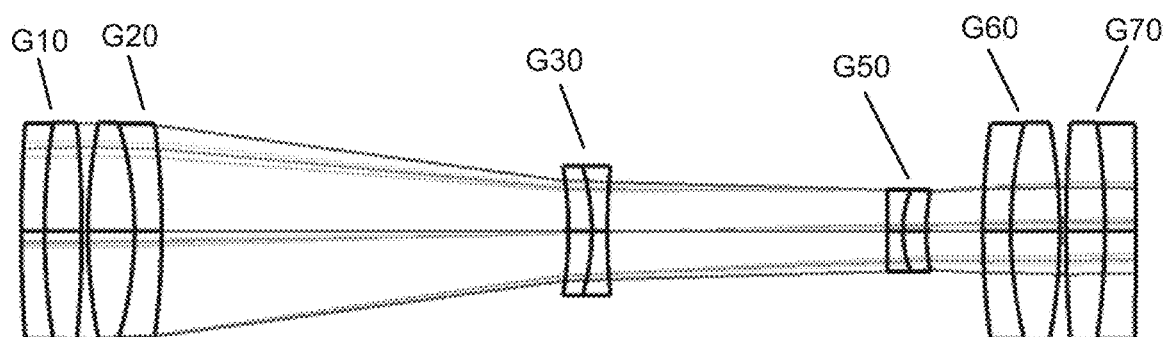

The optical assembly that is schematically illustrated at FIGS. 4A-4C does not have separate modules, and instead has static groups G10 and G20 and G60 and G70 as included groups, along with groups G30 and G50 (but not G40) within a single lens assembly. Each of the six lens groups G10, G20, G30, G50, G60 and G70 of the optical assembly of FIGS. 4A-4C consists of one doublet, such that the optical assembly of FIGS. 4A-4C consists of six doublets, wherein the first doublet includes a convex meniscus lens coupled to a biconvex lens as lens group G10, the second doublet includes a biconvex lens coupled to a concave meniscus lens as lens group G20, the third doublet includes a concave meniscus lens coupled to a biconcave lens as lens group G30, a fourth doublet includes a biconcave lens coupled to a convex meniscus lens as lens group G50, a fifth doublet includes a convex meniscus lens coupled to a biconvex lens as lens group G60, and a sixth doublet includes a biconvex lens coupled to a concave meniscus lens as lens group G70. The modular approach, extra lens group, and high etendue are each advantageous features of a finite conjugate optical assembly and camera in accordance with several embodiments described herein that are not found in the less capable system illustrated at FIGS. 4A-4C.

A core zoom module m2 of FIG. 27A, or module m224, module m225 or module m226 of FIG. 24A-24C, 25A-25C or 26A-26C, respectively, of an example finite conjugate optical assembly, may be configured in accordance with the examples illustrated schematically at FIGS. 5A-11C, 24A-26C, 27A and/or 27E, and may be configured in accordance with one or a combination of the example optical prescriptions shown in Tables 1-7 and 20-22. A core zoom module m2 in accordance with several example embodiments described herein includes five lens groups, while the zoom optical assembly illustrated at FIGS. 4A-4C includes only four groups.

FIGS. 27A-27G schematically illustrate an embodiment of a modular camera system that includes a lens attachment module m1 in the camera system of FIG. 27A, while examples of lens attachment modules m127, m128, m129, m130, m131, m132 and m133 are provided at FIG. 27G. A core zoom module m2 and a rear adapter module m3 are also included in the camera system of FIG. 27A, while examples of core zoom modules m227, m228, m229, m230, m231 are provided at FIG. 27E and examples of rear adapter modules m327, m328, m329 and m330 are provided at FIG. 27C. The camera system of FIG. 27A also includes a camera mount cm, and FIG. 27B includes examples of camera mounts cm1, cm2 and cm3. FIGS. 27A and 27D include flat mount fm1 and split clamp sc1 components for coupling the complete lens system such as the optical assemblies illustrated schematically in FIGS. 24A-24C to an external fixture. The camera system of FIG. 27A also includes a lighting component lc, while FIG. 27F includes examples of lighting component options LED lc1 and coax lc2, and includes a schematic illustration of a coupler cc for facilitating coupling of a lens attachment module m1 at an object end of a zoom module m2. Multiple further example embodiments are provided for the lens attachment module m1, core zoom module m2, and rear adapter module m3, and are described with reference to FIGS. 5A-26C and Tables 1-25. A modular design in accordance with alternative embodiments may contain two or more modules or modular components that may be conveniently individually isolated for repair or replacement or calibration separate from one or more other modules. A sensor module may be included in an imaging system in accordance with certain embodiments. Other module configurations may include a motorization module, a lighting module, a processing module, an interface module, a communication module or combinations of these.

In certain embodiments, pupil aberrations are controlled more greatly than in other embodiments, thus advantageously allowing the modularity of the system to function optimally. Optical assemblies in accordance with certain embodiments will have a system magnification greater than 2× at their high magnification point.

Core Zoom Module

Further example embodiments for afocal zoom lens groups of core zoom module m2 of FIGS. 27A and 27E may include or otherwise be configured in accordance with one or more of the following features. Afocal zoom lenses are provided in accordance with certain embodiments that are configured such as to compress the pupil to a low total movement compared with conventional designs. Optical aberrations may be tightly controlled in these embodiments. These together allow better integration of a multitude of objective lenses and tube lenses that provide optimal performance along with the core zoom. This improved total system performance allows for larger apertures and fields of view than previously available. Combined together this leads to more optical bandwidth, represented by an etendue value at the maximum etendue point which is at the low magnification zoom position at the exit pupil of 0.95 to 4.65 mm$^2$sr for optical systems configured in accordance with certain embodiments for use with 6.6MP to 32MP sensors, respectively.

A first example embodiment of a core zoom module that includes an afocal zoom lens assembly and exhibits a 7:1 ratio of highest to lowest magnification, and an approximate etendue of 1.57 mm$^2$sr at its low magnification position. This embodiment is illustrated schematically at FIGS. 5A-5C, and includes a positive group (G201), a movable negative group (G301), a movable positive group (G401), a movable negative group (G501), and a positive group (G601). A numerical example in accordance with this embodiment is provided in Table 1. Three arrangements are included in FIG. 5A-5C, including a low magnification arrangement at FIG. 5A, a mid-level magnification arrangement at FIG. 5B, and a high magnification arrangement at FIG. 5C.

Figure 5A:
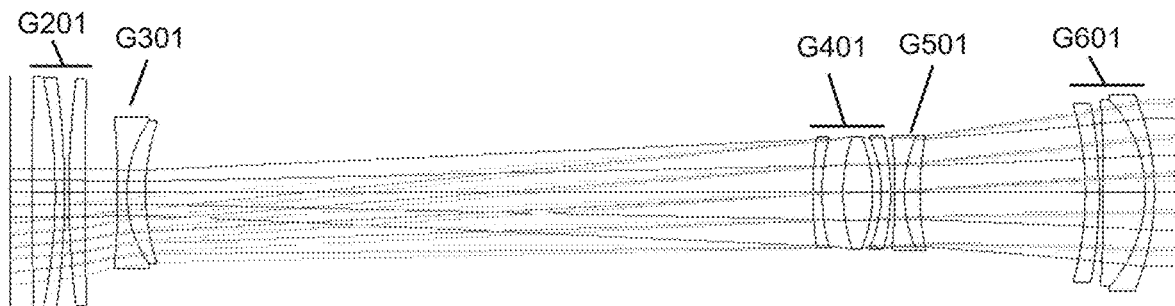
FIGS. 5A-5C schematically illustrate a first example embodiment of a core zoom module (m2 in FIG. 27A) or afocal zoom module of an optical assembly of a finite conjugate system that exhibits in this first example a ratio of highest to lowest magnification of 7:1 and an approximate etendue of 1.57 mm²sr, and includes in this first example a static positive group G201, a negative movable group G301, a positive movable group G401, a negative movable group G501, and a static positive group G601, which may be configured in accordance with the example optical prescription set forth at Table 1. A "static" group is not "movable" relative to other static lens groups during ordinary operation of the optical assembly, nor is a static group movable relative to other static or fixed elements such as an image sensor, housing, camera mount or other components that are not movable during ordinary operation and which may be assembled together with the optical assembly in a camera configuration, including structural components to which the static lens groups are securely coupled and aligned in fixed positions along the optical path and to which the movable lens groups are also securely coupled and aligned and movable precisely forward and backward along the optical path of the optical assembly for adjusting, setting and/or controlling a magnification or zoom setting of the optical assembly.
Figure 5B:
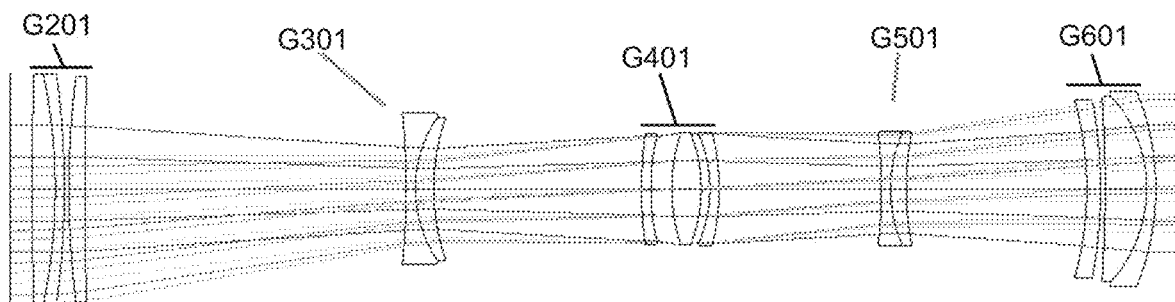
Figure 5C:
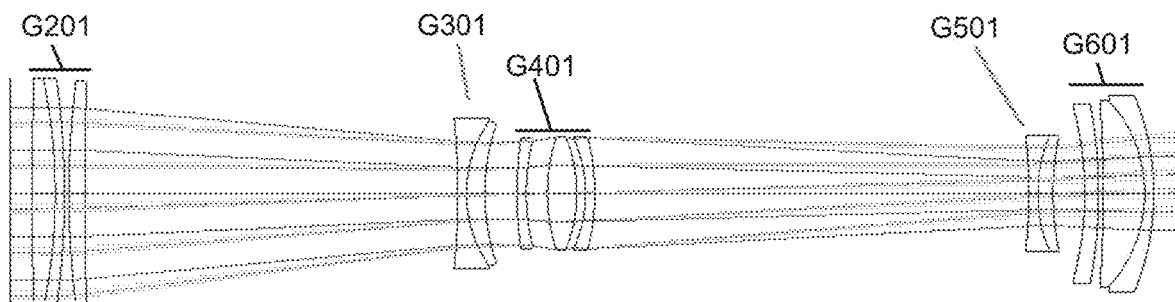

The example lens group G201 in FIGS. 5A-5C includes two lens elements including three lenses. The lens group G201 includes a doublet and a singlet, wherein the doublet includes a biconvex lens coupled to a concave meniscus lens, and wherein the singlet includes a convex meniscus lens.

The example movable lens group G301 in FIGS. 5A-5C includes one lens element including two lenses. The lens group G301 includes a doublet, wherein the doublet includes a biconcave lens coupled to a convex meniscus lens. The movable lens group G301 is disposed a greater distance from lens group G201 in FIG. 5B compared with FIG. 5A, and lens group G301 is disposed closer to lens group G401 in FIG. 5B compared with FIG. 5A. The movable lens group G301 is disposed a greater distance from lens group G201 in FIG. 5C compared with FIG. 5B, and lens group G301 is disposed closer to lens group G401 in FIG. 5C compared with FIG. 5B.

The movable lens group G401 includes three lens elements including three lenses. The lens group G401 includes a convex meniscus singlet, a biconvex singlet and a concave meniscus singlet. The movable lens group G401 is disposed furthest from lens group G301 and closest to lens group G501 is FIG. 5A, compared with FIGS. 5B-5C, and lens group G401 is disposed closest to lens group G301 and furthest form lens group G501 in FIG. 5C compared with FIGS. 5A-5B.

The movable lens group G501 includes one lens element including two lenses. The lens group G501 includes a doublet, wherein the doublet includes a biconcave lens coupled to a convex meniscus lens. The lens group G501 is disposed about a same distance from lens group G601 in FIGS. 5A and 5B, and is closest to lens group G601 in FIG. 5C compared with FIGS. 5A-5B. The lens group G501 is disposed closest to lens group G401 in FIG. 5A compared with FIGS. 5B-5C, and is disposed furthest from lens group G401 in FIG. 5C compared with FIGS. 5A-5B.

The lens group G601 includes two lens elements including three lenses. The lens group G601 includes a concave meniscus singlet and a doublet, wherein the doublet includes a concave meniscus (or plano-convex) lens coupled to a concave meniscus lens.

A second embodiment of a core zoom module including an afocal zoom lens assembly that has a 7:1 ratio of highest to lowest magnification, and an approximate etendue of 1.57 mm$^2$sr of etendue at its low magnification position. This embodiment is illustrated schematically at FIGS. 6A-6C, and includes a positive group (G202), a movable negative group (G302), a static positive group (G402), a movable negative group (G502), and a positive group (G602). A numerical example in accordance with this embodiment is provided in Table 2. Three arrangements are included in FIGS. 6A-6C, including a low magnification arrangement at FIG. 6A, a mid-level magnification arrangement at FIG. 6B, and a high magnification arrangement at FIG. 6C.

The lens group G202 includes two lens elements including three lenses. The lens group G202 includes a doublet and a singlet, wherein the doublet includes a convex meniscus lens coupled to a biconvex (or convexo-plano) lens, and wherein the singlet includes a convex meniscus (or convex-plano) lens.

Figure 6A:
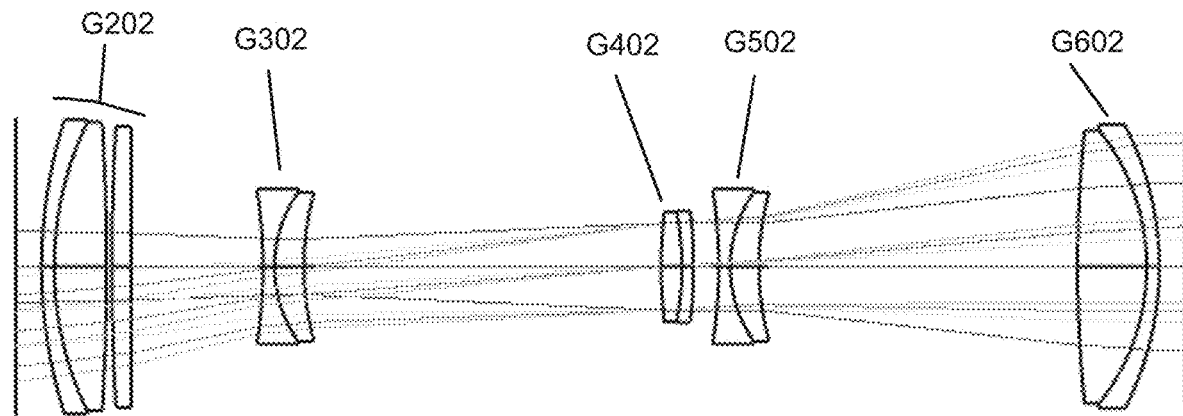
FIGS. 6A-6C schematically illustrate a second example embodiment of a core zoom or afocal zoom module of an optical assembly of a finite conjugate system that also exhibits in this second example a ratio of highest to lowest magnification of 7:1 and an approximate etendue of 1.57 mm²sr, and includes in this second example a static positive group G202, a negative movable group G302, a positive static group G402, a negative movable group G502, and a static positive group G602, which may be configured in accordance with the example optical prescription set forth at Table 2.
Figure 6B:
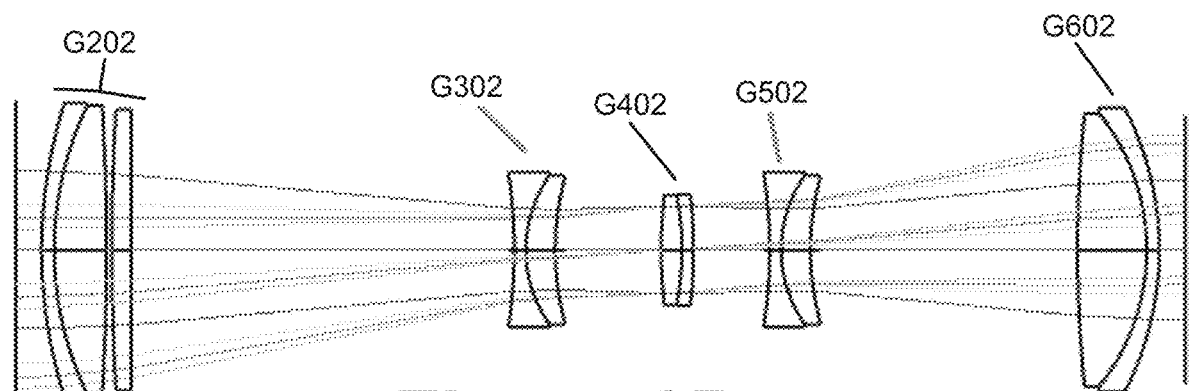
Figure 6C:
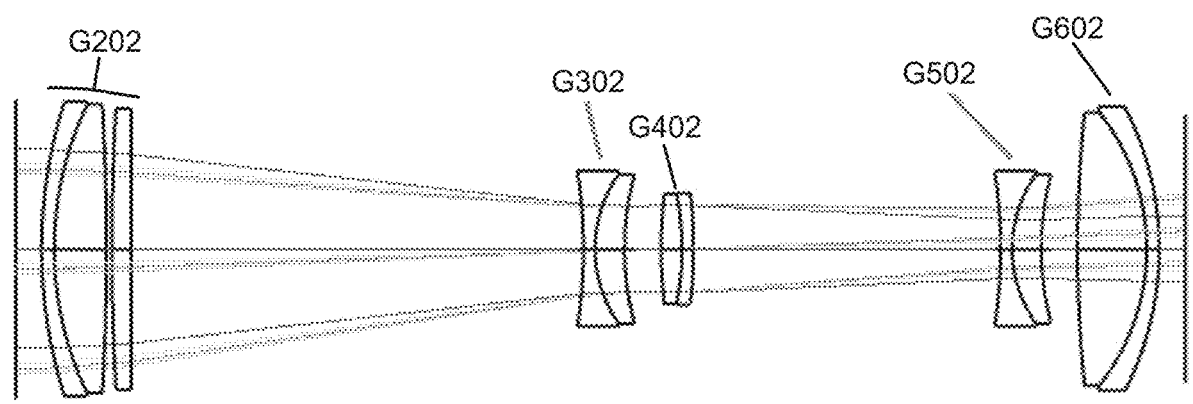

The movable lens group G302 includes one lens element including two lenses. The lens group G302 includes a doublet, wherein the doublet includes a biconcave lens coupled to a convex meniscus lens. The movable lens group G302 is disposed a greater distance from lens group G202 in FIG. 6B compared with FIG. 6A, and lens group G302 is disposed closer to lens group G402 in FIG. 6B compared with FIG. 6A. The movable lens group G302 is disposed a greater distance from lens group G202 in FIG. 6C compared with FIG. 6B, and lens group G302 is disposed closer to lens group G402 in FIG. 6C compared with FIG. 6B.

The lens group G402 includes one lens element including two lenses. The lens group G402 includes a doublet, wherein the doublet includes a biconvex lens coupled to a concave meniscus lens. The lens group G402 is disposed at a same location relative to the static groups G202 and G602 in all three of FIGS. 6A, 6B and 6C. The lens group G402 is a static group in this example.

The movable lens group G502 includes one lens element including two lenses. The lens group G502 includes a doublet, wherein the doublet includes biconcave lens coupled to a convex meniscus lens. The lens group G502 is disposed closest to group G402 in FIG. 6A compared with FIGS. 6B-6C, and lens group G502 is disposed furthest from group G402 in FIG. 6C compared with FIGS. 6A-6B. The lens group G502 is disposed furthest from group G602 in FIG. 6A compared with FIGS. 6B-6C, and group G502 is disposed closest to group G602 in FIG. 6C compared with FIGS. 6A-6B.

The lens group G602 includes one lens element including two lenses. The lens group G602 includes a doublet, wherein the doublet includes a biconvex (or plano-convex) lens coupled to concave meniscus lens.

A third embodiment of a core zoom module includes an afocal zoom lens assembly configured to have a 7:1 ratio of highest to lowest magnification, and an approximate etendue of 1.58 mm$^2$sr at its low magnification position. This embodiment is illustrated schematically at FIGS. 7A-7C, and includes a positive group (G203), a movable negative group (G303), a movable negative group (G403), a movable negative group (G503), and a positive group (G603). A numerical example in accordance with this embodiment is provided in Table 3. Three arrangements are included in FIGS. 7A-7C, including a low magnification arrangement at FIG. 7A, a mid-level magnification arrangement at FIG. 7B, and a high magnification arrangement at FIG. 7C.

The lens group G203 includes one lens element including two lenses. The lens group G203 includes a doublet, wherein the doublet includes a biconvex lens coupled to a concave meniscus lens.

Figure 7A:
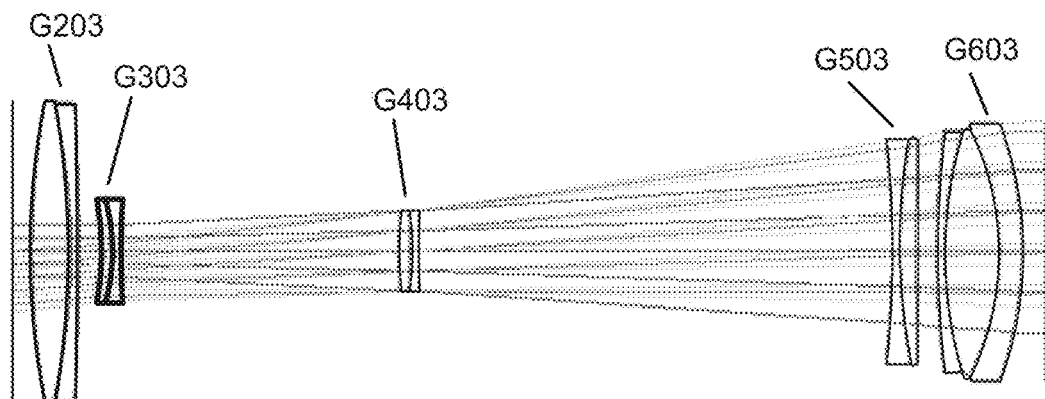
FIGS. 7A-7C schematically illustrate a third embodiment of a core zoom or afocal zoom module of an optical assembly of a finite conjugate optical system that exhibits in this third example a ratio of highest to lowest magnification of 7:1 and an approximate etendue of 1.58 mm²sr, and includes in this third example a static positive group G203, a negative movable group G303, a negative movable group G403, a negative movable group G503, and a static positive group G603, which may be configured in accordance with the example optical prescription set forth at Table 3.
Figure 7B:
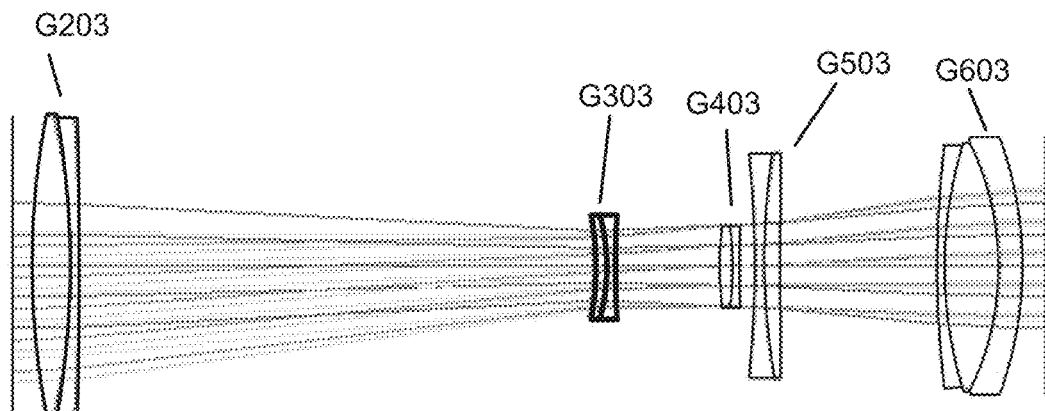
Figure 7C:
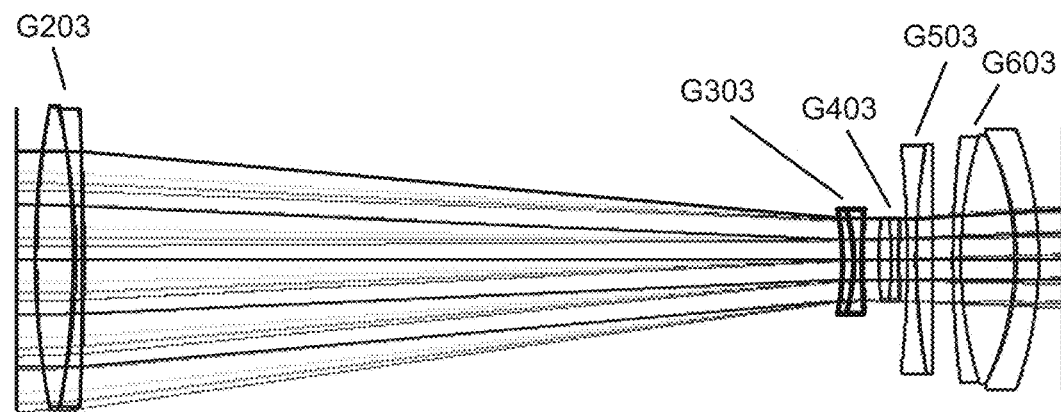

The movable lens group G303 includes one lens element including two lenses. The lens group G303 includes a doublet, wherein the doublet includes a concave meniscus lens coupled to a biconcave lens. The movable lens group G303 is disposed a greater distance from lens group G203 in FIG. 7B compared with FIG. 7A, and lens group G303 is disposed closer to lens group G403 in FIG. 7B compared with FIG. 7A. The movable lens group G303 is disposed a greater distance from lens group G203 in FIG. 7C compared with FIG. 7B, and lens group G303 is disposed closer to lens group G403 in FIG. 7C compared with FIG. 7B.

The movable lens group G403 includes one lens element including two lenses. The lens group G403 includes a doublet, wherein the doublet includes a biconvex lens coupled to a biconcave or meniscus lens. The movable lens group G403 is disposed furthest from lens group G303 and closest to lens group G503 in FIG. 7C, compared with FIGS. 7A-7B, and lens group G403 is disposed closest to lens group G303 and furthest from lens group G503 in FIG. 7A compared with FIGS. 7B-7C.

The movable lens group G503 includes one lens element including two lenses. The lens group G503 includes a doublet, wherein the doublet includes a biconcave lens coupled to a convex meniscus lens. The lens group G503 is disposed about a same distance from lens group G603 in FIGS. 7A and 7C, and is furthest from lens group G603 in FIG. 7B compared with FIGS. 7A and 7C. The lens group G503 is disposed about a same distance from lens group G403 in FIGS. 7B and 7C, and group G503 is disposed furthest from lens group G403 in FIG. 7A compared with FIGS. 7B-7C, and group G503 is disposed furthest from lens group G303 in FIG. 7A compared to FIGS. 7B-7C and group G503 is disposed closest to lens group G303 in FIG. 7C compared to FIGS. 7A-7B.

The lens group G603 includes one lens element including three lenses. The lens group G603 includes a triplet, wherein the triplet includes a convex meniscus lens coupled to a biconvex lens, and the biconvex lens is also coupled to a concave meniscus lens.

A fourth embodiment of a core zoom module includes an afocal zoom lens assembly that has a 16:1 ratio of highest to lowest magnification, and an approximate etendue of 1.58 mm²sr at its low magnification position. This embodiment is illustrated schematically at FIGS. 8A-8C, and includes a positive group (G204), a movable negative group (G304), a movable positive group (G404), a movable negative group (G504), and a positive group (G604). A numerical example in accordance with this embodiment is provided in Table 4. Three arrangements are included in FIGS. 8A-8C, including a low magnification arrangement at FIG. 8A, a mid-level magnification arrangement at FIG. 8B, and a high magnification arrangement at FIG. 8C.

The lens group G204 includes two lens elements including four lenses. The lens group G204 includes two doublets, wherein each doublet includes a biconvex lens coupled to a concave meniscus lens.

Figure 8A:
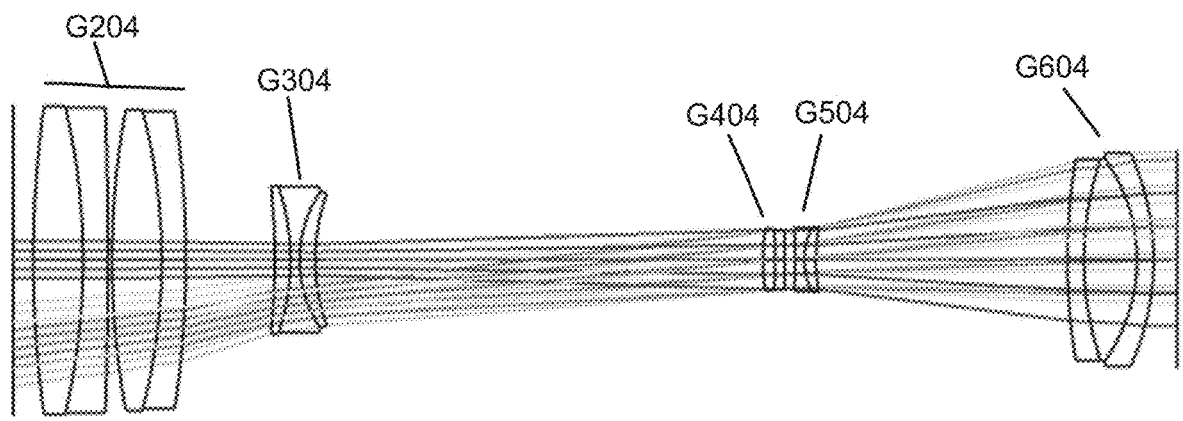
FIGS. 8A-8C schematically illustrate a fourth example embodiment of a core zoom or afocal zoom module of an optical assembly of a finite conjugate optical system that exhibits in this fourth example a ratio of highest to lowest magnification of 16:1 and an approximate etendue of 1.58 mm²sr, and includes in this fourth example a static positive group G204, a negative movable group G304, a positive movable group G404, a negative movable group G504, and a static positive group G604, which may be configured in accordance with the example optical prescription set forth at Table 4.
Figure 8B:
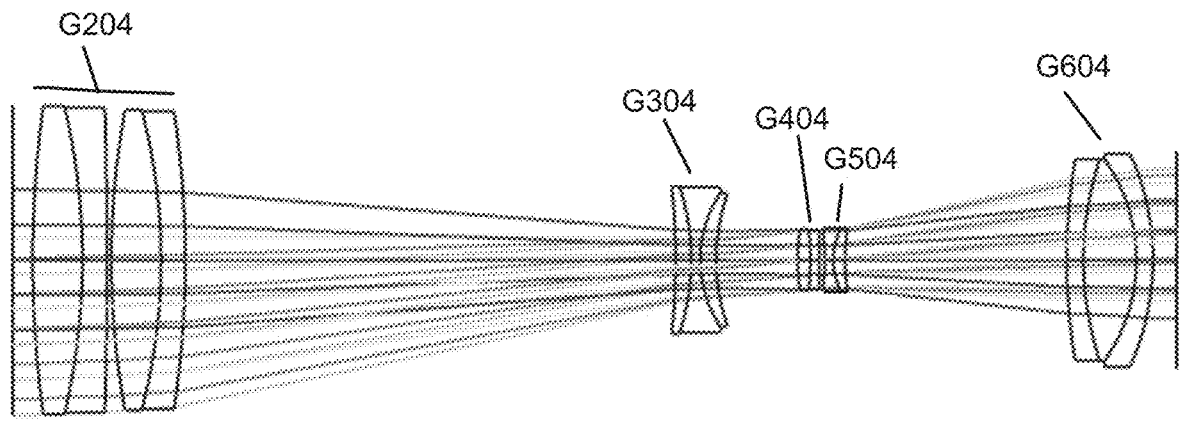
Figure 8C:
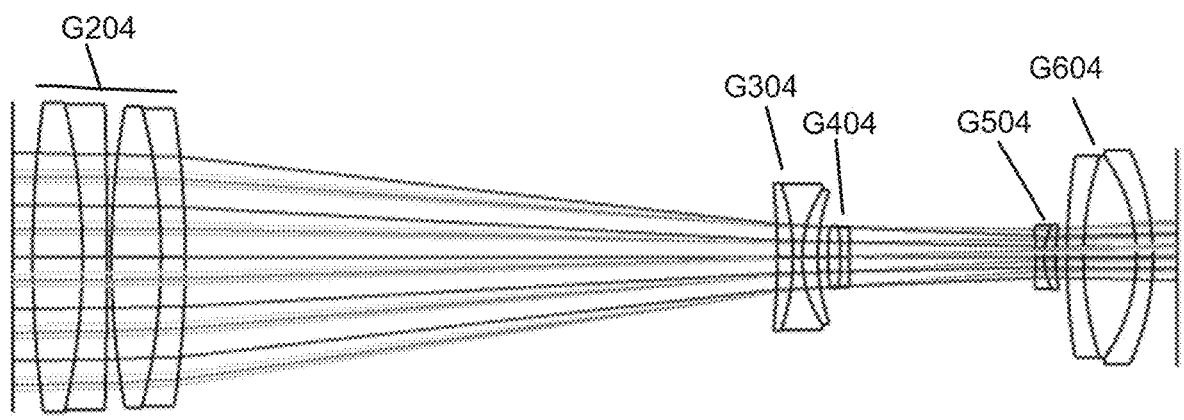

The movable lens group G304 includes one lens element including three lenses. The lens group G304 includes a triplet, wherein the triplet includes a concave meniscus lens coupled to a biconcave lens, and the biconcave lens is also coupled to a convex meniscus lens. The movable lens group G304 is disposed a greater distance from lens group G204 in FIG. 8B compared with FIG. 8A, and lens group G304 is disposed closer to lens group G404 in FIG. 8B compared with FIG. 8A. The movable lens group G303 is disposed a greater distance from lens group G204 in FIG. 8C compared with FIG. 8B, and lens group G303 is disposed closer to lens group G404 in FIG. 8C compared with FIG. 8B.

The movable lens group G404 includes one lens element including two lenses. The lens group G404 includes a doublet, wherein the doublet includes a biconvex lens coupled to a concave meniscus or biconcave (or plano-concave) lens. The movable lens group G404 is disposed closest to lens group G304 and furthest from lens group G504 in FIG. 8C, compared with FIGS. 8A-8B, and lens group G404 is disposed about a same distance from group G504 in FIGS. 8A and 8B, and lens group 404 is disposed further from lens group G304 in FIG. 8A compared with FIGS. 8B-8C.

The movable lens group G504 includes one lens element including two lenses. The lens group G504 includes a doublet, wherein the doublet includes a biconcave (or plano-concave) lens coupled to a convex meniscus lens. The lens group G504 is disposed furthest from lens group G604 in FIG. 8A compared with FIGS. 8B-8C, and group G504 is disposed closest to group G604 in FIG. 8C compared with FIGS. 8A-8B, and lens group G504 is disposed closer to group G604 in FIG. 8B compared to FIG. 8A.

The lens group G604 includes one lens element including three lenses. The lens group G604 includes a triplet, wherein the triplet includes a convex meniscus lens coupled to a biconvex lens, and the biconvex lens is also coupled to a concave meniscus lens.

A fifth embodiment of a core zoom module includes an afocal zoom lens assembly that exhibits a 6.2:1 ratio of highest to lowest magnification, and an approximate etendue of 2.88 mm²sr at its low magnification position. This embodiment is illustrated schematically at FIGS. 9A-9C, and includes a positive group (G205), a movable negative group (G305), a movable negative group (G405), a movable negative group (G505), and a positive group (G605). A numerical example in accordance with this embodiment is provided in Table 5. Three arrangements are included in FIGS. 9A-9C, including a low magnification arrangement at FIG. 9A, a mid-level magnification arrangement at FIG. 9B, and a high magnification arrangement at FIG. 9C.

The lens group G205 includes two lens elements including three lenses. The lens group G205 includes a biconvex singlet and a doublet, wherein the doublet includes a biconvex lens coupled to a biconcave lens.

Figure 9A:
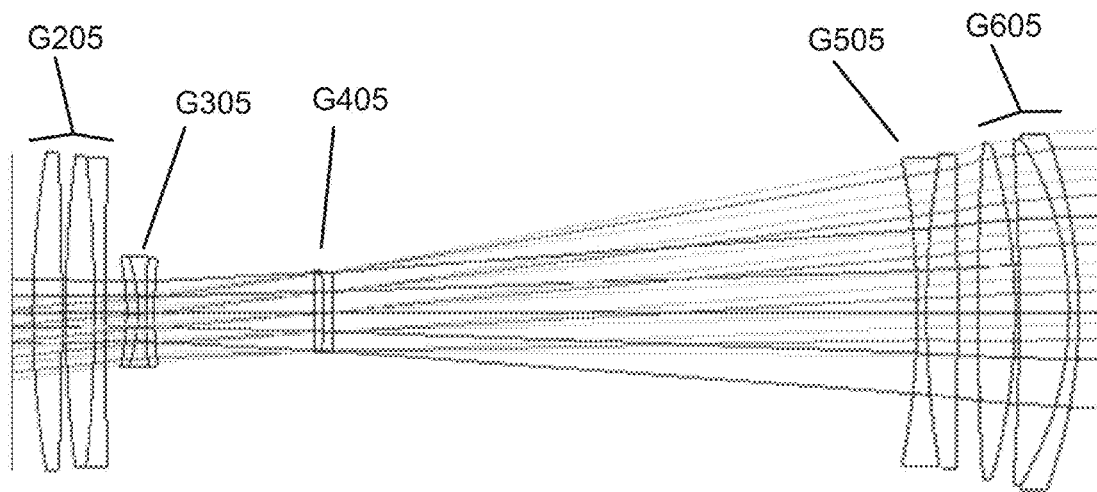
FIGS. 9A-9C schematically illustrate a fifth example embodiment of a core zoom or afocal zoom module of an optical assembly of a finite conjugate optical system that exhibits in this fifth example a ratio of highest to lowest magnification of 6.2:1 and an approximate etendue of 2.88 mm²sr, and includes in this fifth example a static positive group G205, a negative movable group G305, a negative movable group G405, a negative movable group G505, and a static positive group G605, which may be configured in accordance with the example optical prescription set forth at Table 5.
Figure 9B:
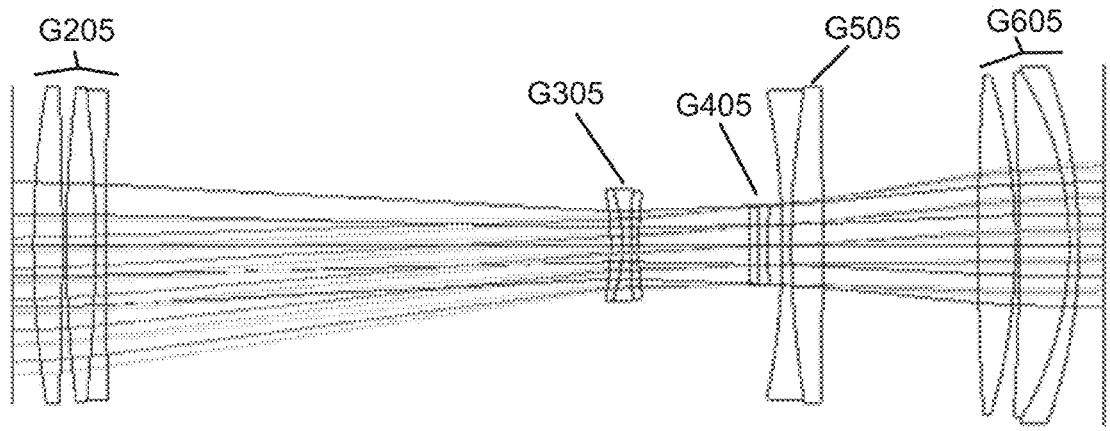
Figure 9C:
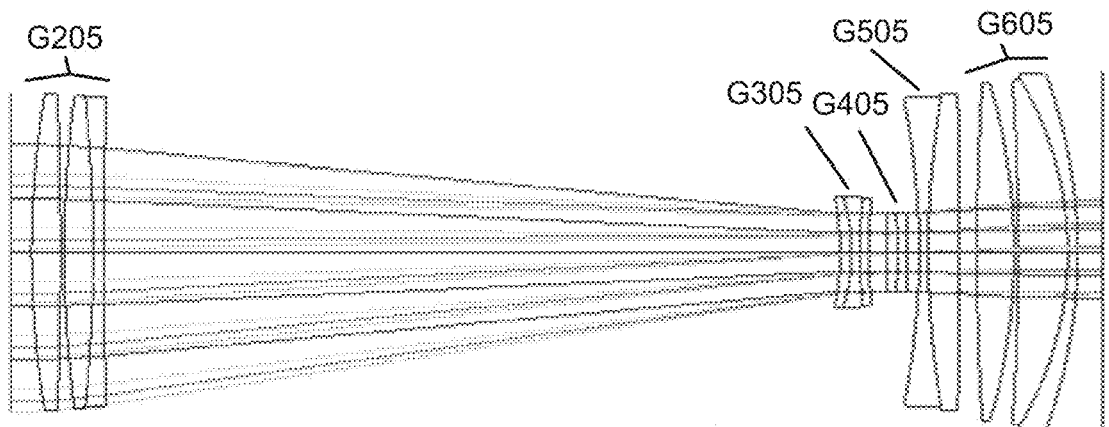

The movable lens group G305 includes one lens element including three lenses. The lens group G305 includes a triplet, wherein the triplet includes a concave meniscus lens coupled to a biconcave lens, and the biconcave lens is also coupled to convex meniscus lens. The movable lens group G305 is disposed a greater distance from lens group G205 in FIG. 9B compared with FIG. 9A, and lens group G305 is disposed closer to lens group G405 in FIG. 9B compared with FIG. 9A. The movable lens group G305 is disposed a greater distance from lens group G205 in FIG. 9C compared with FIG. 9B, and lens group G305 is disposed closer to lens group G405 in FIG. 9C compared with FIG. 9B.

The movable lens group G405 includes one lens element including two lenses. The lens group G405 includes a doublet, wherein the doublet includes a biconvex (or plano-convex) lens coupled to a biconcave (or plano-concave) lens. The movable lens group G405 is disposed furthest from lens group G305 and also furthest from lens group G505 in FIG. 9A compared with FIGS. 9B-9C, and lens group G405 is disposed closest to lens group G305 in FIG. 9C compared with FIGS. 9A-9B, and lens group G405 is disposed about the same distance from lens group G505 in FIGS. 9B and 9C, and is furthest from lens group G505 in FIG. 9A compared with FIGS. 9B-9C.

The movable lens group G505 includes one lens element including two lenses. The lens group G505 includes a doublet, wherein the doublet includes a biconcave lens coupled to a biconvex (or convex-plano) lens. The lens group G505 is disposed about a same distance from lens group G605 in FIGS. 9A and 9C, and is furthest from lens group G605 in FIG. 9B compared with FIGS. 9A and 9C. The lens group G505 is disposed about a same distance from lens group G405 in FIGS. 9B and 9C, and group G505 is disposed furthest from lens group G405 in FIG. 9A compared with FIGS. 9B-9C, and group G505 is disposed furthest from lens group G305 in FIG. 9A compared to FIGS. 9B-9C and group G505 is disposed closest to lens group G305 in FIG. 9C compared to FIGS. 9A-9B.

The lens group G605 includes two lens elements including three lenses. The lens group G605 includes a biconvex singlet and a doublet, wherein the doublet includes a concave meniscus (or plano-convex) lens coupled to a concave meniscus lens.

A sixth embodiment of a core zoom module includes an afocal zoom lens assembly that is configured to have a 12:1 ratio of highest to lowest magnification, and an approximate etendue of 2.88 mm$^2$sr at its low magnification position. This embodiment is illustrated schematically at FIGS. 10A-10C, and includes a positive group (G206), a movable negative group (G306), a movable positive group (G406), a movable negative group (G506), and a positive group (G606). A numerical example in accordance with this embodiment is provided in Table 6. Three arrangements are included in FIGS. 10A-10C, including a low magnification arrangement at FIG. 10A, a mid-level magnification arrangement at FIG. 10B, and a high magnification arrangement at FIG. 10C.

The lens group G206 includes one lens element including three lenses. The lens group G206 includes a triplet, wherein the triplet includes a convex meniscus lens coupled to a biconvex lens, and the biconvex lens is also coupled to a concave meniscus lens.

Figure 10A:
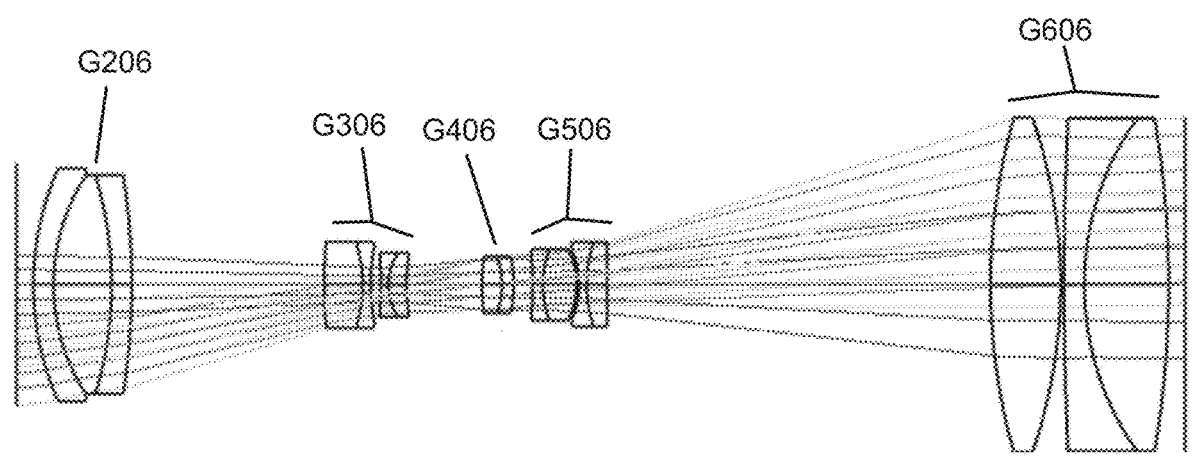
FIGS. 10A-10C schematically illustrate a sixth example embodiment of a core zoom or afocal zoom module of an optical assembly of a finite conjugate optical system that exhibits in this sixth example a ratio of highest to lowest magnification of 12:1 and an approximate etendue of 2.88 mm²sr, and includes in this sixth example a static positive group G206, a negative movable group G306, a positive movable group G406, a negative movable group G506, and a static positive group G606, which may be configured in accordance with the example optical prescription set forth at Table 6.
Figure 10B:
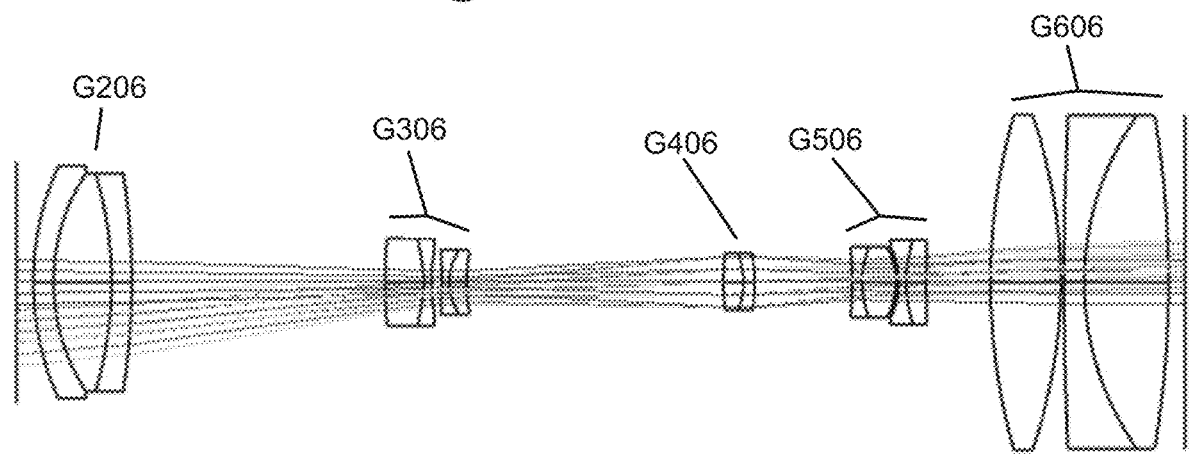
Figure 10C:
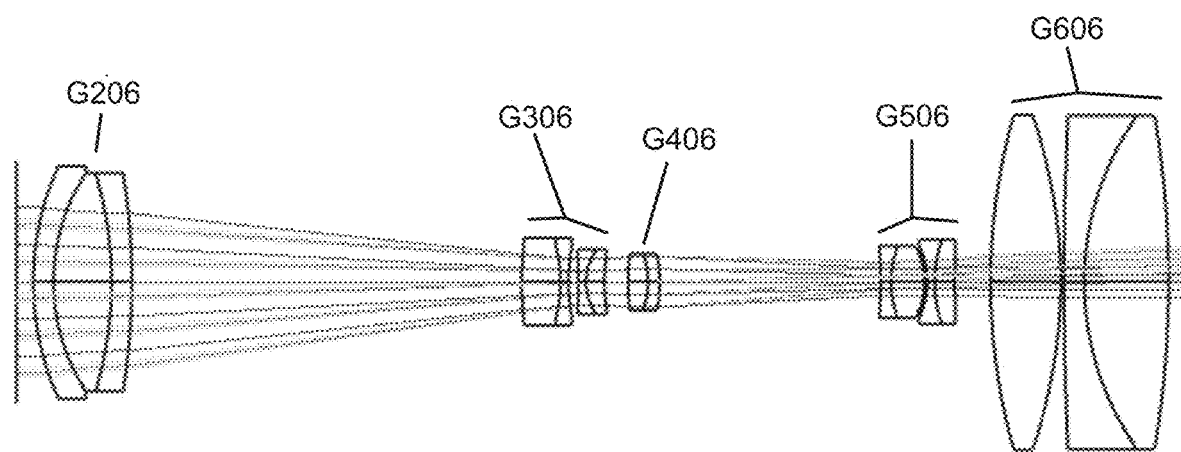

The movable lens group G306 includes two lens elements including four lenses. The lens group G306 includes two doublets, wherein the first doublet includes a biconvex (or plano-convex) lens coupled to biconcave lens, and the second doublet includes a biconcave (or plano-concave) lens coupled to a convex meniscus lens. The movable lens group G306 is disposed a greater distance from lens group G206 in FIG. 10B compared with FIG. 10A, and lens group G306 is disposed closer to lens group G406 in FIG. 10A compared with FIG. 10B. The movable lens group G306 is disposed a greater distance from lens group G206 in FIG. 10C compared with FIG. 10B, and lens group G306 is disposed closer to lens group G406 in FIG. 10C compared with FIG. 10A. Lens group G306 is disposed furthest from lens groups G206 and G406 in FIG. 10B compared to FIGS. 10A and 10C.

The movable lens group G406 includes one lens element including two lenses. The lens group G406 includes a doublet, wherein the doublet includes a biconvex lens coupled to a concave meniscus lens. The movable lens group G406 is disposed closest to lens group G506 in FIG. 10A compared with FIGS. 10B-10C, and group G406 is furthest from lens group G506 in FIG. 10C, compared with FIGS. 10A-10B.

The movable lens group G506 includes two lens elements including four lenses. The lens group G506 includes two doublets, wherein the first doublet includes a biconcave (or plano-concave) lens coupled to a biconvex lens, and the second doublet includes a biconcave lens coupled to convex meniscus (or plano-concave) lens. The lens group G506 is disposed furthest from lens group G606 in FIG. 10A compared with FIGS. 10B-10C, and group G506 is disposed closest to group G606 in FIG. 10C compared with FIGS. 10A-10B, and lens group G506 is disposed closer to group G606 in FIG. 10B compared to FIG. 10A.

The lens group G606 includes one lens element including two lens elements including three lenses. The lens group G606 includes a biconvex singlet and a doublet, wherein the doublet includes a convex meniscus lens coupled to a biconvex lens.

A seventh embodiment of a core zoom module includes an afocal zoom lens assembly that has a 5.7:1 ratio of highest to lowest magnification, and exhibits an approximate etendue of 4.65 mm$^2$sr at its low magnification position. This embodiment is illustrated schematically at FIGS. 11A-11C, and includes a positive group (G207), a movable negative group (G307), a fixed positive group (G407), a movable negative group (G507), and a positive group (G607). A numerical example in accordance with this embodiment is provided in Table 7. Three arrangements are included in FIGS. 11A-11C, including a low magnification arrangement at FIG. 11A, a mid-level magnification arrangement at FIG. 11B, and a high magnification arrangement at FIG. 11C.

The lens group G207 includes one lens element including three lenses. The lens group G207 includes a triplet, wherein the triplet includes a convex meniscus lens coupled to a biconvex lens, and the biconvex lens is also coupled to a concave meniscus lens.

Figure 11A:
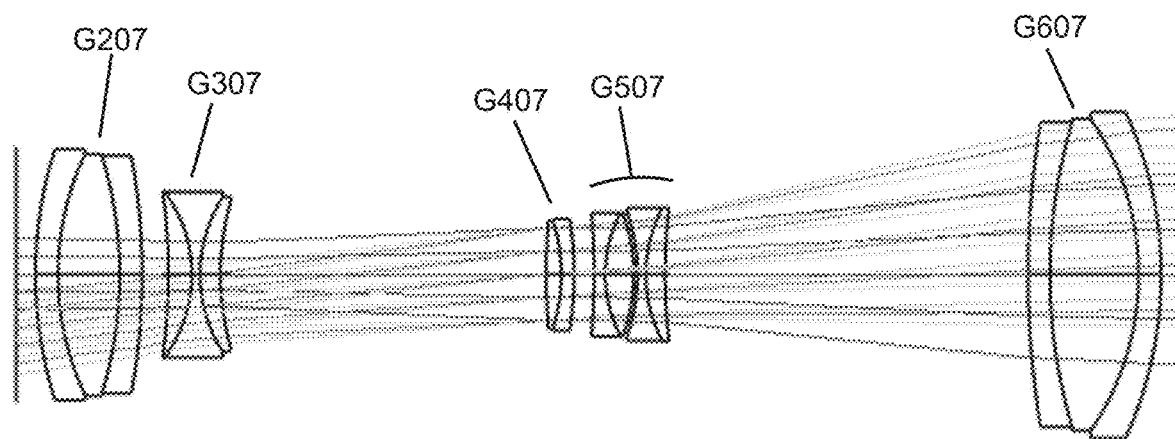
FIGS. 11A-11C schematically illustrates a seventh example embodiment of a core zoom or afocal zoom module of an optical assembly of a finite conjugate optical system that exhibits in this seventh example a ratio of highest to lowest magnification of 5.7:1 and an approximate etendue of 4.65 mm²sr, and includes in this seventh example a static positive group G207, a negative movable group G307, a positive static group G407, a negative movable group G507, and a static positive group G607, which may be configured in accordance with the example optical prescription set forth at Table 7.
Figure 11B:
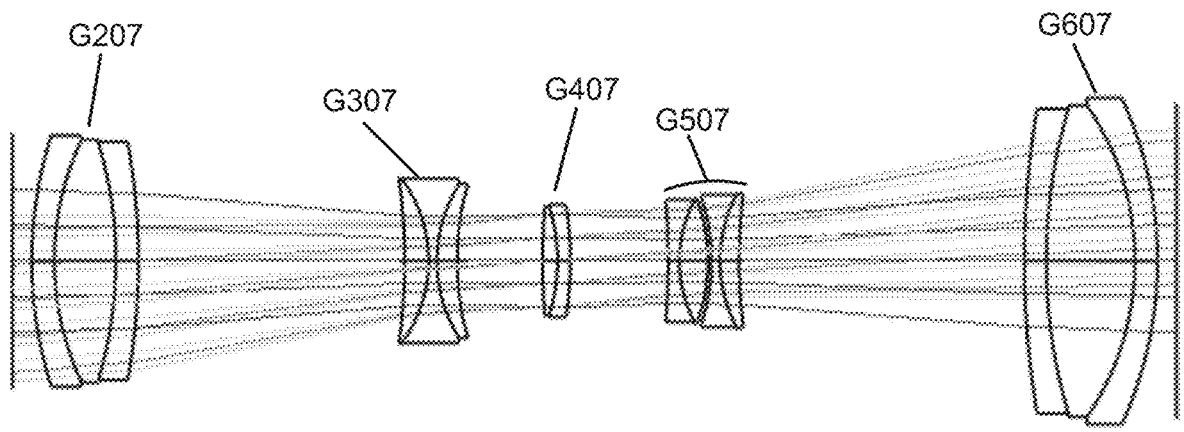
Figure 11C:
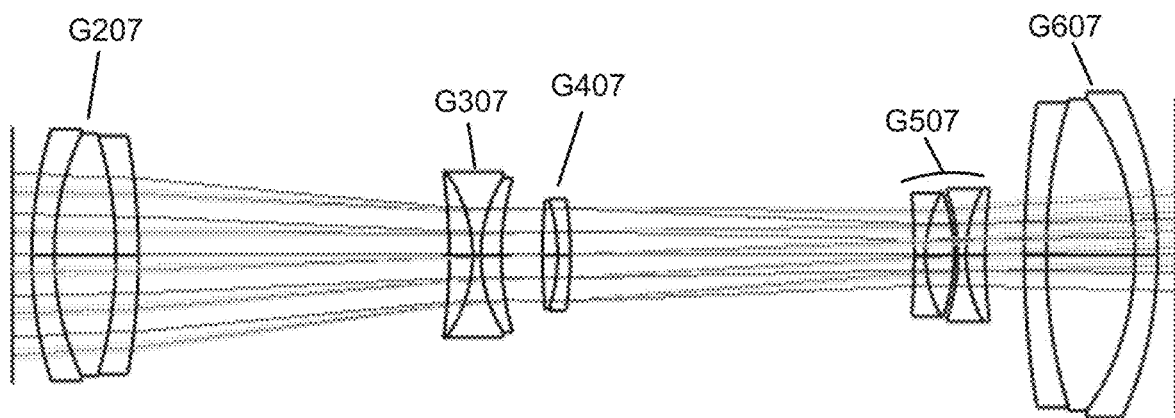

The movable lens group G307 includes one lens element including three lenses. The lens group G307 includes a triplet, wherein the triplet includes a concave meniscus lens coupled to a biconcave lens, and the biconcave lens is also coupled to a convex meniscus lens. The movable lens group G307 is disposed a greater distance from lens group G207 in FIG. 11B compared with FIG. 11A, and lens group G307 is disposed closer to lens group G407 in FIG. 11B compared with FIG. 11A. The movable lens group G307 is disposed a greater distance from lens group G207 in FIG. 11C compared with FIG. 11B, and lens group G307 is disposed closer to lens group G407 in FIG. 11C compared with FIG. 11B.

The lens group G407 includes one lens element including two lenses. The lens group G407 includes a doublet, wherein the doublet includes a biconvex lens coupled to a concave meniscus lens. The lens group G407 is disposed at a same location relative to the static groups G207 and G607 in all three of FIGS. 11A, 11B and 11C. The lens group G407 is a static group in this example.

The movable lens group G507 includes two lens elements including four lenses. The lens group G507 includes two doublets, wherein the first doublet includes a biconcave lens coupled to a biconvex lens, and the second doublet includes a biconcave lens coupled to a convex meniscus lens. The lens group G507 is disposed closest to group G407 in FIG. 11A compared with FIGS. 11B-11C, and lens group G507 is disposed furthest from group G407 in FIG. 11C compared with FIGS. 11A-11B. The lens group G507 is disposed furthest from group G607 in FIG. 11A compared with FIGS. 11B-11C, and group G507 is disposed closest to group G607 in FIG. 11C compared with FIGS. 11A-11B.

The lens group G607 includes one lens element including three lenses. The lens group G607 includes a triplet, wherein the triplet includes a convex meniscus lens coupled to a biconvex lens, and the biconvex lens also coupled to a concave meniscus lens.

Additional core zoom module embodiments may include five optical groups that have similar general attributes as those illustrated schematically at FIGS. 5A-11C and/or numerically at Tables 1-7. For example, a lens attachment group, such as any of example lens groups G114-G122 of FIGS. 18-26C and/or a rear adapter group, such as any of example lens groups G708-G712 of FIGS. 12-17 and lens groups G720-G722 of FIGS. 24A-26C may be included in additional embodiments either as separate optical modules or with the core zoom components in a single module. Example embodiments of optical assemblies including a lens attachment module m1, a core zoom module m2, and a rear adapter module m3 in combination are schematically illustrated at FIGS. 24A-24C, 25A-25C, 26A-26C, and 27A-27G, and given as numerical examples in Tables 20-25. Example embodiments of lens assemblies are configured with various ratios of highest to lowest magnification between 5.5:1 and 16:1 as well as etendue values between 0.95 and 4.65 mm²sr, and various combinations are provided in accordance with further embodiments. Further embodiments may include larger diameter and longer optical path length designs to correct additional aberrations that may be present in high etendue designs and/or the zoom range of larger magnification ratios.

Additional design features such as more optical elements per group or aspheric elements may be included to achieve difficult performance goals including reduced optical losses from the diffraction limit and reduced vignetting compared with conventional systems, e.g., in additional embodiments that may be variations or combinations of the embodiments described herein. Further alternative embodiments of zoom modules with five lens groups are provided for each of at least three grouping types, including, but not limited to, type 1, wherein a zoom module includes from object end to image end a positive static group, a negative movable group, a positive fixed group, a negative movable group, and a positive static group; and type 2, wherein a zoom module includes from object end to image end a positive static group, a negative movable group, a positive movable group, a negative movable group, and a positive static group; and type 3, wherein a zoom module includes from object end to image end a positive static group, a negative movable group, a negative movable group, a negative movable group, and a positive static group, as each provides distinct advantages for aberration correction and pupil compression. In various alternative embodiments, the middle group of the five lens groups of a zoom module may include a positive or negative movable group or a static group.

An afocal zoom lens assembly in accordance with certain embodiments may be designed for very good optical correction of color aberrations. A lens may be corrected to have an axial color separation of less than or equal to the depth of focus of light for the given wavelength and aperture of the system, as defined by the Rayleigh Criterion depth of focus equation, $$DOF = \pm \frac{\lambda}{2*NA^2},$$

[Smith—Modern Optical Engineering, pg. 715], for the visible wavelengths of light, defined here as 430 to 670 nm. This becomes particularly advantageous for a zoom lens of extended range such as 5.5:1 to 16:1 as set forth in accordance with certain embodiments.

An optical assembly in accordance with certain embodiments may be configured to achieve less than triple (3×), less than double (2×), less than 1×, or even less than half (0.5×) the DOF (depth of field) of axial color separation relative to a 550 nm wavelength for a 430 to 1100 nm waveband that covers the visible and Near Infrared (NIR) spectrums, when paired with a modular objective and tube lens in accordance with certain embodiments. The axial color separation of wavelengths achieved by an optical assembly in accordance with certain embodiments in this wavelength range may be as low as a quarter of the DOF.

Assembly adjustments of the described example embodiments may be used to correct the color separation for the 900 to 1700 nm wavelength range, or the Short-Wave Infrared (SWIR). Similarly, the axial color separation of wavelengths in this range, relative to a 1200 nm wavelength, for optical assemblies in accordance with certain embodiments are less than 3× the DOF, or less than 2× the DOF in certain embodiments, or less than 1×, or even less than half the DOF in alternative embodiments down to as low as approximately a quarter the DOF of axial color separation of wavelengths in this range.

This low slope axial color change in the NIR and SWIR gives users the ability to use the same lens system for inspecting both visible and infrared applications. The added wavelength focusing capability, similar to the higher aperture, gives added capability of collecting information about a specimen. As an embodiment usage example, this capability could allow the surface of a part to be inspected in fine detail with short wavelength blue light, while sequentially being able to be investigated for sub surface damage via NIR light, with or without any mechanical refocusing mechanism and/or software focus routine.

At the high magnification setting, where microscopy-like images are taken, the entire spectrum from 430 nm to 1100 nm may be controlled to less than the depth of focus in accordance with certain embodiments. At the medium to low mag settings, the NIR may be corrected to a minimum of less than twice the depth of focus in accordance with certain embodiments.

Additionally, an assembly time adjustment to the wavelength focus of the system is provided in advantageous embodiments. This adjustment, with appropriately coated glass, advantageously provides the wavelengths from 900 to 1700 nm, or SWIR, to focus simultaneously across the extended zoom range in accordance with certain embodiments. The wavelengths may be corrected to less than the depth of focus at the highest magnification setting across the whole spectrum in certain embodiments. The mid magnification point may be less than the depth of focus from 975 to 1700 nm, and may be less than 2 times the DOF below 975 nm in certain embodiments. The lowest magnification setting may be less than the DOF of axial color defocus from 1065 to 1660 nm, and may be less than twice the DOF outside of those values inside the SWIR wavelength range in certain embodiments.

Lens Attachment Module

Further example embodiments for lens attachment modules, or otherwise for first, front or objective modules, may include or otherwise be configured in accordance with one or more of the following features.

A multitude of long working distance, fixed focal length, objectives with an external entrance pupil are provided in certain embodiments. This entrance pupil may be at a sufficient depth to accommodate the substantial internal pupil depth of the afocal zoom as well as its range of motion to provide pupil matching with the afocal zoom and therefore may work seamlessly in conjunction with a zoom module configured in accordance with certain embodiments. An objective lens may have a 16-25 mm entrance pupil in certain embodiments. This pupil may be located externally to the lens, e.g., by 50 mm or greater distances such as 75, 100, 150 mm or an even greater distance.

An objective lens in certain embodiments may have a mechanical working distance (W.D.) to focal length (F1) ratio of 0.75 (W.D./F1>0.75) or more in certain example embodiments, including the first seven examples illustrated numerically at Table 23. Alternative embodiments may exhibit a working distance to focal length ratio between 0.6 and 0.75. Some embodiments may contain other ratios that are advantageous for cost or performance reasons. This working distance along with the large entrance pupil may be combined in certain example embodiments which provide a significant numerical aperture performance advantage at long working distances for various applications such as but not limited to inspection lines, touch probes, cavity inspection, automotive assembly, and/or flat panel fabrication.

The examples set forth at Table 23 may include lens attachments and/or objectives with long W.D./F1 ratio and 16-25 mm diameter external entrance pupils of 50 mm or greater distances such as, 75, 100, 150 mm or greater distance in certain example embodiments. An objective lens in accordance with certain embodiments may have an angular output that exhibits in combination with the 16-25 mm pupil an etendue of between 0.95 and 4.65 mm²sr.

Additional lens attachments and/or objective module examples may include telecentric attachments, whose chief ray exhibits less than 2, 1, 0.5, or 0.25° of deviation from perpendicularity to a flat object, across the entire FOV as well as across the entire zoom range in certain embodiments. An example embodiment 19 is given numerically in Table 19, and shown schematically in FIG. 23. A compressed pupil of an afocal zoom in accordance with the example lens diagrams illustrated schematically in side view at FIGS. 5A-5C through-FIGS. 11A-11C and/or with the example numerical prescriptions set forth at Tables 1-7, respectively, supports reduction of chief ray angle in the designs of lens attachments in accordance with certain example embodiments.

The example finite conjugate optical assemblies schematically illustrated at FIGS. 24A-24C, 25A-25C and 26A-26C, each include an example lens attachment module m124, m125 and m126, respectively, including a first lens group G120, G121 and G122, as well as a core zoom module m224, m225 and m226, and a rear adapter module m324, m325 and m326, each including a seventh lens group G720, G721 and G722, respectively, of a finite conjugate optical assembly in accordance with certain embodiments. FIGS. 18-23 schematically illustrate alternative example embodiments of lens attachment modules including lens groups G114-G119, respectively. Tables 14-19, respectively, include example optical prescriptions for the lens groups G114-G119 that are schematically illustrated at FIGS. 18-23. These example embodiments demonstrate etendue preservation of 1.58 mm²sr as well as the modularity of the system by maintaining optimal optical design performance with a common zoom module by using a common entrance pupil diameter and depth.

The lens group G114 of the lens attachment schematically illustrated at FIG. 18 includes six lens elements including eight lenses. The lens group G114 includes a concave meniscus singlet and a biconvex singlet, a pair of doublets, and a pair of concave meniscus singlets. The pair of doublets include a first doublet including a biconcave lens coupled to a biconvex lens, and a second doublet including a convex meniscus lens coupled to a biconvex lens.

The lens group G115 of the lens attachment schematically illustrated at FIG. 19 includes two lens elements including five lenses. The group G115 includes a doublet and a triplet, wherein the doublet includes a biconcave lens coupled to a biconvex lens, and the triplet includes a biconvex lens coupled to a biconcave lens, and the biconcave lens is also coupled to a convex meniscus lens.

The lens group G116 of the lens attachment schematically illustrated at FIG. 20 includes three lens elements and five lenses. The group G116 includes a first doublet, a biconcave singlet, and a second doublet. The first doublet includes a convex meniscus lens coupled to a biconvex lens, and the second doublet includes a biconvex lens coupled to a concave meniscus lens.

The lens group G117 of the lens attachment schematically illustrated at FIG. 21 includes three lens elements including four lenses. The group G117 includes a doublet, and two concave meniscus singlets. The doublet includes a biconvex lens coupled to a concave meniscus lens.

The lens group G118 of the lens attachment schematically illustrated at FIG. 22 includes three lens elements including four lenses. The group G118 includes a doublet, and a convex meniscus singlet and a biconvex singlet. The doublet includes a biconvex lens coupled to a biconcave lens.

The lens group G119 of the lens attachment schematically illustrated at FIG. 23 includes four lens elements including five lenses. The group G119 includes a biconvex singlet spaced apart from biconcave singlet that is spaced apart from a doublet and another biconvex singlet. The doublet includes a biconcave lens coupled to a biconvex lens.

Additional lens attachments used in conjunction with one or more other modules may in certain embodiments have the ability to focus light from 430 nm to 1100 nm with less than 3×, 2×, or 1× or even less than half a depth of focus difference from a nominal central wavelength across the wavelength range, based on the Rayleigh Criterion $$DOF = \pm \frac{\lambda}{2*NA^2}.$$

Additionally, a lens used in conjunction with one or more other modules may in certain embodiments be configured to operate at or near optical diffraction limits from 900 to 1700 nm with a similarly less than 3×, 2×, 1×, or less than even half of a depth of focus difference, e.g., in certain embodiments, with no refocus within the waveband.

Rear Adapter Module

Further example embodiments of rear adapters or tube lenses, rear modules, or third modules may include one or more of the following features.

Figure 28:
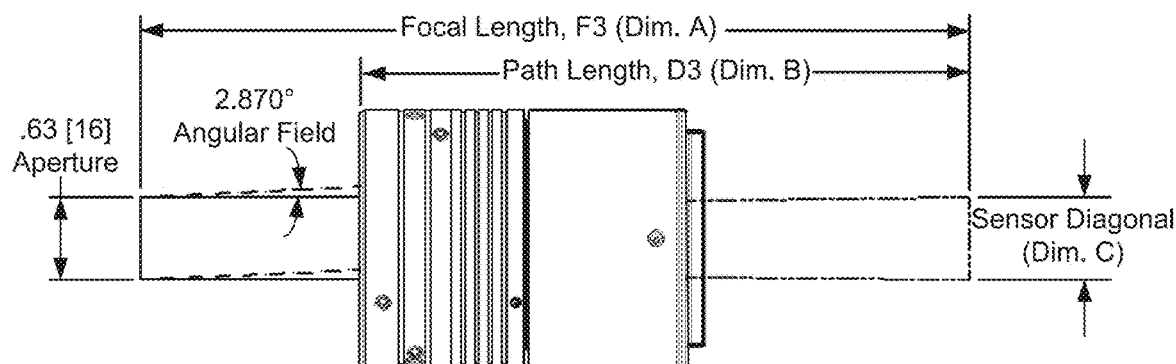
FIG. 28 schematically illustrates a tube lens or rear adapter in accordance with certain embodiments. The rear adapter of FIG. 28 may be included in or combined with module m324 of FIGS. 24A-24C, m325 of FIGS. 25A-25C, and/or m326 of FIGS. 26A-26C or in an adapter m3 of FIG. 27A, or in one or more of the example rear adapter modules m327, m328, m329 or m330 that are schematically illustrated at FIG. 27C, or in any of the examples that are schematically illustrated at FIGS. 12-17. The tube lens or rear adapter of FIG. 28 may be coupled with a zooming component and a lens attachment in an optical assembly exhibiting an etendue between 0.95 mm$^2$sr and 4.95 mm$^2$sr, or in the specific example of the rear adapter of FIG. 28 having an etendue value of 1.58 mm$^2$sr with dimensions A, B, & C listed as variables in Table 24.

A multitude of fixed focal length tube lenses are provided in certain embodiments with an external entrance pupil, and sufficient aperture and angle acceptance to produce an etendue value of between 0.95 and 4.65 mm²sr. Such tube lenses may in certain embodiments have the advantage of a short back focus as defined by D3/F3<0.9 where D3 is the path length and F3 is the focal length of the given rear module, for example, as illustrated in FIG. 28. The entrance pupil may be at a sufficient depth to accommodate the substantial internal pupil depth of an afocal zoom module in accordance with certain embodiments, as well as its range of motion to provide pupil matching with the afocal zoom module, and therefore may be configured to work seamlessly in conjunction with a zoom module configured in accordance with embodiments described herein. In certain embodiments, advantageous varying of pupil depth optimization provides advantageous robustness of use as a stand-alone tube lens.

Tube lenses in accordance with certain embodiments may have an entrance pupil diameter for an external entrance pupil tube lens of between 16 and 25 mm in certain embodiments.

Tube lenses may in certain embodiments accept a maximum collimated field angle of 2.5-3.5° or greater at an entrance pupil depth of 50 mm or greater distances such as, 75, 100, 150 mm, or greater without vignetting, which provides advantageous field coverage of existing sensor platforms for each given focal length.

Embodiments containing values in accordance with the above first and/or second examples gives an etendue value of between 0.95 to 4.65 mm²sr. Table 24 illustrates numerical values for a selection of example embodiments of varying sensor coverage meeting etendue values of 1.58 mm²sr. Table 24 illustrates certain numerical examples of example embodiments of rear adapters or tube lenses with short path length to focal length ratios, 16-25 mm diameter external entrance pupils at 50 mm or greater distances such as, 75, 100, 150 mm or greater distance, and etendue values of 1.58 mm²sr.

FIG. 28 schematically illustrates a diagrammed example of a tube lens that may be included within an example optical arrangement in accordance with a rear adapter module m324, m325 and/or m326 of a finite conjugate optical assembly configured in accordance with those schematically illustrated at FIGS. 24A-24C, 25A-25C, and/or 26A-26C, respectively, and/or in accordance with any of the example embodiments that are schematically illustrated at FIGS. 12-15 which may have an etendue value of 1.58 mm²sr with dimensions Dim A or focal length, Dim B or path length, and Dim C or length of sensor diagonal as set forth in multiple listed examples as variables in Table 24. FIGS. 16 and 17 schematically illustrate rear adapter example embodiments 12 and 13, respectively, which may have an etendue value of 3.21 mm²sr and also provide varying advantageous sensor coverage based on the example focal lengths. Additional high etendue rear adapters with fixed etendue and 16-25 mm diameter exit pupil at 50 mm or greater distances such as, 75, 100, 150 mm or greater distance may be advantageously paired with zoom module embodiments or with lens attachment and zoom module embodiments to maintain system etendue and cover known sensor sizes.

The example finite conjugate optical assemblies schematically illustrated at FIGS. 24A-24C, 25A-25C and 26A-26C each include example rear adapter modules m324, m325 and m326, respectively, including lens groups G720, G721 and G722. FIGS. 12-17 schematically illustrate alternative example embodiments of rear adapter modules including lens groups G708-G713, respectively. Tables 8-13, respectively, include example optical prescriptions for the lens groups G708-G713 that are schematically illustrated at FIGS. 12-17.

The lens group G708 of the rear adapter that is schematically illustrated at FIG. 12 includes four lens elements including six lenses. The group G708 includes two convex meniscus singlets and two doublets. The first doublet includes a convexo-planar (or convex meniscus) lens coupled to a plano-concave (or convex meniscus) lens, and the second doublet includes a biconvex lens coupled to a biconcave lens.

The lens group G709 of the rear adapter that is schematically illustrated at FIG. 13 includes four lens elements including six lenses. The group G709 includes a pair of convex meniscus singlets and two doublets. The first doublet includes a convex meniscus lens coupled to a convex meniscus lens, and the second doublet includes a biconvex lens coupled to a biconcave lens.

The lens group G710 of the rear adapter that is schematically illustrated at FIG. 14 includes five lens elements including six lenses. The group G710 includes a convex meniscus singlet, a biconvex singlet, another convex meniscus singlet, a biconcave singlet and a doublet. The doublet includes a biconvex lens coupled to a biconcave lens.

The lens group G711 of the rear adapter that is schematically illustrated at FIG. 15 includes three lens elements including five lenses. The group G711 includes two doublets and a concave meniscus singlet. The first doublet includes a biconvex lens coupled to a concave meniscus lens, and the second doublet includes a biconvex lens coupled to a biconcave lens. The first doublet is spaced apart from the second doublet and the singlet is spaced apart from the second doublet.

The lens group G712 of the rear adapter that is schematically illustrated at FIG. 16 includes four lens elements including five lenses. The group G712 includes one doublet, a biconvex singlet, a biconcave singlet, and a convex meniscus (or convex-planar) singlet. The doublet includes a biconvex lens coupled to a concave meniscus lens. The first doublet is spaced apart from the first singlet.

The lens group G713 of the rear adapter that is schematically illustrated at FIG. 17 includes four lens elements including five lenses. The group G713 includes one doublet, a biconvex singlet, a biconcave singlet, and a convex meniscus singlet. The doublet includes a biconvex lens coupled to a concave meniscus lens. The first doublet is spaced apart from the first singlet and the third singlet is spaced apart from the second singlet.

In certain embodiments, tube lenses may have a track or path length that is less than the focal length of the tube lens. Certain of these embodiments may have a track or path length that is determined from a mechanical entrance to the tube lens to the focal plane of the tube lens, particularly when collimated light is input. In other embodiments, a track or path length to focal length ratio may be less than 0.9. Table 24 includes multiple examples of parameter values in accordance with these embodiments. The diagram of FIG. 28 illustrates focal length Dim A, path length Dim B, and sensor size Dim C for which specific example values are provided in the multiple examples set forth at Table 24.

Additionally, tube lenses in accordance with certain embodiments may be configured with the ability to focus light from 430 nm to 1100 nm with less than 3×, 2×, 1×, or even less than half of a depth of focus difference from a nominal central wavelength, defined as 550 nm, across the wavelength range, based on the Rayleigh Criterion $$DOF = \pm \frac{\lambda}{2 * NA^2}.$$

Moreover, a lens in certain embodiments may be configured to operate at or near optical diffraction limits from 900 to 1700 nm with a similar 3×, 2×, 1×, or even less than half of a depth of focus difference from a 1200 nm central wavelength, with no refocus within the waveband.

Combined Embodiments

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

For example, lens assemblies for finite conjugate systems that exhibit minimal optical quality loss and/or less than 10% vignetting and various specific etendue values between 0.95 and 4.65 mm$^2$sr are included embodiments. Alternative embodiments may include different amounts of collimated spacing between the lenses of the first and second lens groups that are disposed consecutively at an object end of an optical assembly that includes a lens attachment and a zooming component. There may also be different amounts of collimated spacing between the lenses of the sixth and seventh lens groups that are disposed consecutively at an image end of an optical assembly that includes a zooming component and a rear adapter. A lens attachment module in accordance with certain alternative embodiments may include one or more positive and/or negative groups. A rear adapter module in accordance with certain alternative embodiments may include one or more positive or negative groups.

Combinations of the components illustrated schematically in FIGS. 27A-27G together form further example embodiments of optical systems including several example embodiments of a high etendue finite conjugate zoom lens system having a modular nature and comprising an objective lens or lens attachment module m127, m128, m129, m130, m131, m132, m133 including a positive lens group and configured in accordance with the examples set forth at Table 23, a core zoom module m227, m228, m229, m230, m231 with five lens groups, a tube lens or rear adapter module m327, m328, m329, m330 with a positive lens group and configured in accordance with the examples of Table 24, and wherein example optical systems may include one or more illumination, motorization, mount, and/or focus modules.

Combinations of any of the example lens attachment modules, core zoom modules and/or rear adapter modules described with reference to FIGS. 5A-26C and 28 and Tables 1-22, as well as combinations with the example embodiments and components described with reference to FIGS. 27A-27G, as well as combinations with embodiments characterizable as subtle modifications of any of the aforementioned embodiments, may form additional embodiments. Subtle modifications may include changing a curvature of a surface slightly, even to interchange mildly convex, planar and/or mildly concave surfaces, flipping a meniscus from convex to concave or concave to convex, adding or removing a meniscus or moving a meniscus to a different location such as to face the other side of an adjacent lens, separating a doublet into two singlets, separating a triplet into a doublet and a singlet, or into three singlets, or coupling two singlets into a doublet, or coupling a doublet and a singlet or three singlets into a triplet.

The zoom module m2 may include more or less than five groups. The example positive static groups G201-G207 and G220-G222 may further include one or more lenses of a lens attachment assembly, or a lens attachment module m1 may further include one or more lenses or lens elements of an example static group G201-G207 or G220-G222. The example positive static groups G601-G607 and G620-G622 may further include one or more lenses of a rear adapter optical assembly, or a rear adapter optical assembly or rear adapter module m3 may further include one or more lenses or lens elements of an example static group G601-G607 or G620-G622. That is, all or part of a lens attachment optical assembly such as any of lens groups G114-G122 and/or a rear adapter optical assembly such as any of lens groups G708-G713 or G720-G722 may be added to a zoom module m2, such as to increase the number of lens groups of the zoom module m2 from five groups to six groups or seven groups. Alternatively, all or part of a lens group, such as any of example groups G201-G207 or G220-G222 described and illustrated schematically at any of FIGS. 5A-11C and 24A-26C as being disposed, respectively, at the object end of a zoom module m2, m224-m231, and/or a group G601-G607 or G620-G622 described and illustrated schematically at any of FIGS. 5A-11C and 24A-26C as being disposed at the image end of a zoom module m2, m224-m231, may be removed from the zoom module and added to the lens attachment module m1 and/or rear adapter module m3, such as to reduce the number of lens groups of the zoom module m2 from five groups, as in several described examples, to four groups or three groups.

In addition, in methods that may be performed according to embodiments described herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A group of items linked with the conjunction "and" in the above specification should not be read as requiring that each and every one of those items be present in the grouping in accordance with all embodiments of that grouping, as various embodiments will have one or more of those elements replaced with one or more others. Furthermore, although items, elements or components of the invention may be described or claimed in the singular, the plural is contemplated to be within the scope thereof unless limitation to the singular is explicitly stated or clearly understood as necessary by those of ordinary skill in the art.

The presence of broadening words and phrases such as "one or more," "at least," "but not limited to" or other such phrases in some instances shall not be read to mean that the narrower case is intended or required in instances where such broadening phrases may be absent. The use of the terms "camera" and "optical assembly" and "module" and "lens group" do not imply that the components or functionality described or provided in example claims as part of a camera, assembly, module, or lens group are all configured in a common package. Indeed, any or all of the various components of a camera (e.g., optical assembly and image sensor), an optical assembly (e.g., including a lens attachment, a zooming component and a rear adapter and/or a lens attachment lens group, a zooming component including five lens groups and a rear adapter lens group and/or a lens attachment module, a zoom module and a rear adapter module), a module and/or a lens group may be combined in a single package or separately disposed or maintained and may further be manufactured, assembled and/or distributed at or through multiple locations.

Different materials may be used to form the lenses of the optical assemblies of the several embodiments. For example, various kinds of glass and/or transparent plastic or polymeric materials may be used that are not limited to those identified in example optical prescription tables, such as in Tables 1-22 at the 4$^{th}$ and 5$^{th}$ columns from the left.

Examples include polyimides. Among the polymeric materials are high refractive index polymers, or HRIPs, with refractive indices typically above 1.5 (see, e.g., Hung-Ju Yen and Guey-Sheng Liou (2010). "A facile approach towards optically isotropic, colorless, and thermoplastic polyimido-thioethers with high refractive index". J. Mater. Chem. 20 (20): 4080; H. Althues, J. Henle and S. Kaskel (2007). "Functional inorganic nanofillers for transparent polymers". Chem. Soc. Rev. 9 (49): 1454-65; Akhmad Herman Yuwono, Binghai Liu, Junmin Xue, John Wang, Hendry Izaac Elim, Wei Ji, Ying Li and Timothy John White (2004). "Controlling the crystallinity and nonlinear optical properties of transparent TiO2-PMMA nanohybrids". J. Mater. Chem. 14 (20): 2978; Naoaki Suzuki, Yasuo Tomita, Kentaroh Ohmori, Motohiko Hidaka and Katsumi Chikama (2006). "Highly transparent ZrO2 nanoparticle-dispersed acrylate photopolymers for volume holographic recording". Opt. Express 14 (26): 012712, which are incorporated by reference).

Optical image stabilization techniques may be included in a microscope and/or digital still and/or video camera in accordance with certain embodiments. For examples, techniques described at U.S. Pat. Nos. 8,649,628, 8,649,627, 8,417,055, 8,351,726, 8,264,576, 8,212,882, 8,593,542, 8,509,496, 8,363,085, 8,330,831, 8,648,959, 8,637,961, 8,587,666, 8,604,663, 8,521,017, 8,508,652, 8,358,925, 8,199,222, 8,135,184 and 8,184,967, and US published patent applications nos. 2012/0207347, 2012/0206618, 2013/0258140, 2013/0201392, 2013/0077945, 2013/0076919, 2013/0070126, 2012/0019613, 2012/0120283, and 2013/0075237 which are hereby incorporated by reference, may be used.

Additionally, the various embodiments set forth herein are described in terms of exemplary schematic diagrams and other illustrations. As will be apparent to one of ordinary skill in the art after reading this document, the illustrated embodiments and their various alternatives may be implemented without confinement to the illustrated examples. For example, schematic diagrams and their accompanying description should not be construed as mandating a particular architecture or configuration.

Optical assemblies are described in various embodiments through this specification and illustrated in the drawings and tables. Microscopes and digital stills cameras and digital video cameras and other mobile devices or laboratory devices or research devices or optical systems in accordance with several further embodiments may include the optical assemblies therein. Several examples of cameras that can be efficiently manufactured include image sensor modules coupled with optical assemblies in accordance with embodiments described herein. Certain optical parts of the camera or optical assembly such as one or more lenses, mirrors and/or apertures, a shutter, a housing or barrel for holding certain optics, a lens or a lens barrel, or other optic such as a mirror, polarizer, modulator, diffuser, light source, secondary sensor, accelerometer, gyroscope, power connection, a data storage chip, a microprocessor, a wired or wireless transmission/reception connection and/or receiver/transmitter, or housing alignment and/or coupling pins or recesses or other such structures may be included in certain embodiments even if they have not been specifically described or illustrated herein. It is noted that in certain embodiments, a shutter is included, while other camera embodiments do not have a shutter. One of several lighting techniques may be used with these camera embodiments. They include but are not limited to oblique illumination, ring lighting, epi-illumination, or back lighting. Such lighting techniques may be used as a constant light source or a flash or strobe technique may be used. These techniques may be used independently or in combination with any embodiment described herein.

In certain embodiments, a significantly wider field of view may be desired in one dimension than in another and a wide field of view may be desired in only one dimension. In such cases, some of the principles described herein can be reduced to cylindrical applications of any of the spherical examples provided.

In addition, all references and products cited above and below herein, as well as the background, abstract, tables and brief descriptions of the drawings and tables, are all incorporated by reference into the detailed description as disclosing alternative embodiments. Several embodiments of microscopes, optical assemblies and cameras have been described herein and schematically illustrated by way of example physical, electronic and optical architectures. Other embodiments of features and components of microscopes, optical assemblies and cameras that may be included within alternative embodiments, may be described at one or a combination of U.S. Pat. Nos. 7,443,597, 7,768,574, 7,593,636, 7,566,853, 9,091,843, 9,316,808, 8,005,268, 8,014,662, 8,090,252, 8,004,780, 7,920,163, 7,747,155, 7,368,695, 7,095,054, 6,888,168, 6,583,444, and/or 5,882,221, and/or US published patent applications nos. 2014/0028887, 2014/0043525, 2012/0063761, 2011/0317013, 2011/0255182, 2011/0274423, 2009/0212381, 2009/0023249, 2008/0296717, 2008/0099900, 2008/0029879, and/or 2005/0082653. All of these patents and published patent applications are incorporated by reference.

U.S. Pat. Nos. 7,593,636, 7,768,574, 7,807,508 and 7,244,056 which are incorporated by reference describe examples of structures where the electrical height of a camera device is nested within the optical height to decrease the physical height. An advantageously compact optical assembly or module or lens group thereof, as well as microscopes and still and video cameras and other mobile devices, and laboratory and research equipment are provided herein in alternative embodiments.

US2013/0242080 which is also incorporated by reference describes examples of imaging systems including optical assemblies and sensors and camera modules disposed within watertight compartments. A mechanism may be provided for optical and/or electrical and/or wireless communication of image data that does not involve breaking the watertight seal of the housing within which one or more imaging components resides.

I claim:

1. A modular finite conjugate lens assembly, comprising an afocal zooming component that is configured to exhibit between 0.95 and 4.65 mm$^2$sr of etendue, and a ratio of highest to lowest magnification between 5.5:1 and 16:1 and
wherein said afocal zooming component comprises five lens groups including, from object side to image side of the lens assembly:
  (a) a first lens group comprising a doublet or a triplet;
  (b) a second lens group comprising a doublet or a triplet;
  (c) a third lens group comprising a doublet;
  (d) a fourth lens group comprising a doublet;
  (e) a fifth lens group comprising a doublet or a triplet.

2. A lens assembly as in claim 1, whose etendue is between 1.57 and 4.65 mm$^2$sr, and wherein said ratio of highest to lowest magnification is 7:1 and 16:1.

3. A lens assembly as in claim 1, whose etendue is between 2.88 and 4.95 mm$^2$sr, and wherein said ratio of highest to lowest magnification is between 6.2:1 and 16:1.

4. A lens assembly as in claim 1, wherein a wavelength focus position across a wavelength range from 430 nm to 1100 nm differs by not more than 3× from a DOF (depth of field) at 550 nm light from a same 550 nm light focus position, wherein DOF is defined as $$DOF = \pm \frac{\lambda}{2 * NA^2},$$

where λ is wavelength and NA is Numerical Aperture.

5. A lens assembly as in claim 1, wherein a wavelength focus position across a wavelength range from 430 nm to 660 nm differs by not more than 1× from a DOF (depth of field) at 550 nm light from a same 550 nm light focus position, wherein DOF is defined as $$DOF = \pm \frac{\lambda}{2 * NA^2},$$

where λ is wavelength and NA is Numerical Aperture.

6. A lens assembly as in claim 1, wherein a wavelength focus position across a wavelength range from 900 nm to 1700 nm differs by not more than 3× from a DOF (depth of field) at 1200 nm light from a same 1200 nm light focus position, wherein DOF is defined as $$DOF = \pm \frac{\lambda}{2 * NA^2},$$

where λ is wavelength and NA is Numerical Aperture.

7. A lens assembly as in claim 1, comprising a lens attachment module that is coupled to face an object end of said afocal zooming component within said lens assembly, and wherein the lens attachment module comprises two or more fixed focal length lens elements, and has a positive focal length, and exhibits a pupil size of between 16 and 25 mm.

8. A lens assembly as in claim 1, comprising a lens attachment module that is coupled to face an object end of said afocal zooming component within said lens assembly, and wherein the lens attachment module comprises two or more fixed focal length lens elements, and has a positive focal length, and exhibits a pupil depth of 50 mm or greater.

9. A lens assembly as in claim 1, comprising a rear adapter module that is coupled to face an image end of said afocal zooming component within the lens assembly, and wherein the rear adapter module comprises three or more fixed focal length lens elements, and has a positive focal length, and exhibits a pupil size of between 16 and 25 mm.

10. A lens assembly as in claim 1, comprising a rear adapter module that is coupled to face an image end of said afocal zooming component within the lens assembly, and wherein the rear adapter module comprises three or more fixed focal length lens elements, and has a positive focal length, and exhibits a pupil depth of 50 mm or greater.

11. A lens assembly as in claim 1, comprising:
(a) a core zoom module including said afocal zooming component;
(b) a lens attachment module, including two or more fixed focal length lens elements, that is coupled to an object end of the core zoom module and has a positive focal length, and
(c) a rear adapter module, including three or more fixed focal length lens elements, that is coupled to an image end of the core zoom module and has a positive focal length, and
(d) wherein the lens assembly exhibits a pupil depth of at least 50 mm or a pupil size between 16 and 25 mm, or both.

12. A lens assembly as in claim 1, comprising a core zoom module that includes said afocal zooming component, a lens attachment module coupled at an object end of said core zoom module, and a rear adapter module coupled at an image end of said core zoom module.

13. A lens assembly as in claim 1, comprising (i) an afocal zoom module including said afocal zooming component, (ii) a lens attachment module coupled to an object end of the afocal zoom module, (iii) a rear adapter module coupled to an image end of the afocal zoom module, and (iv) one or more of a motorization module, a lighting module, a focusing module, a mount module, a sensor module, a processing module, and an interface module.

14. A lens assembly as in claim 1, wherein said first lens group of said zooming component comprises a positive focal length group, wherein said second lens group of said zooming component comprises a negative focal length group wherein said fourth lens group of said zooming component comprises another negative focal length group, and wherein said fifth lens group of said zooming component comprises another positive focal length group.

15. A lens assembly as in claim 14, wherein the third lens group of the zooming component comprises a positive group.

16. A lens assembly as in claim 14, wherein the third lens group of the zooming component comprises a negative group.

17. A lens assembly as in claim 1, wherein the first lens group of the zooming component comprises a static first group, wherein the second lens group of the zooming component comprises a movable second group, wherein the fourth lens group of the zooming component comprises a movable fourth group, and wherein the fifth lens group of the zooming component comprises a static fifth group.

18. A lens assembly as in claim 17, wherein the third lens group of the zooming component comprises a movable group.

19. A lens assembly as in claim 18, wherein the movable second and fourth groups have a same sign of optical power, and the movable third group comprises a same or opposite sign of optical power as said movable second and fourth groups.

20. A lens assembly as in claim 1, wherein the first lens group of the zooming component comprises a static positive first group, wherein the second lens group of the zooming component comprises a negative movable second group, wherein the third lens group of the zooming component comprises a positive static third group, wherein the fourth lens group of the zooming component comprises a negative movable fourth group, and wherein the fifth lens group of the zooming component comprises a positive static fifth group.

21. A lens assembly as in claim 1, wherein the first lens group of the zooming component comprises a static positive first group, wherein the second lens group of the zooming component comprises a negative movable second group, wherein the third lens group of the zooming component comprises a positive movable third group, wherein the fourth lens group of the zooming component comprises a negative movable fourth group, and wherein the fifth lens group of the zooming component comprises a positive static fifth group.

22. A lens assembly as in claim 1, wherein the first lens group of the zooming component comprises a static positive first group, wherein the second lens group of the zooming component comprises a negative movable second group, wherein the third lens group of the zooming component comprises a negative movable third group, wherein the fourth lens group of the zooming component comprises a negative movable fourth group, and wherein the fifth lens group of the zooming component comprises a positive static fifth group.

23. A lens assembly as in claim 1, wherein the afocal zooming component comprises three movable groups.

24. A lens assembly as in claim 23, wherein said three movable groups are disposed consecutively within the lens assembly.

25. A lens assembly as in claim 1, wherein the first lens group of the zooming component comprises a static first group, wherein the second lens group of the zooming component comprises a movable triplet, wherein the fourth lens group of the zooming component comprises a movable doublet, and wherein the fifth lens group of the zooming component comprises a static fifth group.

26. A lens assembly as in claim 1, wherein the third group comprises a static doublet.

27. A lens assembly as in claim 1, wherein a telecentric chief ray value at an object is less than 2° relative to a flat perpendicular object when combined with said zooming component.

28. A lens assembly as in claim 1, whose etendue is between 0.95 and 4.65 mm$^2$sr at any point of a zoom range of the afocal zooming component.

29. A finite conjugate camera, comprising:
   a finite conjugate lens assembly as set forth in claim 1;
   an image sensor disposed at an image plane of the lens assembly for capturing images; and
   a display or interface for communicating with an external display, or both, for displaying the images captured at the image sensor.

30. The finite conjugate camera of claim 29, comprising a digital microscope.

31. A finite conjugate camera, comprising:
   a finite conjugate lens assembly as set forth at claim 1; and
   an eyepiece configured and positioned such that images produced by the lens assembly are viewable by looking through the eyepiece.

32. The finite conjugate camera of claim 31, comprising a microscope.

* * * * *